US008158095B2

(12) United States Patent
Yoshinaga et al.

(10) Patent No.: US 8,158,095 B2
(45) Date of Patent: *Apr. 17, 2012

(54) NON-THERMOFUSIBLE PHENOL RESIN POWDER, METHOD FOR PRODUCING THE SAME, THERMOSETTING RESIN COMPOSITION, SEALING MATERIAL FOR SEMICONDUCTOR, AND ADHESIVE FOR SEMICONDUCTOR

(75) Inventors: Naoto Yoshinaga, Hofu (JP); Yoshiharu Wakayama, Hofu (JP); Satoshi Ibaraki, Osaka (JP); Jun Shimomura, Hofu (JP); Yoshimi Murage, Hofu (JP); Niro Shiomi, Hofu (JP); Yoshinobu Kodani, Hofu (JP); Takaomi Ikeda, Hofu (JP)

(73) Assignee: Air Water Inc., Sapporo-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/585,147

(22) Filed: Sep. 4, 2009

(65) Prior Publication Data
US 2010/0074831 A1 Mar. 25, 2010

Related U.S. Application Data

(63) Continuation of application No. 12/311,045, filed as application No. PCT/JP2007/069927 on Oct. 12, 2007.

(30) Foreign Application Priority Data

Oct. 20, 2006 (JP) .................................. 2006-286278
Jul. 2, 2007 (JP) .................................. 2007-174033
Aug. 21, 2007 (JP) .................................. 2007-214781
Sep. 27, 2007 (JP) .................................. 2007-251605

(51) Int. Cl.
*C01B 31/00* (2006.01)
*C08G 59/05* (2006.01)
*C08G 8/04* (2006.01)
*C08G 14/02* (2006.01)
*H01M 4/13* (2010.01)
*H01B 1/06* (2006.01)

(52) U.S. Cl. .................. 423/445 R; 429/231.8; 252/511

(58) Field of Classification Search ........................ None
See application file for complete search history.

(56) References Cited

U.S. PATENT DOCUMENTS 4,029,600 A 6/1977 Schmitt, Jr. et al.
(Continued)

FOREIGN PATENT DOCUMENTS

EP 0 063 777 A1 11/1982
(Continued)

OTHER PUBLICATIONS

Translation of Japanese Pub. No. 2005-105090.*
(Continued)

*Primary Examiner* — Melvin Mayes
*Assistant Examiner* — Guinever Gregorio
(74) *Attorney, Agent, or Firm* — Foley & Lardner LLP

(57) ABSTRACT

Disclosed is a non-thermofusible phenol resin powder having an average particle diameter of not more than 20 μm and a single particle ratio of not less than 0.7. This non-thermofusible phenol resin powder preferably has a chlorine content of not more than 500 ppm. This non-thermofusible phenol resin powder is useful as an organic filler for sealing materials for semiconductors and adhesives for semiconductors. The non-thermofusible phenol resin powder is also useful as a precursor of functional carbon materials such as a molecular sieve carbon and a carbon electrode material.

13 Claims, 9 Drawing Sheets

U.S. PATENT DOCUMENTS

| | | | | |
|---|---|---|---|---|
| 5,059,578 | A | * | 10/1991 | Marumo et al. ............... 502/432 |
| 5,968,471 | A | * | 10/1999 | Yanagita et al. .......... 423/445 R |
| 7,061,750 | B2 | | 6/2006 | Oyama et al. |
| 7,220,697 | B2 | * | 5/2007 | Pak et al. ...................... 502/185 |
| 2001/0002246 | A1 | | 5/2001 | Huguenin et al. |
| 2008/0107902 | A1 | | 5/2008 | Kinuta et al. |
| 2009/0140214 | A1 | | 6/2009 | Sonobe et al. |

FOREIGN PATENT DOCUMENTS

| | | |
|---|---|---|
| EP | 0 282 053 A2 | 9/1988 |
| EP | 0 564 733 A1 | 10/1993 |
| EP | 1 905 740 A1 | 4/2008 |
| JP | 47-038686 | 12/1972 |
| JP | 50-098537 | 8/1975 |
| JP | 57-177011 | 10/1982 |
| JP | 59-6208 | 1/1984 |
| JP | 61-57670 | 3/1986 |
| JP | 62-176908 | 8/1987 |
| JP | 62-235312 | 10/1987 |
| JP | 63-129006 | 6/1988 |
| JP | 63-218723 | 9/1988 |
| JP | 64-61306 | 3/1989 |
| JP | 64-074255 | 3/1989 |
| JP | 2-245011 | 9/1990 |
| JP | 3-29209 | 2/1991 |
| JP | 03-210356 | 9/1991 |
| JP | 04-159320 | 6/1992 |
| JP | 05-168839 A | 7/1993 |
| JP | 5-269331 | 10/1993 |
| JP | 06-020546 B2 | 3/1994 |
| JP | 6-154595 | 6/1994 |
| JP | 7-18043 | 1/1995 |
| JP | 10-60068 | 3/1998 |
| JP | 10-130467 | 5/1998 |
| JP | 10-338728 | 12/1998 |
| JP | 11-1314 | 1/1999 |
| JP | 11-80300 | 3/1999 |
| JP | 11-172077 | 6/1999 |
| JP | 2000-239335 | 9/2000 |
| JP | 2000-269247 | 9/2000 |
| JP | 2001-114852 | 4/2001 |
| JP | 2001-143973 | 5/2001 |
| JP | 2001-288238 | 10/2001 |
| JP | 2002-226534 | 8/2002 |
| JP | 2002-226824 | 8/2002 |
| JP | 2003-73436 | 3/2003 |
| JP | 2003-104720 | 4/2003 |
| JP | 2003-203829 | 7/2003 |
| JP | 2004-168848 | 6/2004 |
| JP | 2004-221332 | 8/2004 |
| JP | 2005-000749 | 1/2005 |
| JP | 2005-105090 | 4/2005 |
| JP | 2005-120122 | 5/2005 |
| JP | 2006-232901 | 9/2006 |
| JP | 2006-232902 | 9/2006 |
| JP | 2006-324183 | 11/2006 |
| JP | 2007-99612 A | 4/2007 |
| JP | 2007-180429 | 7/2007 |
| JP | 2008-030981 | 2/2008 |
| WO | WO 2006/028257 A1 | 3/2006 |
| WO | WO 2006/126721 A1 | 11/2006 |

OTHER PUBLICATIONS

U.S. Appl. No. 12/311,045, filed Mar. 23, 2009, Yoshinaga.
U.S. Appl. No. 12/585,146, filed Sep. 4, 2009, Yoshinaga.
Supplementary European Search Report mailed Dec. 3, 2009 in European Application No. 07829663.9.
Supplementary European Search Report mailed Dec. 2, 2009 in European Application No. 09011644.3.
Supplementary European Search Report mailed Dec. 2, 2009 in European Application No. 09011645.0.
Office Action in U.S. Appl. No. 12/311,045 dated Jan. 6, 2011.
Notice of Grounds of Rejection in JP Appln No. 2007-214781 dated Nov. 29, 2011.
Office Action in U.S. Appl. No. 12/585,146 dated Sep. 15, 2011.
Notification issued by Japanese Patent Office dated Sep. 14, 2009 for Japanese Patent Application No. 2007-251605 with cover page translation (8 pages).

* cited by examiner

QUANTITY OF PRODUCT NITROGEN (Nm³/H)

NON-THERMOFUSIBLE PHENOL RESIN POWDER, METHOD FOR PRODUCING THE SAME, THERMOSETTING RESIN COMPOSITION, SEALING MATERIAL FOR SEMICONDUCTOR, AND ADHESIVE FOR SEMICONDUCTOR

BACKGROUND OF THE INVENTION

This application is a continuation application of U.S. application Ser. No. 12/311,045, filed Mar. 23, 2009, which is the National Stage application of International Application No. PCT/JP2007/069927, filed Oct. 12, 2007, which claims the priority to Japan Application Nos. 2007-251605, filed Sep. 27, 2007, 2007-214781, filed Aug. 21, 2007, 2007-174033, filed Jul. 2, 2007, and 2006-286278, filed Oct. 20, 2006. All of which are hereby incorporated by reference in their entirety.

TECHNICAL FIELD

The present invention relates to a non-thermofusible phenol resin powder and a method for producing the same. More specifically, it relates to a highly safe non-thermofusible phenol resin powder useful as an organic filler or a precursor of a functional carbon material such as a molecular sieve carbon, a carbon electrode material or the like and suitably employable as an additive for materials over various industrial fields such as a molding material, a paint, a refractory, papermaking, a friction material, an abrasive and an adhesive and a method for producing the same. Further, the present invention relates to a thermosetting resin composition containing this non-thermofusible phenol resin powder, as well as a sealing material for a semiconductor and an adhesive for a semiconductor employing this thermosetting resin composition.

BACKGROUND ART

A phenol resin is a material excellent in the balance between heat resistance, dynamical performance and electric characteristics and the cost, and utilized in various industrial fields. In particular, applicability to various fields has recently been found as to a granular or powdery phenol resin or a hardened substance thereof, and some products are already put on the market as multiuse materials.

For example, Japanese Patent Laying-Open No. 57-177011 (Patent Document 1) discloses a granular or powdery phenol resin hardened substance consisting of a condensate of a phenolic compound and formaldehyde, and this is put on the market with a trade name "Bellpearl (registered trademark) Type R" (by Air Water Inc.). This phenol resin hardened substance is useful as an organic filler for supplying heat resistance or improving sliding properties or a filler for reducing the quantity of gas generated when hardening an unhardened phenol resin or the like, for example. Further, this is a resin having a high residual carbon ratio due to the chemical structure thereof, and hence the same is useful also as a firing precursor of activated carbon or a powdery carbon material suitably used as a carbon electrode material, for example. In addition, the granular or powdery phenol resin hardened substance described in Patent Document 1 contains neither a harmful phenol monomer nor a low-molecular condensation component, and has high safety.

When employing the aforementioned phenol resin powder or the hardened substance thereof as an organic filler or a precursor of a powdery carbon material, the shapes and configurations of the particles thereof must be properly controlled, in order to exhibit desirable performance as the organic filler or the precursor of a powdery carbon material. In other words, it is necessary that (i) the average particle diameter of the particles is sufficiently small, and (ii) there is hardly any secondary aggregate resulting from aggregation of primary particles, in order to attain a high filling property in a product, a high specific surface area in formation of the powdery carbon material and low viscosity in a use as an aqueous slurry. In addition to the above (i) and (ii), it is more desirable that (iii) the particle size distribution of the particles is sufficiently narrow, and/or (iv) the shapes of the particles are closer to a spherical shape. Further, it is desirable that (v) the residue of a phenol monomer (free phenol) in the phenol resin powder is smaller, in consideration of safety of the product to which this phenol resin powder is applied or safety in production. The aforementioned sufficiently small particle diameter must be at least not more than 20 µm, more preferably not more than 10 µm, in consideration of application of the phenol resin powder or the hardened substance thereof to various industrial uses.

However, although a large number of studies have been heretofore conducted as to the phenol resin powder or the hardened substance thereof, it is the present situation that a phenol resin powder having the aforementioned characteristics or a hardened substance thereof is not yet known and a production method suitable for mass production of such a phenol resin powder or a hardened substance thereof is not yet known either.

For example, while the aforementioned Patent Document 1 describes a technique of obtaining a granular or powdery non-thermofusible phenol resin by optimizing synthetic conditions such as the ratios of quantities of formaldehyde, phenol, hydrochloric acid and a water medium as used and a temperature condition, the obtained non-thermofusible phenol resin had such points to be improved that (i) the primary particle diameters are relatively large, (ii) the quantity of secondary aggregates formed by aggregation of the primary particles is relatively large, (iii) the particle size distribution is wide, and (iv) the resin contains a large quantity of particles having shapes other than a spherical shape.

Japanese Patent Laying-Open No. 2000-239335 (Patent Document 2) discloses a spherical phenol resin hardened substance obtained by reacting phenol and formaldehyde with an alkaline catalyst in the presence of a suspending agent and thereafter performing hardening reaction with an acidic catalyst. However, the average particle diameter specifically described in Example is 100 to 800 µm.

Japanese Patent Laying-Open No. 50-98537 (Patent Document 3) describes a technique of obtaining a non-thermofusible phenol resin powder by adding a cellulosic compound to an initial condensate obtained by reacting a phenolic compound and a formaldehyde in the presence of at least one of an acidic catalyst and a basic catalyst and a nitrogen-containing compound, granulating the mixture by further continuing the reaction and thereafter performing dehydration/drying. However, the average particle diameter of this phenol resin powder is about 700 µm. Further, the phenol resin powder contains about 6000 ppm of free phenol, and there is room for improvement in view of safety.

Japanese Patent Laying-Open No. 2001-114852 (Patent Document 4) describes a technique of obtaining a spherical phenol resin by condensing a phenolic compound and an aldehyde in the presence of a condensation catalyst and an emulsion dispersant under conditions of a temperature of at least 105° C. and not more than 200° C. and a pressure of at least 1.3 kg/cm² and not more than 15 kg/cm². This spherical phenol resin has an average particle diameter of 2 to about 200 µm, as described in Example. However, the technique is accompanied with such complicatedness that the reaction is performed with an autoclave, and there has been such a problem that the particle diameter remarkably fluctuates depending on a stirring method or a rate of stirring. Further, the reaction pattern is essentially similar to that in the aforementioned Patent Document 3, and the chemical structure of the obtained phenol resin is also conceivably equivalent, and hence the phenol resin conceivably contains a large quantity of free phenol.

Japanese Patent Laying-Open No. 59-6208 (Patent Document 5) describes a spherical phenol resin obtained by hardening a dispersion of a resol-type spherical phenol resin, obtained by reacting a phenolic compound and a formaldehyde with a nitrogen-containing compound catalyst in the presence of a water-soluble polymer compound, with an acidic catalyst. However, the spherical phenol resin obtained by this method has a large average particle diameter of about 350 to 520 μm.

Japanese Patent Laying-Open No. 2002-226534 (Patent Document 6) discloses a method for producing spherical resin particulates from resorcin and an aldehyde by setting the ratio (weight ratio) of the resorcin and water to 1:5 to 1:100 and adjusting the pH of the reaction system to 5 to 7. These spherical resin particulates have an average particle diameter of 500 nm to 2 μm, as described in Example. However, there is such a problem that only the resorcin can be used as the phenol source, and hence the residual carbon ratio of the obtained phenol resin is conceivably low as compared with a case of employing another phenolic compound such as phenol.

Japanese Patent Laying-Open No. 10-338728 (Patent Document 7) describes a method for producing a spherical phenol resin hardened substance by removing a solvent from a homogeneous mixed liquid containing a phenol resin, a cellulose derivative and the solvent, causing phase separation of the phenol resin and the cellulose derivative, hardening the phenol resin and thereafter removing the cellulose derivative from the composite of the phenol resin hardened substance and the cellulose derivative. A spherical phenol resin hardened substance having an average particle diameter of 28 nm to 5 μm is obtained by this method. However, an organic solvent problematic to the environment and safety of the human body must be used in this method. Further, the phase separation reaction in a solid phase is utilized, and hence a long time of 21 hours to 114 hours is required for formation/extraction of the particles.

Japanese Patent Laying-Open No. 7-18043 (Patent Document 8) discloses a method for producing a spherical phenol-formaldehyde-based resin by reacting a phenol compound and formaldehyde in a specific quantity of water or a mixed solvent of water/water-compatible organic solvent in the presence of an acidic catalyst while condensing the solvent and hardening deposited novolac spherical particles by reaction with a hardening agent. According to this method, a spherical phenol resin having a particle diameter of about 9 μm or 15 μm can be obtained, for example. However, it cannot be said that the spherical phenol resin obtained by this method is sufficiently satisfactory in the point of the particle size distribution. Further, the reaction pattern is essentially similar to that in the aforementioned Patent Document 3, and the chemical structure of the obtained phenol resin is also conceivably equivalent, and hence the phenol resin conceivably contains a large quantity of free phenol.

Although various methods such as that employing an additive such as a suspending agent or an emulsion dispersant and that optimizing polymerization conditions etc. for the phenol resin have generally been proposed as techniques for obtaining particulates of phenol resins, phenol resin particles having a minute average particle diameter of not more than 20 μm, preferably not more than 10 μm, hardly containing secondary aggregates, having an extremely small content of a monomer phenolic compound and having high safety and a method for producing the same have not been proposed. Further, such a phenol resin powder that the shapes of the particles thereof are spherical and the particle size distribution of the particles is sufficiently narrow in addition to these characteristics and a method for producing the same are not proposed.

For example, even if the polymerization conditions etc. for the phenol resin are optimized, it follows that the obtained phenol resin contains a monomer phenolic compound in a high content substantially identically to the prior art when the polymerization conditions for polymerizing the phenolic compound and the aldehyde themselves are essentially equivalent to the polymerization conditions having been employed in general. In such a method for producing a phenol resin powder that a rate of stirring influences the particle size, the particle size distribution inevitably widens since the inner portion of a reaction vessel cannot be continuously homogeneously stirred.

An integrated circuit device such as an IC (Integrated Circuit) or a memory generally consists of a semiconductor element, an insulating support substrate, a lead frame and a lead, and a sealing material or an adhesive is employed for sealing and bonding these. In general, it has been a mainstream tendency to employ a resin composition containing an inorganic filler such as spherical silica, epoxy resin and a hardening agent for such a sealing material or an adhesive.

In recent years, however, heat resistance has been required to a sealing material and an adhesive, in order to cope with increase of a soldering temperature resulting from transition to lead-free solder and application to an electronic component such as an on-vehicle electronic component requiring a high-temperature operation assurance. Further, while refinement of the filler in the sealing material and the adhesive and reduction in viscosity of the sealing material and the adhesive are required in order to cope with further refinement of internal wires of the integrated circuit chip, it has been difficult to satisfy these both new required characteristics with conventional blending.

In other words, epoxy resin which is an organic substance and spherical silica (fused silica) which is an inorganic substance are remarkably different in linear expansion coefficient from each other, and hence such deterioration comes into question that stress is formed on the interface between the epoxy resin and the spherical silica to cause cracks in production through a soldering step or the like or following temperature rise/temperature reduction in use.

Japanese Patent Laying-Open No. 11-172077 (Patent Document 9) describes a technique of blending an amino-based silane coupling agent acting on a silica surface to a composition for sealing a semiconductor in order to improve mechanical characteristics of a hardened substance. However, heat resistance of the silane coupling agent itself is low, and hence heat resistance of the sealing material is also relatively low depending on the heat resistance of the silane coupling agent.

As a means for canceling stress formation on the interface between the aforementioned epoxy resin and the spherical silica, an organic filler which is an organic substance may conceivably be employed in place of the inorganic filler such as the spherical silica. This is because the difference between the linear expansion coefficients of the filler and the epoxy resin is reduced due to the employment of the organic filler. For example, Japanese Patent Laying-Open No. 2000-

269247 (Patent Document 10), Japanese Patent Laying-Open No. 2002-226824 (Patent Document 11) and Japanese Patent Laying-Open No. 2004-168848 (Patent Document 12) describe that an organic filler can be employed for a sealing material for a semiconductor or an adhesive for a semiconductor. However, there is no proposal as to a specific organic filler having the aforementioned required characteristics.

The phenol resin is a material excellent in heat resistance, dynamical performance and electric characteristics, and utilized as various industrial materials such as that for an electronic material. If a hardened substance of the phenol resin can be employed as an organic filler, the excellent characteristics belonging to this phenol resin can be supplied to the sealing material or the adhesive for a semiconductor.

However, there has heretofore been proposed no phenol resin hardened substance having high heat resistance and implementing refinement of resin particles and reduction in viscosity in a case of forming a sealing material or an adhesive. Further, while it is desired that an ionic impurity content, particularly a halogen ion content is small as the organic filler employed for the sealing material for a semiconductor or the adhesive for a semiconductor, the phenol resin is in the first place ordinarily polymerized in an aqueous medium with an ionic catalyst, and hence it has been difficult to obtain such a phenol resin hardened substance that the ionic impurity content is reduced to a degree applicable to a semiconductor use.

Japanese Patent Laying-Open No. 10-60068 (Patent Document 13) and Japanese Patent Laying-Open No. 2-245011 (Patent Document 14) describe phenol resins in which the contents of ionic impurities are reduced by specific washing treatments, and mention that these phenol resins are useful for application to sealing materials for semiconductors or the like. However, the phenol resins described in these documents are unhardened, and not employed as organic fillers. Further, the washing methods described in these documents cannot be employed for removal of an ionic impurity from a phenol resin hardened substance.

Patent Document 1: Japanese Patent Laying-Open No. 57-177011
Patent Document 2: Japanese Patent Laying-Open No. 2000-239335
Patent Document 3: Japanese Patent Laying-Open No. 50-98537
Patent Document 4: Japanese Patent Laying-Open No. 2001-114852
Patent Document 5: Japanese Patent Laying-Open No. 59-6208
Patent Document 6: Japanese Patent Laying-Open No. 2002-226534
Patent Document 7: Japanese Patent Laying-Open No. 10-338728
Patent Document 8: Japanese Patent Laying-Open No. 7-18043
Patent Document 9: Japanese Patent Laying-Open No. 11-172077
Patent Document 10: Japanese Patent Laying-Open No. 2000-269247
Patent Document 11: Japanese Patent Laying-Open No. 2002-226824
Patent Document 12: Japanese Patent Laying-Open No. 2004-168848
Patent Document 13: Japanese Patent Laying-Open No. 10-60068
Patent Document 14: Japanese Patent Laying-Open No. 2-245011

DISCLOSURE OF THE INVENTION

Problems to be Solved by the Invention

The present invention has been proposed in consideration of such a situation, and an object thereof is to provide a non-thermofusible phenol resin powder having a minute average particle diameter, containing no secondary aggregates, consisting of particles having a spherical shape, having a narrow particle size distribution, having a small free phenol content and having high safety and a method for producing the same.

Another object of the present invention is to provide a non-thermofusible phenol resin powder having high heat resistance, having a minute average particle diameter, capable of implementing reduction in viscosity when forming a sealing material or an adhesive and having a reduced ionic impurity content and a method for producing the same.

Still another object of the present invention is to provide a resin composition containing a non-thermofusible phenol resin powder having high heat resistance and low viscosity and having a reduced ionic impurity content, as well as a sealing material for a semiconductor and an adhesive for a semiconductor employing this resin composition.

Means for Solving the Problems

As a result of deep studies, the inventors have found that a non-thermofusible phenol resin powder having the aforementioned excellent characteristics can be obtained by reacting an aldehyde and a phenolic compound in an aqueous medium with an acidic catalyst of a high concentration in the presence of a protective colloidal agent and thereafter heating the reaction liquid.

The inventors have also found that it is necessary that the average particle diameter of the phenol resin powder is sufficiently small and the content of secondary aggregates resulting from aggregation of particles is small in order to implement reduction in viscosity in a phenol resin composition containing the phenol resin powder, and that a hardened phenol resin powder may be washed with an alcohol and/or an alkaline solution in order to reduce the content of an ionic impurity, particularly halogen ions in the hardened phenol resin powder. In other words, the present invention is as follows:

The non-thermofusible phenol resin powder according to the present invention has an average particle diameter of not more than 20 μm and a single particle ratio of at least 0.7. The average particle diameter is preferably not more than 10 μm. Definitions of the terms "non-thermofusible", "average particle diameter" and "single particle ratio" are described later.

In the non-thermofusible phenol resin powder according to the present invention, the coefficient of variation of a particle size distribution expressed in the following formula [1] is preferably not more than 0.65:

$$\text{coefficient of variation of particle size distribution} = (d_{84\%} - d_{16\%})/(2 \times \text{average particle diameter}) \quad [1]$$

where $d_{84\%}$ and $d_{16\%}$ represent particle sizes exhibiting cumulative frequencies of 84% and 16% in a frequency distribution obtained by laser diffraction scattering respectively.

In the non-thermofusible phenol resin powder according to the present invention, the sphericity of the particles is preferably at least 0.5.

In the non-thermofusible phenol resin powder according the present invention, further, the free phenol content is preferably not more than 500 ppm. Definitions of the aforementioned terms "sphericity" and "free phenol content" are described later. More preferably, the average particle diameter is not more than 10 μm, the coefficient of variation of the particle size distribution expressed in the above formula [1] is not more than 0.65, the sphericity is at least 0.5, and the free phenol content is not more than 500 ppm in the non-thermofusible phenol resin powder according to the present invention.

In the non-thermofusible phenol resin powder according to the present invention, a chlorine content is preferably not more than 500 ppm, more preferably not more than 100 ppm.

The present invention provides a method for producing a non-thermofusible phenol resin powder, including (1) a phenol resin powder forming step of forming a phenol resin powder by reacting an aldehyde and a phenolic compound in an aqueous medium in the presence of an acidic catalyst having a molar concentration of at least 2.0 mol/L in a reaction liquid and a protective colloidal agent, (2) a non-thermofusibilizing step of forming a non-thermofusible phenol resin powder by heating the reaction liquid containing the phenol resin powder, and (3) a separating-washing step of separating the non-thermofusible phenol resin powder from the reaction liquid and washing the same. This method is suitably applied as a method for producing the aforementioned non-thermofusible phenol resin powder according to the present invention.

Preferably, the aforementioned acidic catalyst is hydrochloric acid, and the aforementioned aldehyde is formaldehyde, paraformaldehyde or a mixture of these.

Preferably, the feed molar ratio of the aforementioned phenolic compound with respect to the aforementioned aldehyde is not more than 0.9. Preferably, the aforementioned protective colloidal agent is a water-soluble polysaccharide derivative.

The separating-washing step may include a step of washing the said non-thermofusible phenol resin powder with at least one liquid medium selected from an alcohol and an alkaline solution. Thus, a non-thermofusible phenol resin powder having a chlorine content of not more than 500 ppm can be obtained.

Preferably, washing with the alcohol is performed at a temperature exceeding the glass transition temperature of the aforementioned non-thermofusible phenol resin powder.

Further, the present invention provides a thermosetting resin composition containing the inventive non-thermofusible phenol resin powder whose chlorine content is not more than 500 ppm, epoxy resin and a hardening agent. The thermosetting resin composition according to the present invention may further contain an inorganic filler.

In addition, the present invention provides a sealing material for a semiconductor and an adhesive for a semiconductor consisting of the aforementioned thermosetting resin composition.

Effects of the Invention

According to the present invention, a non-thermofusible phenol resin powder having extremely minute particle diameters with an average particle diameter of not more than 20 μm and hardly containing secondary aggregates resulting from aggregation of these minute primary particles, i.e., having a high single particle ratio. Such a non-thermofusible phenol resin powder according to the present invention can be suitably employed as an additive for materials over various industrial fields such as a molding material, a paint, a refractory, papermaking, a friction material, an abrasive and an adhesive, particularly as an organic filler, or a precursor of a functional carbon material such as a carbon electrode material, activated carbon or a molecular sieve carbon.

According to the present invention, further, a non-thermofusible phenol resin powder having extremely minute particle diameters with an average particle diameter of not more than 20 μm, hardly containing secondary aggregates resulting from aggregation of these minute primary particles, and having a remarkably reduced chlorine ion content is provided. Such a non-thermofusible phenol resin powder according to the present invention can also be suitably used as an additive for materials over various industrial fields. In particular, a thermosetting resin composition employing this non-thermofusible phenol resin powder as an organic filler is extremely useful as a sealing material for a semiconductor and an adhesive for a semiconductor.

Further, the present invention provides a production method suitable for producing a non-thermofusible phenol resin powder having the aforementioned excellent characteristics. According to the inventive method for producing a non-thermofusible phenol resin powder, a non-thermofusible phenol resin powder having excellent characteristics can be produced with a relatively simple method, and the method according to the present invention is a method suitable for mass production.

Figure 1:
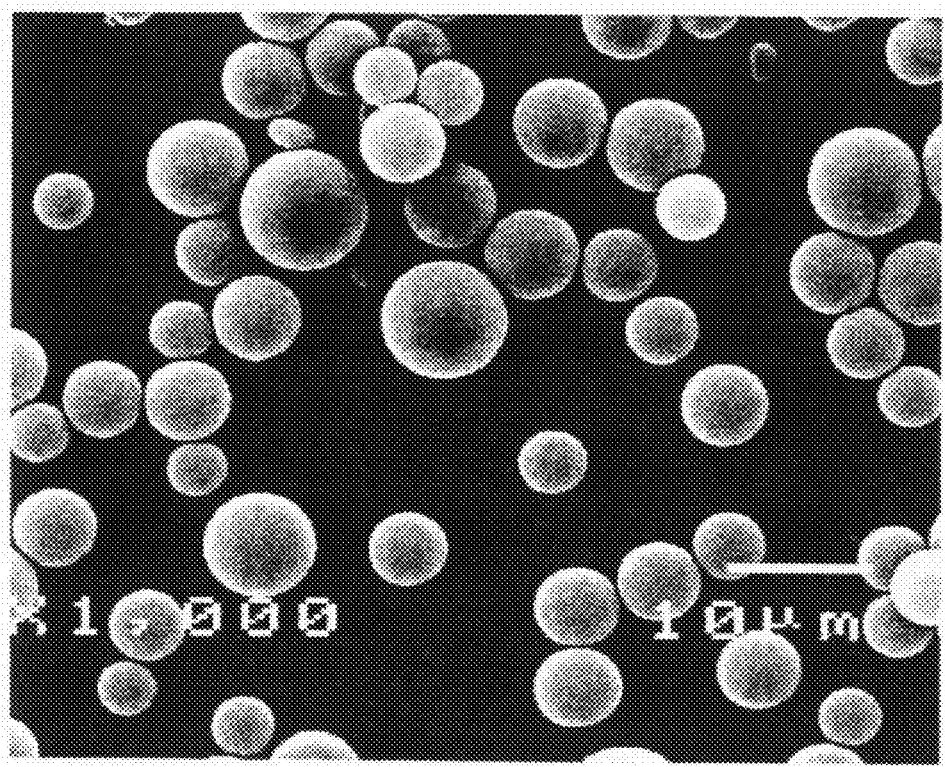
FIG. 1 is an SEM photograph of a preferred example of a non-thermofusible phenol resin powder according to the present invention.

DESCRIPTION OF THE REFERENCE SIGNS 101a, 101b adsorption tower, 102 compressor, 103 air dryer, 104 product tank, 105, 106a, 106b, 109a, 109b, 113a, 113b, 115a, 115b, 116, 305 electromagnetic valve, 107a, 107b, 108a, 108b, 110, 112, 114, 117, 317 pipe, 111 pressure regulator, 301 vacuum pump, 302, 303, 308, 316 valve, 304, 307 pressure indicator, 306 constant pressure valve, 309 gas regulator, 310 gas cylinder, 311 measurement chamber, 312 sample chamber, 313, 314 pressure sensor, 315 recorder, 601 slurried carbon electrode material, 602 collector, 603 separator, 604 spacer, 605 terminal plate.

BEST MODES FOR CARRYING OUT THE INVENTION

<Non-Thermofusible Phenol Resin Powder>

The non-thermofusible phenol resin powder according to the present invention is a non-thermofusible phenol resin consisting of a reaction product of a phenolic compound and an aldehyde, and characterized in that the average particle diameter of particles (also referred to as primary particles as a term with respect to secondary aggregates) is not more than 20 μm and a single particle ratio serving as an index as to the content of the secondary aggregates is at least 0.7. Thus, the average particle diameter of the phenol resin particles is set to not more than 20 μm, preferably not more than 10 μm, and the single particle ratio is set to at least 0.7, whereby the phenol resin powder can be filled with a higher filling factor when employed as an organic filler, and a filled substance such as a resin composition filled with this phenol resin powder has lower viscosity as compared with the prior art, and hence the same is easy to handle. Such reduction in viscosity of the resin composition satisfies prescribed properties of a sealing material or an adhesive recently required in the semiconductor field.

The phenol resin powder according to the present invention can be suitably employed also as a precursor of a functional carbon material such as activated carbon, a carbon electrode material or a molecular sieve carbon, for example. The average particle diameter of the phenol resin particles is set to not more than 20 μm, preferably not more than 10 μm, and the single particle ratio is set to at least 0.7, whereby a spatial filling property of carbon powder obtained by firing is remarkably improved. Therefore, performance of the functional carbon material per unit volume or the surface area per unit weight can be remarkably improved by employing the phenol resin powder according to the present invention. Further, a dispersion liquid prepared by dispersing the functional carbon material obtained from the phenol resin powder according to the present invention in a liquid medium such as water, for example, has such a characteristic that the same exhibits low viscosity also in a high-concentration region. The dispersion liquid having such a characteristic can be suitably employed when preparing a coated carbon electrode, for example. Such a non-thermofusible phenol resin powder according to the present invention can be applied not only to the aforementioned use but also over wide industrial fields of a molding material, a paint, a refractory, papermaking, a friction material, an abrasive and an adhesive.

While a method of pulverizing a hardened phenol resin can be listed as a conventional method for obtaining fine powder of a non-thermofusible phenol resin, the shape is so indeterminate that no granular substance having an excellent filling property can be obtained in this method.

FIG. 1 shows a scanning electron micrograph (hereinafter referred to as an SEM photograph) of a preferred example of the non-thermofusible phenol resin powder according to the present invention. As shown in FIG. 1, the non-thermofusible phenol resin powder according to the present invention is a phenol resin powder having minute particle diameters, and the quantity of secondary aggregates resulting from aggregation of these particles (primary particles) is small. The phenol resin powder shown in FIG. 1 is such a phenol resin powder that the average particle diameter defined below is 5 μm and the single particle ratio is 1.0.

The non-thermofusible phenol resin powder according to the present invention is described in detail. The non-thermofusible phenol resin powder according to the present invention is a non-thermofusible phenol resin consisting of a reaction product of a phenolic compound and an aldehyde. The reaction product of a phenolic compound and an aldehyde basically means a product obtained by addition reaction and condensation reaction of these. The reaction product may partially include a product obtained by addition reaction of a phenolic compound and an aldehyde. While the phenolic compound is not particularly restricted, phenol, naphthol, hydroquinone, resorcin, xylenol and pyrogallol can be listed, for example. The phenolic compound may be one type, or at least two types may be combined and employed. In particular, the phenolic compound is preferably phenol, in consideration of the balance between the performance of the obtained phenol resin and the cost.

While the aldehyde is not particularly restricted, formaldehyde, paraformaldehyde, glyoxal and benzaldehyde can be listed, for example. The aldehyde may be one type, or at least two types may be combined and employed. In particular, the aldehyde is preferably formaldehyde, paraformaldehyde or a mixture of these.

In this specification, "non-thermofusible" means that the phenol resin powder is not welded under a specific high-temperature pressurizing condition, and more specifically, the term is defined as such a property that the phenol resin powder does not form a flat plate, the phenol resin particles are not deformed, or the phenol resin particles do not adhere to each other by fusion and/or welding when about 5 g of a phenol resin powder sample is inserted between two stainless plates of 0.2 mm in thickness and pressed with a pressing machine previously heated to 100° C. with a total load of 50 kg for two minutes. Such a property can be supplied in production of the phenol resin powder by synthesizing the phenol resin by reaction of a phenolic compound and an aldehyde and thereafter crosslinking and hardening this phenol resin. Crosslinking and hardening can be performed by heating a reaction liquid performing the reaction of the phenolic compound and the aldehyde, for example.

Boiling methanol solubility of the non-thermofusible phenol resin powder according to the present invention is preferably less than 30%, more preferably less than 20%. In this specification, "boiling methanol solubility" denotes the content of a boiling methanol soluble component in the phenol resin powder, and more specifically, the term is defined as a value calculated by the following test. In other words, about 10 g of a phenol resin sample is precisely weighed, heated in about 500 mL of substantially anhydrous methanol under reflux for 30 minutes, thereafter filtrated through a glass filter of No. 3, and the residue on the glass filter is further washed with about 100 mL of anhydrous methanol. Then, the washed residue on the glass filter is dried at 40° C. for five hours, and this residue is thereafter precisely weighed. A value calculated through the following formula [2] is regarded as the "boiling methanol solubility":

> boiling methanol solubility (weight %)=(difference between weight of phenol resin sample and weight of dried residue)/(weight of phenol resin sample)×100     [2]

The "boiling methanol solubility", which is not a direct criterion as to whether or not this phenol resin has "non-thermofusibility", can be one index for learning the degree of thermofusibility of the phenol resin. In other words, the thermofusibility tends to be reduced as the "boiling methanol solubility" is reduced. If the boiling methanol solubility is equal to or exceeds 30%, the phenol resin may exhibit thermofusibility due to heating or pressurization in use, and the particles may be deformed or welded.

The average particle diameter of the particles (primary particles) constituting the non-thermofusible phenol resin powder according to the present invention is not more than 20 µm, preferably not more than 10 µm, as hereinabove described. The average particle diameter is so set to not more than 10 µm that a filling property and low viscosity in application of the phenol resin powder according to the present invention to an organic filler or a functional carbon material and low viscosity in application to a dispersion liquid can be further improved. In this specification, "average particle diameter" denotes a value of a cumulative frequency of 50% in a frequency distribution obtained by a measuring method employing a laser diffraction particle size measuring apparatus, i.e., laser diffraction scattering (Microtrac method). As the laser diffraction particle size measuring apparatus, Microtrac X100 by Nikkiso Co., Ltd. can be suitably employed.

If the average particle diameter of the non-thermofusible phenol resin particles exceeds 20 µm, the chlorine content may not be sufficiently reduced by a method for producing a non-thermofusible phenol resin powder according to the present invention described later. Also in this sense, the average particle diameter of the non-thermofusible phenol resin particles is preferably set to not more than 20 µm, more preferably set to not more than 10 µm.

The single particle ratio of the non-thermofusible phenol resin powder according to the present invention is at least 0.7, preferably at least 0.8. If the single particle ratio is less than 0.7, a filling property and low viscosity in application to an organic filler for a sealing material for a semiconductor or an adhesive for a semiconductor or a functional carbon material and low viscosity in application to a dispersion liquid tend to be insufficient. In this specification, "single particles" denote primary particles not forming secondary aggregates resulting from aggregation, and "single particle ratio" denotes a ratio in a case of dispersing the phenol resin powder in water droplets, making optical microscope observation and counting the total number of primary particles and the number of single particles in a randomly selected visual field containing about 300 primary particles, i.e., the number of single particles/the total number of primary particles.

The non-thermofusible phenol resin powder according to the present invention preferably has a narrow particle size distribution. More specifically, the coefficient of variation of the particle size distribution of the particles (primary particles) constituting the non-thermofusible phenol resin powder according to the present invention is preferably not more than 0.65. The coefficient of variation of the particle size distribution is more preferably not more than 0.6. In this specification, the "coefficient of variation of the particle size distribution" is a value calculated through the following formula [1]:

> coefficient of variation of particle size distribution=$(d_{84\%}-d_{16\%})/(2\times\text{average particle diameter})$     [1]

In the above formula [1], $d_{84\%}$ and $d_{16\%}$ represent particle sizes exhibiting cumulative frequencies of 84% and 16% in a frequency distribution obtained by laser diffraction scattering respectively, and the average particle diameter is the average particle diameter defined in the above. The coefficient of variation of the particle size distribution is so set to not more than 0.65 that a filling property and low viscosity in employment as an organic filler for a sealing material for a semiconductor or an adhesive for a semiconductor or a spatial filling property in application to a functional carbon material, for example, can be further improved, while a phenol resin powder applicable over wide industrial fields of a molding material, a paint, a refractory, papermaking, a friction material, an abrasive and an adhesive is provided. As the laser diffraction particle size measuring apparatus, Microtrac X100 by Nikkiso Co., Ltd. can be suitably employed.

In order to improve the performance of the sealing material for a semiconductor or the like, it is preferable the filling factor of a filler filled in binder resin is improved. As a method for improving the filling factor of a spherical filler, a method of blending fillers having different particle sizes can be listed. In other words, this is a method of performing blending/designing so that a smaller filler just enters between closest packing clearances of a larger filler. While fused silica is generally employed for a filler for a sealing material, for example, fused silica materials having different average particle diameters are mixed and used in order to improve the filling factor. In application of such a technique, a filler having a desired average particle diameter and having a narrow particle size distribution is required. According to the present invention, an organic filler for a sealing material for a semiconductor also applicable to such blending/designing can be provided. Further, in a specific field of an adhesive or the like employed for bonding an IC chip to a substrate, for example, there exists such a field that merely the presence of a very small quantity of a filler having a large particle diameter (i.e., having a wide particle size distribution) exerts bad influence on the thickness of a bonding layer to cause difficulty in use even if the average particle diameter is small. According to the present invention, a non-thermofusible phenol resin powder suitably applicable also in such a field can be provided.

The particle shape of the non-thermofusible phenol resin powder according to the present invention is preferably as close to a spherical shape as possible. More specifically, the sphericity is preferably at least 0.5, more preferably at least 0.7, particularly preferably at least 0.9. As the particle shape is closer to the spherical shape, i.e., as the sphericity is closer to 1.0, the filling property and the low viscosity in employment as the organic filler for a sealing material for a semiconductor or an adhesive for a semiconductor and the spatial filling property in application to the functional carbon material, for example, can be further improved, while a phenol resin powder applicable over wide industrial fields of a molding material, a paint, a refractory, papermaking, a friction material, an abrasive and an adhesive is provided. In this specification, "sphericity" denotes, in a case of randomly deciding a visual field containing about 300 primary particles in optical microscope observation, selecting 10 primary particles having the lowest aspect ratios (i.e., ratios of minor axes/major axes) and measuring the aspect ratios in projected profiles thereof as to the respective ones of these 10 primary particles, the average of these 10 aspect ratios.

The free phenol content in the non-thermofusible phenol resin powder according to the present invention is preferably not more than 500 ppm. This free phenol content is more preferably not more than 300 ppm, further preferably not more than 200 ppm. The free phenol content is so set to not more than 500 ppm that safety in handling of the phenol resin and safety of products in a case of applying this phenol resin to various products can be improved. In this specification, the "free phenol content" is defined as a value calculated by the following test: In other words, about 10 g of a phenol resin sample is precisely weighed, extracted in 190 mL of methanol under reflux for 30 minutes, and filtrated through a glass filter. The phenolic compound concentration in the filtrate is determined by liquid chromatography, and the weight of the phenolic compound in the filtrate is calculated. The ratio between the weight of this phenolic compound and the weight of the sample, i.e., the weight of the phenolic compound/the weight of the phenol resin sample is regarded as the "free phenol content".

Further, the chlorine content in the non-thermofusible phenol resin powder according to the present invention is preferably not more than 500 ppm. In the semiconductor field, halogen-free electronic material is required in view of safety with respect to the environment and health and in view of improvement of electronic characteristics and improvement of thin wire corrosiveness, and the chlorine content is preferably lower. If the chlorine content exceeds 500 ppm, the dielectric constant of a resin composition containing the non-thermofusible phenol resin powder is influenced, a lead wire or the like is easily corroded, and the non-thermofusible phenol resin powder does not satisfy characteristics required as a sealing material for a semiconductor or an adhesive for a semiconductor. The chlorine content is preferably not more than 100 ppm, and the non-thermofusible phenol resin powder can be more suitably employed for a sealing material for a semiconductor or an adhesive for a semiconductor with such a content. In this specification, the "chlorine content" is a chlorine content calculated by the following measuring method:

Measuring Apparatus: Fluorescent X-Ray Analyzer ZSX100E by Rigaku Corporation

Measuring Method: A measurement sample (non-thermofusible phenol resin particles) and binder powder for measurement are pressurized to form a pellet for measurement, and fluorescent X-ray analysis is thereafter performed in an EZ scan mode with the aforementioned measuring apparatus. A diffraction strength measured value of a chlorine K$\alpha$ ray is standardized from an estimated molecular formula ($C_7H_6O_1$) of a phenol resin hardened substance, and regarded as the chlorine content (wt/wt). While not only chlorine ions but also chlorine atoms of an organic chlorine compound or the like are included in the object of fluorescent X-ray measurement, no organic chlorine compound is intentionally added when the non-thermofusible phenol resin is produced by a method according to the present invention described later, for example, and hence it can be said that the chlorine content obtained by the fluorescent X-ray measurement is substantially equal to the chlorine ion content.

While the method for producing the non-thermofusible phenol resin powder having the aforementioned excellent characteristics is not particularly restricted, the following method can be suitably used. The following method for producing a non-thermofusible phenol resin powder is also included in the present invention.

<Method for Producing Non-Thermofusible Phenol Resin Powder>

The method for producing a non-thermofusible phenol resin powder according to the present invention preferably includes the following steps (1) to (3). The respective steps are now described in detail.

(1) A phenol resin powder forming step of forming a phenol resin powder by reacting an aldehyde and a phenolic compound in an aqueous medium in the presence of an acidic catalyst having a molar concentration of at least 2.0 mol/L in a reaction liquid and a protective colloidal agent, (2) a non-thermofusibilizing step of forming a non-thermofusible phenol resin powder by heating the reaction liquid containing the aforementioned phenol resin powder, and (3) a separating-washing step of separating the aforementioned non-thermofusible phenol resin powder from the reaction liquid and washing the same.

(1) Phenol Resin Powder Forming Step

In this step, the phenol resin powder is formed by reacting the aldehyde and the phenolic compound in the aqueous medium in the presence of the acidic catalyst and the protective colloidal agent. While the aldehyde is not particularly restricted, formaldehyde, paraformaldehyde, glyoxal and benzaldehyde can be listed, for example. The aldehyde may be one type, or at least two types may be combined and employed. In particular, the aldehyde is preferably formaldehyde, paraformaldehyde or a mixture of these. While one of the features of the method according to the present invention resides in the point that the acidic catalyst of a high concentration is employed as described later, paraformaldehyde is depolymerized under such a condition when paraformaldehyde which is a polymer of formaldehyde is employed as the aldehyde, and hence it is conceivably formaldehyde that substantially contributes to the reaction. The type of the used aldehyde and the loading thereof are preferably so selected that the aldehyde is dissolved in the aqueous medium in the reaction.

While the phenolic compound is not particularly restricted, phenol, naphthol, hydroquinone, resorcin, xylenol and pyrogallol can be listed, for example. The phenolic compound may be one type, or at least two types may be combined and employed. In particular, the phenolic compound is preferably phenol, in consideration of the balance between solubility in water and the performance of the obtained phenol resin and the cost. The type of the used phenolic compound and the loading thereof are preferably so selected that the phenolic compound is dissolved in the aqueous medium in the reaction.

More specifically, the loading (feed quantity) of the phenolic compound is preferably so selected that the concentration (weight ratio) of the phenolic compound with respect to the total weight of the reaction liquid is not more than 10 weight % when phenol or the like is employed as the phenolic compound, for example. When a phenolic compound (naphthol or the like, for example) having lower solubility in water is employed, a lower concentration is desirably employed, in order to guarantee dissolution in the aqueous medium in the reaction and make the phenol resin powder exhibit excellent characteristics (a minute average particle diameter and a high single particle ratio, for example). The "total weight of the reaction liquid" denotes the total weight of the phenolic compound, the aldehyde, the acidic catalyst, the protective colloidal agent and the aqueous medium. The concentration of the phenolic compound with respect to the total weight of the reaction liquid is so set to not more than 10 weight % that temperature control from the reaction initiation stage up to the phenol resin powder forming stage can be easily performed. In a case of initiating the reaction around ordinary temperature, for example, no excessive heat generation resulting from runaway reaction or the like is caused particularly in the initial stage of the reaction when the concentration of the phenolic compound is set to not more than 10 weight %, whereby a phenol resin powder having a small average particle diameter and inhibited from secondary aggregation can be formed while hardly performing temperature control. While the concentration (weight ratio) of the phenolic compound with respect to the total weight of the reaction liquid can be rendered higher than 10 weight %, the temperature control in the reaction must generally be properly performed in this case.

The loading (feed quantity) of the aforementioned aldehyde is preferably so selected that the feed molar ratio of the phenolic compound with respect to the aldehyde is not more than 0.9. The feed molar ratio of the phenolic compound with respect to the aldehyde is more preferably not more than 0.75, further preferably not more than 0.5. The feed molar ratio of the phenolic compound with respect to the aldehyde is so set to not more than 0.9 that a phenol resin powder having a minute average particle diameter, inhibited from secondary aggregation, closer to a spherical shape, having a narrow particle size distribution and having a small free phenol content can be formed. Further, secondary aggregation can be further suppressed by setting the feed molar ratio of the phenolic compound with respect to the aldehyde to not more than 0.75. In order to render these characteristics related to the phenol resin powder more excellent, the feed molar ratio of the phenolic compound with respect to the aldehyde is particularly preferably set to not more than 0.5. While the lower limit of the feed molar ratio of the phenolic compound with respect to the aldehyde is not particularly restricted but the feed molar ratio of the phenolic compound with respect to the aldehyde can be reduced by increasing the quantity of the aldehyde in the range dissolved in the aqueous medium, for example, the feed molar ratio of the phenolic compound with respect to the aldehyde is preferably at least 0.1 in consideration of the use efficiency of the raw material.

While the aforementioned aldehyde and the phenolic compound are reacted in the aqueous medium in this step, one of the features of the production method according to the present invention resides in the point that this reaction is performed with the acidic catalyst of a high concentration. This acidic catalyst is preferably a strong acidic catalyst. For example, hydrochloric acid, phosphoric acid and sulfuric acid can be listed as such a catalyst. In particular, hydrochloric acid is more preferable, in consideration of easiness in removal or side reaction in a case where the same remains. Acid with relatively high boiling point such as phosphoric acid or sulfuric acid can also be sufficiently used depending on the use of the phenol resin powder. The "high concentration" specifically means that the molar concentration of the acidic catalyst in the reaction liquid is at least 2.0 mol/L, more preferably at least 3 mol/L when the reaction is initiated around ordinary temperature. In the case of employing hydrochloric acid as the acidic catalyst, the "molar concentration of hydrochloric acid in the reaction liquid" denotes the concentration of hydrogen chloride in the reaction liquid. In order to obtain a phenol resin powder having a small average particle diameter and inhibited from secondary aggregation, particularly a phenol resin powder closer to a spherical shape, having a narrow particle size distribution and having a small free phenol content in addition thereto, the molar concentration of the acidic catalyst in the reaction liquid must be set to at least 2.0 mol/L when initiating the reaction around ordinary temperature. In view of a reaction rate suitable for industrial production and acid resistance of related facilities, the molar concentration of the acidic catalyst is preferably not more than 6 mol/L. The starting temperature for the reaction is so rendered higher than ordinary temperature that the molar concentration of the acidic catalyst necessary for attaining an equivalent reaction rate is slightly lower than that in a case where the reaction starting temperature is around ordinary temperature.

Another feature of the production method according to the present invention resides in the point that the reaction between the aldehyde and the phenolic compound is performed in the presence of the protective colloidal agent. The protective colloidal agent contributes to formation of the phenol resin powder. In order to form a phenol resin powder having a small average particle diameter and inhibited from secondary aggregation, particularly a phenol resin powder closer to a spherical shape, having a narrow particle size distribution and having a small free phenol content in addition thereto, it is necessary to use such a protective colloidal agent. In the present invention, a water-soluble protective colloidal agent is preferably used as the protective colloidal agent. For example, a water-soluble polysaccharide derivative can be suitably employed as the water-soluble protective colloidal agent. Specific examples of the suitably employable water-soluble polysaccharide derivative include alkaline metal salt or ammonium salt of carboxymethyl cellulose; natural starch adhesives mainly composed of a water-soluble polysaccharide derivative such as gum arabic, acacia, guar gum or locust bean gum. While the degree of carboxymethylation of cellulose is not particularly restricted when alkaline metal salt or ammonium salt of carboxymethyl cellulose is used, a product having a degree of carboxymethylation of about 75% is put on the market, and this can be suitably employed. When the protective colloidal agent is obtained as dry powder, this may be directly added to and dissolved in the reaction liquid, or an aqueous solution of the protective colloidal agent may be previously prepared and this may be added to the reaction liquid.

The loading of the aforementioned protective colloidal agent, not particularly restricted, is preferably 0.01 to 3 weight % of the loading of the aforementioned phenolic compound in solid weight. If the loading of the protective colloidal agent is less than 0.01 weight %, it is insufficient for setting the average particle diameter of the phenol resin particles to not more than 20 µm, and particle size control with another parameter such as the loading of the phenolic compound or a rate of stirring, for example, is required. In order to set the average particle diameter of the phenol resin particles to not more than 10 µm, the loading of the protective colloidal agent is preferably set to at least 0.04 weight % of the loading of the phenolic compound. If the loading of the protective colloidal agent is larger than 3 weight % of the loading of the phenolic compound, the separation rate tends to lower in the separating-washing step described later due to viscosity increase of the reaction liquid, and attention is required. It is to be specially mentioned that the average particle diameter of the phenol resin particles can be controlled by adjusting the loading of the protective colloidal agent if the loading of the protective colloidal agent is in the aforementioned range, particularly the loading of the protective colloidal agent is 0.02 to 1 weight % of the loading of the phenolic compound.

While water or a mixed solvent of water and an aqueous organic solvent can be listed as the aforementioned aqueous medium, a water solvent is preferably employed in the present invention. The loading of the aqueous medium is so selected that the concentration of the acidic catalyst is in the aforementioned range, and preferably so selected that the concentration of the phenolic compound is further in the aforementioned preferable range.

Specific methods for performing reaction with the aforementioned aldehyde, the phenolic compound, the acidic catalyst and the protective colloidal agent are now described. The following two methods can be listed as the specific methods for the reaction: (i) A method of preparing a mixed liquid by mixing the acidic catalyst, the protective colloidal agent and the aldehyde into the aqueous medium and thereafter adding the phenolic compound while stirring the mixed liquid, and (ii) a method of preparing a mixed liquid by mixing the protective colloidal agent, the aldehyde and the phenolic compound into the aqueous medium and thereafter adding the acidic catalyst while stirring the mixed liquid.

In each of the aforementioned methods (i) and (ii), the aforementioned mixed liquid is preferably a substantially homogeneous solution. In other words, the solutes mixed into the aqueous medium are preferably completely dissolved, or at least substantially completely dissolved. In the preparation of the mixed liquid, the order of mixing is not particularly restricted. The temperature for initiating the reaction of this mixed liquid, not particularly restricted, is preferably about 10 to 50° C., more preferably about 20 to 40° C.

In the aforementioned method (i), the reaction between the aldehyde and the phenolic compound is performed by adding the phenolic compound while stirring the aforementioned mixed liquid. The addition of the phenolic compound may be performed by directly adding the phenolic compound to the mixed liquid, or the phenolic compound may be previously dissolved in water, so that this aqueous solution is added to the mixed liquid. This reaction is preferably so controlled that the reaction temperature is about 10 to 60° C., preferably about 20 to 50° C. The reaction rate tends to be small if the reaction temperature is less than about 10° C., while there is a possibility of causing coarseness of the particle diameter or increase of the quantity of secondary aggregates if the reaction temperature exceeds 60° C. The temperature for initiating the reaction of the aforementioned mixed liquid is so set to about 20 to 30° C. around ordinary temperature and the concentration of the phenolic compound with respect to the total weight of the reaction liquid is so set to not more than 10 weight % as to cause no excessive heat generation, whereby the reaction can be performed in the aforementioned preferable temperature range while hardly performing temperature control.

In the aforementioned method (ii), the reaction between the aldehyde and the phenolic compound is performed by adding the acidic catalyst while stirring the aforementioned mixed liquid. The addition of the acidic catalyst may be performed at once, or may be performed by dropping over a constant time. Further, the addition of the acidic catalyst may be performed by directly adding the acidic catalyst to the mixed liquid (when employing hydrochloric acid as the acidic catalyst, concentrated hydrochloric acid may be directly added, for example), or the acidic catalyst (concentrated hydrochloric acid, for example) may be diluted with water, so that the diluted solution of the catalyst is added to the mixed liquid. The reaction temperature is preferably controlled to be about 10 to 60° C., preferably about 20 to 50° C., similarly to the case of the aforementioned (i).

While the reaction liquid is gradually clouded (suspended) and the phenol resin powder is formed as the reaction progresses in each of the aforementioned methods (i) and (ii), such clouding typically takes place after several 10 seconds to several minutes after the addition of the phenolic compound or the acidic catalyst. There is such a tendency that the time required for the clouding, i.e., precipitation of the phenol resin particles is shorter in the method (ii) than the method (i). While the reaction liquid typically turns pale pink to dark pink after the clouding, the reaction is preferably continued until such coloring is observed in the present invention. The time up to the coloring after the clouding is generally about several 10 minutes to several hours. While it has been necessary to stop stirring after precipitation of the phenol resin particles in the method described in the aforementioned Patent Document 1 in order to prevent the particles from aggregating into the form of sticky clumps, the stirring can be continuously performed as such also after precipitation of the phenol resin particles according to the inventive production method employing the protective colloidal agent. According to the inventive production method, therefore, the temperature of the reaction liquid can be more strictly controlled, and the reaction liquid can be subjected to the subsequent non-thermofusibilizing step in a state where the degree of polymerization and the degree of crosslinking of the phenol resin are uniform. This can contribute to the homogeneity of the finally obtained phenol resin powder.

(2) Non-Thermofusibilizing Step

In this step, the phenol resin powder is rendered non-thermofusible by heating the reaction liquid containing the aforementioned phenol resin powder. Such non-thermofusibility is brought by crosslinking and hardening of the resin resulting from the heating. The heating temperature for the reaction liquid in this step is preferably at least 60° C., more preferably at least 70° C. Further, the heating temperature for the reaction liquid is preferably not more than 100° C., more preferably not more than 90° C. If the heating temperature is less than 60° C., there is a possibility that sufficient non-thermofusibility is not obtained. The sufficient non-thermofusibility mentioned here means that the phenol resin powder has the "non-thermofusibility" defined in the above. If the heating temperature exceeds 100° C., on the other hand, there is a possibility that a reactor having a condenser is required or acid resistance of related facilities should be taken into consideration. Even if the heating temperature is at a relatively low level of about 60° C., sufficient non-thermofusibility can be supplied by providing a sufficient retention time. The phenol resin powder can be adjusted to a desired degree of polymerization and a desired degree of crosslinking in response to the use by adjusting the heating temperature and the heating time in the aforementioned preferable ranges.

The heating time, not particularly restricted so far as sufficient non-thermofusibility can be supplied to the phenol resin powder, is typically about several minutes to several hours, depending on the heating temperature. When advancing to the subsequent step after termination of this heat treatment, the reaction liquid may be cooled to a proper temperature, or the process may advance to the subsequent step as such without cooling the reaction liquid.

(3) Separating-Washing Step

In this step, the obtained non-thermofusible phenol resin powder is separated from the reaction liquid and washed. Filtration or compression, for example, can be suitably employed as the separating method. As an apparatus for such a separating operation, a filter, a centrifugal dehydrator, a belt press or a filter press can be employed, for example. A separating method utilizing evaporation such as reduced-pressure distillation or spray drying has a possibility of damaging the apparatus due to the reaction liquid containing the acidic catalyst of the high concentration. When performing the separating operation by filtration, a filter aid such as diatomaceous earth or a flocculant may be employed. The phenol resin powder according to the present invention has specific gravity of about 1.2 to 1.3 and sediments by still standing, and hence a preliminary operation such as decantation may be performed in advance of this separating operation.

Then, the separated phenol resin powder is washed. The reaction substantially completely terminates by this washing operation. As a specific method for the washing, (i) a method of adding a washing solution to a phenol resin cake separated by the aforementioned separating operation (pouring the washing solution on the separated phenol resin cake on the filter and removing the washing solution by gas purge or suction, for example), or (ii) a method of dispersing the separated phenol resin cake in the washing solution and thereafter performing the separating operation again can be listed, for example. As the washing solution, water can be suitably employed. The acidic component can be removed from the phenol resin cake by washing the same with water.

As a part of the washing operation, or in place of the aforementioned washing operation with water, neutralization reaction may be performed by bringing the phenol resin cake into contact with an aqueous solution exhibiting basicity. The neutralization reaction is so performed that the acidic catalyst component contained in the phenol resin cake can be effectively removed. As the aqueous solution exhibiting basicity employed for the neutralization reaction, an organic or inorganic weak basic solution is preferably employed. When employing a strong basic rich solution, there is a possibility that the phenol resin particles are discolored or dissolved. As the weak basic solution, a diluted solution of ammonia can be suitably employed, for example. This is because, when employing the diluted solution of ammonia, formed salt is water-soluble and hence this salt can be removed by water washing while the ammonia itself can be sublimated/removed by heating.

In order to extract/separate chlorine ions infiltrating into the phenol resin powder by the reaction, the separated phenol resin powder is preferably washed with an alcohol and/or an alkaline solution. In order to efficiently perform extraction/separation of the chlorine ions, the aforementioned washing with water for washing out the reaction liquid from the surface of the phenol resin or an operation of neutralizing the chlorine ions on the surface of the phenol resin with an alkaline solution may also be employed.

A washing solvent (washing solution medium) employed for extracting/separating the chlorine ions may be either the alcohol or the alkaline solution, or both may be employed. The chlorine ion content in the non-thermofusible phenol resin powder can be effectively reduced by the washing with the alcohol and/or the alkaline solution. More specifically, the chlorine content in the non-thermofusible phenol resin powder can be reduced to not more than 500 ppm, and it is also possible to reduce the chlorine content to not more than 100 ppm or lower than this.

It is to be specially mentioned that the chlorine ion content in the non-thermofusible phenol resin powder can be reduced by washing the same with the alcohol and/or the alkaline solution since the average particle diameter of the non-thermofusible phenol resin powder is sufficiently minute and the single particle ratio is high. In other words, it is difficult to reduce the chlorine content by washing the non-thermofusible phenol resin powder with the alcohol and/or the alkaline solution if the average particle diameter of the non-thermofusible phenol resin powder is large or the single particle ratio is low. Also in this point, therefore, it is required in the present invention that the average particle diameter of the non-thermofusible phenol resin powder is not more than 20 μm and the single particle ratio is at least 0.7.

As a preferred example of a specific method of the washing with the alcohol and/or the alkaline solution, a method of dispersing the non-thermofusible phenol resin powder separated from the reaction liquid in the washing solvent (washing solution medium) and stirring the same for a constant time can be listed. As hereinabove described, the non-thermofusible phenol resin powder separated from the reaction liquid may be previously prewashed with water or the like in advance of the washing with the alcohol and/or the alkaline solution. As a method of the prewashing, a method of dispersing the non-thermofusible phenol resin powder separated from the reaction liquid in a liquid medium such as water, for example, and stirring the same under ordinary temperature to a temperature of less than 100° C. can be listed. More preferably, heated water is employed for the prewashing. However, although the chlorine content can be reduced to some extent by this prewashing, it is impossible to reduce the chlorine content to not more than 500 ppm by only this prewashing or an extremely long time is required for reducing the chlorine content to not more than 500 ppm, and hence the washing with the alcohol and/or the alkaline solution is preferably performed, in order to sufficiently reduce the chlorine content.

The alcohol is not particularly restricted, but methanol, ethanol, n-propyl alcohol, isopropyl alcohol, n-butyl alcohol, isobutyl alcohol, s-butyl alcohol, t-butyl alcohol, ethylene glycol, diethylene glycol, triethylene glycol and propylene glycol can be listed, for example. As described later, the glass transition temperature of the non-thermofusible phenol resin powder according to the present invention is about 80 to 200° C., and if the extracting operation with the alcohol is performed in a region exceeding this temperature, the rate of extraction is remarkably increased. When performing extraction of chlorine with an alcohol having a low boiling point in such a preferred temperature region, an autoclave or the like must be used. When employing an alcohol having a high boiling point, the extracting operation in the aforementioned preferable temperature region can be performed at ordinary temperature, while a drying operation after the washing (extraction) can be complicated. In consideration of these points, ethylene glycol, having a well-balanced boiling point with respect to the glass transition temperature of the non-thermofusible phenol resin and allowing a simple washing (extracting) operation and a simple drying operation among the illustrated alcohols, can be preferably employed. As to the alcohol, only one type may be employed, or at least two types may be employed together.

The loading of the alcohol, not particularly restricted, can be set to at least 200 parts by weight with respect to 100 parts by weight of the solid content of the non-thermofusible phenol resin powder separated from the reaction liquid, for example.

Preferably, the washing temperature in the washing treatment employing the alcohol is equal to or exceeds the glass transition temperature of the non-thermofusible phenol resin powder, more preferably a temperature exceeding the glass transition temperature. The washing is so performed at the temperature being equal to or exceeding the glass transition temperature as to convert the non-thermofusible phenol resin powder to a rubber state, whereby the chlorine (particularly chlorine ions) contained in this phenol resin powder can be effectively extracted into the alcohol. The upper limit of the washing temperature, not particularly restricted, is preferably set to not more than 250° C., in order to avoid pyrolysis of the non-thermofusible phenol resin powder and the alcohol. The glass transition temperature of the non-thermofusible phenol resin powder according to the present invention is generally about 80 to 200° C.

A pressure condition in the washing with the alcohol is not particularly restricted, but the washing can be performed under ordinary pressure or under pressurization. When employing an alcohol having a relatively low boiling point, for example, the washing can be performed under pressurization, in order to set the washing temperature to a level being equal to or exceeding the glass transition temperature of the non-thermofusible phenol resin powder. The washing time, i.e., the stirring time for the non-thermofusible phenol resin powder dispersion liquid is not particularly restricted, but can be set to several minutes to several 10 hours, for example.

The aforementioned washing with the alcohol may be performed only once, or may be repeated a plurality of times, in order to attain the desired chlorine content.

The alkaline solution in the washing with the alkaline solution, not particularly restricted, is preferably a weak alkaline solution. When employing a strong alkaline rich solution, there is a possibility that the phenol resin particles are discolored or dissolved. Further, in addition to the above, a hydroxide solution of alkaline metal or alkaline earth metal, whose ionic component is nonvolatile, has a possibility of remaining also by the drying operation after the washing. As the weak alkaline solution, an ammonia solution, a pyridine solution or a dimethylamine solution can be suitably employed, for example. In particular, the ammonia solution, having high chlorine ion removability, is more preferable. The ammonia concentration in the ammonia solution, not particularly restricted, is preferably a concentration exceeding 0.5 weight % to 30 weight %, more preferably 1 to 25 weight %. If the ammonia concentration is not more than 0.5 weight %, the chlorine ions in the phenol resin powder cannot be effectively extracted into the ammonia solution. If the ammonia concentration exceeds 30 weight %, on the other hand, there is a possibility that the phenol resin particles are discolored or dissolved. If the ammonia concentration exceeds 30 weight %, further, the vapor pressure is so high that a condenser is required or employment of an autoclave is required depending on the washing temperature (extraction temperature).

The loading of the alkaline solution is not particularly restricted but can be set to at least 200 parts by weight with respect to 100 parts by weight of the solid content of the non-thermofusible phenol resin powder separated from the reaction liquid, for example, depending on the concentration of the contained alkaline substance.

The washing temperature in the washing treatment employing the alkaline solution is not particularly restricted, but the chlorine ions can be efficiently removed from the non-thermofusible phenol resin powder even at a temperature of less than the glass transition temperature of the non-thermofusible phenol resin powder. Needless to say, the washing may be performed at a temperature being equal to or exceeding the glass transition temperature of the non-thermofusible phenol resin powder. It may be generally possible to more effectively extract the chlorine in a short time by washing the non-thermofusible phenol resin powder at the temperature being equal to or exceeding the glass transition temperature. When performing the washing with the ammonia solution under a high temperature, an autoclave or the like is preferably used. The upper limit of the washing temperature, not particularly restricted, is preferably set to not more than 250° C., in order to avoid pyrolysis of the non-thermofusible phenol resin powder. The upper limit is more preferably not more than 100° C.

The pressure condition in the washing with the alkaline solution is not particularly restricted, but the washing can be performed under ordinary pressure or under pressurization. Further, the washing time, i.e., the stirring time for the non-thermofusible phenol resin powder dispersion liquid is not particularly restricted, but can be set to several minutes to several 10 hours, for example.

The aforementioned washing with the alkaline solution may be performed only once, or may be repeated a plurality of times, in order to attain desired chlorine content.

According to the present invention, it is also preferable to wash the non-thermofusible phenol resin powder with both of the alcohol and the alkaline solution, in order to sufficiently reduce the chlorine content. In this case, "with both of the alcohol and the alkaline solution" includes i) a method of employing a mixed liquid of the alcohol and the alkaline solution as the washing solvent, ii) a method of washing the non-thermofusible phenol resin powder with the alcohol and thereafter washing the same with the alkaline solution, and iii) a method of washing the non-thermofusible phenol resin powder with the alkaline solution and thereafter washing the same with the alcohol. Among these, the methods ii) and iii) are preferable, while the method iii) is more preferable since the chlorine content can be sufficiently reduced and an alkaline substance derived from the employed alkaline solution can also be removed.

In the present invention, a step (post-washing step) of washing the non-thermofusible phenol resin powder with a liquid medium different from the alcohol and the alkaline solution is preferably provided after the aforementioned washing with the alcohol and/or the alkaline solution. This liquid medium preferably contains substantially no ionic impurity, and pure water or ion-exchanged water can be listed as such a liquid medium, for example. The alcohol or the alkaline solution adhering to the non-thermofusible phenol resin powder and salt formed by the neutralization reaction between the alkaline solution and the acidic catalyst are removed by this post-washing. Solid-liquid separation between the phenol resin powder and the washing solution after the washing with the alcohol and/or the alkaline solution or after the post-washing step can be performed similarly to the aforementioned separating step.

The washed phenol resin powder can be used in the state containing the liquid medium without being dried, and such a non-thermofusible phenol resin powder containing the liquid medium also belongs to the range of the present invention. For example, a phenol resin powder containing water can be used in a case of preparing a water dispersion liquid or the like. Alternatively, a drying step may be provided after the washing step. When employed as an organic filler, the non-thermofusible phenol resin powder is preferably dried. While the method of drying is not particularly restricted, a method employing a tray type static dryer, a flash dryer or a fluidized-bed dryer can be listed, for example. Drying is so performed that non-thermofusible phenol resin powder exhibiting excellent fluidity with a liquid medium content of not more than about 5% can be obtained. While a phenol resin powder having a high single particle ratio can be obtained according to the inventive method by performing slight pulverizing if necessary, the single particle ratio may be further improved with a pulverizer or the like in or after the aforementioned drying step.

According to the aforementioned inventive method for producing a non-thermofusible phenol resin powder, a non-thermofusible phenol resin powder having an average particle diameter of not more than 20 μm, particularly not more than 10 μm, having a single particle ratio of at least 0.7 and preferably having a chlorine content of not more than 500 ppm can be produced by a relatively simple method and by a method suitable for mass production. According to the inventive production method, further, a non-thermofusible phenol resin powder having these characteristics as well as having a narrow particle size distribution, having spherical particles and having an extremely small free phenol content can be produced, and it is also possible to reduce the chlorine ion content to not more than 100 ppm. Such a non-thermofusible phenol resin powder according to the present invention can be suitably employed for a semiconductor use, for example.

<Thermosetting Resin Composition>

The thermosetting resin composition according to the present invention contains the aforementioned non-thermofusible phenol resin powder according to the present invention, epoxy resin and a hardening agent. The chlorine content in the non-thermofusible phenol resin powder is preferably not more than 500 ppm. This thermosetting resin composition contains the inventive non-thermofusible phenol resin powder reduced in chlorine content, particularly in chlorine ion content, whereby the same is supplied with high heat resistance, dynamical performance etc. belonging to the phenol resin, and can be suitably employed as a sealing material for a semiconductor and an adhesive for a semiconductor. The high heat resistance of the thermosetting resin composition not only results from the high heat resistance belonging to the non-thermofusible phenol resin powder itself, but also results from that the non-thermofusible phenol resin powder and the epoxy resin form a composite. In other words, the non-thermofusible phenol resin powder and the epoxy resin form a tough composite due to reaction between a hydroxyl group of a phenol skeleton belonging to the non-thermofusible phenol resin powder and a glycidyl group of the epoxy resin. The strength on the interface between the non-thermofusible phenol resin powder and the epoxy resin increases due to the formation of such a composite, whereby the thermosetting resin composition according to the present invention has extremely excellent heat resistance. It is also one factor for the high heat resistance that the difference between the linear expansion coefficients of the non-thermofusible phenol resin powder and the epoxy resin is small.

In the thermosetting resin composition according to the present invention, the loading of the non-thermofusible phenol resin powder which is an organic filler, not particularly restricted, can be set to 20 to 900 parts by weight with respect to 100 parts by weight of the total quantity of the epoxy resin and a hardening agent therefor when employing the epoxy resin as binder resin, for example. When employing the thermosetting resin composition as a sealing material for a semiconductor or an adhesive for a semiconductor, the loading of the non-thermofusible phenol resin powder is preferably set to 60 to 500 parts by weight, more preferably set to 300 to 400 parts by weight with respect to 100 parts by weight of the total quantity of the epoxy resin and the hardening agent therefor. If the loading is less than 20 parts by weight with respect to 100 parts by weight of the total quantity of the epoxy resin and the hardening agent therefor, the effect of supplying heat resistance tends to be hard to obtain. If the loading exceeds 900 parts by weight, on the other hand, a dense structure is hard to obtain since the phenol resin powder is non-thermofusible, and the application is generally limited to a use requiring no denseness. If the non-thermofusible phenol resin powder in a quantity exceeding 500 parts by weight is added with respect to 100 parts by weight of the total quantity of the epoxy resin and the hardening agent therefor, excellent fluidity may not be obtained as the sealing material for a semiconductor or the adhesive for a semiconductor.

As the epoxy resin, a well-known one can be employed, and glycidyl ether type epoxy resin of phenol can be suitably employed, for example. Specific examples are bisphenol A (or AD, S or F) glycidyl ether, hydrogenated bisphenol A glycidyl ether, ethylene oxide adduct bisphenol A glycidyl ether, propylene oxide adduct bisphenol A glycidyl ether, glycidyl ether of phenol novolac resin, glycidyl ether of cresol novolac resin, glycidyl ether of bisphenol A novolac resin, glycidyl ether of naphthalene resin, trifunctional (or tetrafunctional) glycidyl ether, glycidyl ether of dicyclopentadiene phenol resin, glycidyl ester of dimer acid, trifunctional (or tetrafunctional) glycidyl amine and glycidyl amine of naphthalene resin. These can be used singly or in a combination of at least two types.

The hardening agent is added for hardening the aforementioned epoxy resin. The hardening agent for the epoxy resin is not particularly restricted, but a well-known one can be used. Specific examples are a phenolic compound, aliphatic amine, cycloaliphatic amine, aromatic polyamine, polyamide, aliphatic acid anhydride, cycloaliphatic acid anhydride, aromatic acid anhydride, dicyandiamide, organic acid dihydrazide, boron trifluoride amine complex, imidazole and tertiary amine, for example.

The loading of the hardening agent, not particularly restricted, can be set in the range generally used in this field, and can be set to 5 to 200 parts by weight with respect to 100 parts by weight of the epoxy resin, for example. However, the hardening agent, generally added by a weight corresponding to the epoxy equivalent of the epoxy resin, is preferably added by a loading slightly smaller than the weight corresponding to the epoxy equivalent in the present invention. This is because the non-thermofusible phenol resin powder reacts with the glycidyl group of the epoxy group on the surface thereof or in the vicinity of the surface as hereinabove described and hence the hardening agent is rendered excessive if the hardening agent is added by the epoxy equivalent. The excess hardening agent may exert bad influence such as reduction of a thermophysical property or a bleed. The quantity to be reduced, not necessarily sayable since the same depends on the type of the epoxy resin, the loading of the non-thermofusible phenol resin powder, the type of the hardening agent and the like, can be set to about 5 to 10% of the weight corresponding to the epoxy equivalent of the epoxy resin.

The thermosetting resin composition according to the present invention may further contain a hardening accelerator. As the hardening accelerator, a well-known one can be used, and imidazole, dicyandiamide derivative, dicarboxylic acid dihydrazide, triphenylphosphine, tetraphenylphosphonium tetraphenylborate, 2-ethyl-4-methyl imidazole-tetraphenylborate and 1,8-diazabicyclo[5.4.0]undecene-7-tetraphenylborate can be listed, for example. The loading of the hardening accelerator, not particularly restricted, can be set to 0 to 30 parts by weight with respect to 100 parts by weight of the epoxy resin, for example.

The thermosetting resin composition according to the present invention may contain another additive other than the above. For example, an antifoaming agent, a leveling agent, a coloring agent, a diluent (organic solvent or the like), a viscosity modifier, a surface active agent, a light stabilizer, an antioxidant, a fire retardant assistant, thermoplastic resin and thermosetting resin other than the epoxy resin can be listed as another additive. The thermosetting resin composition according to the present invention may further contain another organic filler other than the non-thermofusible phenol resin powder according to the present invention or an inorganic filler. For example, carbon and a rubber-based filler (acrylonitrile butadiene rubber filler, silicone rubber filler or the like) can be listed as another organic filler. On the other hand, a metal filler such as silver powder, gold powder, copper powder and nickel powder; silica (fused silica, crushed silica or fumed silica), alumina, boron nitride, titania, glass, iron oxide, ceramic, calcium silicate and mica can be listed as the inorganic filler.

The thermosetting resin composition according to the present invention can be obtained by mixing and kneading the non-thermofusible phenol resin powder, the epoxy resin, the hardening agent and another additive added if necessary with a triple roll mill or a ball mill.

When employing the thermosetting resin composition according to the present invention as an adhesive for a semiconductor, it is also preferable to mold the thermosetting resin composition into a film, in order to improve workability in semiconductor production or the like. As a method for preparing an adhesive film, a method of forming a layer of the resin composition by applying the thermosetting resin composition onto a substrate, drying the same and thereafter removing the substrate can be listed, for example. The drying temperature, not particularly restricted, can be set to about 50 to 200° C., for example.

<Carbon Electrode Material Powder>

According to the present invention, a carbon electrode material powder having an extremely minute particle diameter, having a narrow particle size distribution and hardly containing secondary aggregates resulting from aggregation of these minute primary particles, i.e., having a high single particle ratio is provided. Such a carbon electrode material powder according to the present invention, improved in capacitance per unit volume and output density, can be suitably employed as an electrode material for an electric double layer capacitor, a lithium ion battery and a lithium ion capacitor.

The lithium ion battery is generally charged/discharged by using a carbonaceous material for a negative electrode, using a lithium-containing compound for a positive electrode and moving lithium ions between the positive electrode and the negative electrode. The electric double layer capacitor is charged/discharged by adsorption/desorption of electrolytic ions by using carbonaceous materials having relatively large specific surface areas for a positive electrode and a negative electrode. In a recently proposed lithium ion capacitor, a carbonaceous material, having a relatively large specific surface area, similar to that of an ordinary capacitor is used for a positive electrode, while a carbonaceous material similar to that of the lithium ion battery is used for a negative electrode. The lithium ion capacitor, charged/discharged by adsorption/desorption of lithium ions and electrolytic ions, is noted as a new type of capacitor improving the energy density of the electric double layer capacitor.

In order to further improve the performance of the lithium ion battery, the electric double layer capacitor and the lithium ion capacitor, development of a carbon electrode material improved in performance, i.e., a carbon electrode material having a high capacitance per unit volume and a high output density is indispensable. In general, various studies have been made in order to obtain such a carbon electrode material improved in performance, and carbon material powders having small particle diameters have been proposed in order to improve a filling property per unit volume or to improve a contact interface area with an electrolyte. However, none can be regarded as having a sufficient spatial filling property, and hence further improvement has been required as to the carbon electrode material, in order to obtain a lithium ion battery or the like further improved in performance.

The carbon electrode material powder according to the present invention is characterized in that the average particle diameter is not more than 10 µm, the single particle ratio is at least 0.7, and the coefficient of variation of the particle size distribution expressed in the above formula [1] is not more than 0.65. The sphericity of the carbon electrode material particles is preferably at least 0.5. According to the present invention, a carbon electrode material powder mixture obtained by mixing at least two types of carbon electrode material powders according to the present invention having different average particle diameters is provided.

The carbon electrode material powder according to the present invention is now described in detail. In the carbon electrode material powder according to the present invention, the average particle diameter of the particles (also referred to as primary particles, as a term with respect to the secondary aggregates) is not more than 10 µm. The average particle diameter is so reduced to not more than 10 µm that the outer surface areas of the carbon particles enlarge. Thus, the infiltration frequency of lithium ions or electrolytic ions into the carbon particles increases, while the diffusion length of these ions in the carbon electrode material shortens, whereby the comings and goings of the ions in charging/discharging quicken, and the output density can be improved as a result. Further, it is possible to improve the filling density of the carbon electrode material by combining a carbon electrode material having a smaller average particle diameter and a larger carbon electrode material with each other at a proper ratio as described later, whereby the capacitance per unit volume can be increased. While the lower limit of the average particle diameter is not particularly restricted, solid-liquid separation may be rendered difficult in production of non-thermofusible phenol resin particles preferably employed as the raw material for the carbon electrode material powder according to the present invention if the same is excessively minute. If the average particle diameter is excessively minute, further, a slurry may cause reduction of fluidity based on dilatancy and reduction of coating efficiency may be observed when producing an electrode coated with activated carbon by using the carbon electrode material powder for preparing the slurry and applying this onto a collector. In such a viewpoint, therefore, the average particle diameter of the carbon electrode material powder is preferably at least 0.5 µm, more preferably at least 1 µm.

The "average particle diameter" of the carbon electrode material powder has the same meaning as the "average particle diameter" as to the phenol resin powder defined in the above.

The carbon electrode material powder according to the present invention has a narrow particle size distribution, and more specifically, the coefficient of variation of the particle size distribution of the particles (primary particles) constituting the carbon electrode material powder according to the present invention is not more than 0.65. The coefficient of variation of the particle size distribution is more preferably not more than 0.6. The "coefficient of variation of the particle size distribution" has the same meaning as the "coefficient of variation of the particle size distribution" as to the phenol resin powder defined in the above, i.e., denotes a value calculated according to the above formula [1].

While it is possible to improve the filling density of the carbon electrode material by combining the carbon electrode material having the smaller average particle diameter and the larger carbon electrode material with each other at the proper ratio as hereinabove described, it is difficult to obtain a sufficiently high filling density and hence the improvement of the capacitance is insufficient if the particle size distributions of these carbon electrode material powders are wide (the coefficients of variation exceed 0.65).

The single particle ratio of the carbon electrode material powder according to the present invention is at least 0.7, preferably at least 0.8. If the single particle ratio is less than 0.7 and a large quantity of secondary aggregates are present, clearances are formed between the primary particles, and the filling density lowers. Particularly when carbon electrode materials having different average particle diameters are so mixed with each other as to improve the filling density, it becomes difficult to fill up the clearances between the primary particles with the carbon electrode material having the smaller average particle diameter, and hence not only the filling density cannot be improved but also the fluidity of the slurry tends to lower when the carbon electrode material is slurried with an electrolyte. The "single particle ratio" of the carbon electrode material powder has the same meaning as the "single particle ratio" as to the phenol resin powder defined in the above.

Figure 8:
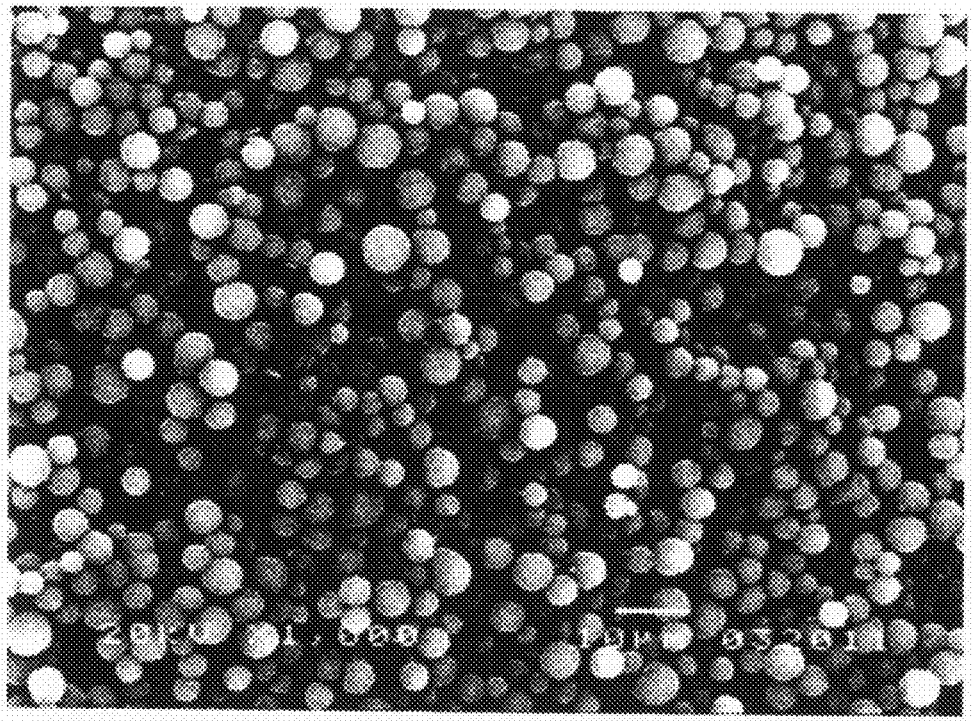
FIG. 8 is an SEM photograph of a preferred example of a carbon electrode material powder according to the present invention.

FIG. 8 shows a scanning electron micrograph (hereinafter referred to as an SEM photograph) of a preferred example of the carbon electrode material powder according to the present invention. As shown in FIG. 8, the carbon electrode material powder according to the present invention is a phenol resin powder having minute particle diameters, has a small quantity of secondary aggregates resulting from aggregation of the particles (primary particles), and exhibits a narrow particle size distribution. The carbon electrode material powder shown in FIG. 8 has an average particle diameter of 4 μm, a single particle ratio of 0.98 and a coefficient of variation of the particle size distribution of 0.51.

The particle shape of the carbon electrode material powder according to the present invention is preferably as close to a spherical shape as possible. More specifically, the sphericity is preferably at least 0.5, more preferably at least 0.7, particularly preferably at least 0.9. As the particle shape is closer to the spherical shape, i.e., as the sphericity is closer to 1.0, the filling density of the carbon electrode material powder can be more improved, and fluidity of a slurry in a case of slurrying the carbon electrode material with an electrolyte can be more improved. The "spherical shape" has the same meaning as the "spherical shape" as to the phenol resin powder defined in the above.

The specific surface area of the carbon electrode material powder according to the present invention measured according to the BET method by nitrogen adsorption, not particularly restricted, is preferably 1 to 500 $m^2/g$, more preferably 1 to 200 $m^2/g$, further preferably 1 to 50 $m^2/g$ if the carbon electrode material powder is used as a negative electrode material for a lithium ion battery or a lithium ion capacitor. If the specific surface area exceeds 500 $m^2/g$, the ratio of a discharge capacity with respect to a charge capacity tends to lower. If the carbon electrode material powder is used as an electrode material for an electric double layer capacitor, the specific surface area is preferably 600 to 2300 $m^2/g$, more preferably 800 to 2000 $m^2/g$. Infiltration of electrolytic ions into pores tends to be not smoothly performed if the specific surface area is less than 600 $m^2/g$, while it follows that large pores other than the pores utilized for adsorption/desorption of the electrolytic ions are formed and there is such a tendency that the density of the electrode material lowers and no sufficient capacitance can be ensured if the specific surface area exceeds 2300 $m^2/g$.

The raw material for the carbon electrode material powder according to the present invention is not particularly restricted so far as a carbon electrode material having the aforementioned specific characteristics can be obtained, but a well-known raw material can be used. As such a raw material, thermosetting resin such as phenol resin, melamine resin, urea resin and epoxy resin can be listed, for example. The carbon electrode material powder is preferably obtained by firing (carbonizing) and/or activating a powder of this resin. The phenol resin is preferable in a point of a residual carbon ratio among the aforementioned resins, and the aforementioned non-thermofusible phenol resin powder according to the present invention is particularly preferably employed.

When employing the non-thermofusible phenol resin powder according to the present invention as the raw material for the carbon electrode material powder, the boiling methanol solubility thereof is preferably less than 30%, more preferably less than 20%. While the sphericity and the single particle ratio of the carbon electrode material powder can be basically controlled by adjusting the raw material composition and reaction conditions in production of the phenol resin powder serving as the raw material, the sphericity and the single particle ratio of the obtained carbon electrode material powder can be improved also by employing a phenol resin powder whose boiling methanol solubility is less than 30%.

Further, the free phenol content in the non-thermofusible phenol resin powder serving as the raw material is preferably not more than 500 ppm. This free phenol content is more preferably not more than 300 ppm, further preferably not more than 200 ppm. The free phenol content is so set to not more than 500 ppm that formation of fine cracks following the firing and reduction of the residual carbon ratio can be suppressed or avoided, and a carbon electrode material powder having a sharp pore size distribution after activation can be obtained. Further, the free phenol is harmful to the human body and the environment, and hence such a phenol resin powder is so employed that a production method having high safety with respect to the human body and the environment is provided.

When employing the carbon electrode material powder according to the present invention as an electrode material for an electric double layer capacitor, a lithium ion battery and a lithium ion capacitor, at least two types of carbon electrode material powders having different average particle diameters may be mixed and employed. According to the inventive production method described later, the average particle diameter of the carbon electrode material powder can be controlled to a desired value, whereby a carbon electrode material powder having a desired average particle diameter as well as a sharp particle size distribution and a high single particle ratio can be provided. The "types" in "at least two types" denotes the difference between the average particle diameters. At least two types of carbon electrode material powders having different average particle diameters are so mixed and employed that the carbon electrode material having the smaller average particle diameter can enter clearances of the carbon electrode material having the larger average particle diameter, whereby the filling density of the carbon electrode material can be improved. The optimum mixing ratio in the case of mixing at least two types of carbon electrode material powders having different average particle diameters, depending on the average particle diameters etc. of these carbon electrode materials, cannot be generally determined, but is preferably so properly set that the capacitance per unit volume most increases in response to the average particle diameters etc. of the mixed carbon electrode materials.

In the case of obtaining a carbon electrode material mixture by mixing at least two types of carbon electrode material powders having different average particle diameters, at least one carbon electrode material component must be the carbon electrode material according to the present invention. In order to effectively attain the effects of improving the filling density and the output density, all carbon electrode material components are preferably the carbon electrode material according to the present invention. In other words, the average particle diameters of all mixed carbon electrode material components are so set to not more than 10 μm that the output density of the carbon electrode material mixture can be effectively improved as a whole. When the particle size distribution of each carbon electrode material component is sharp, it follows that clearances constituted of particles having a larger average particle diameter exhibit a substantially constant magnitude and mixture design of mixing smaller particles having proper magnitudes capable of filling up the clearances is so enabled that the filling property of the carbon electrode material mixture can be simply improved as a whole. In a case of mixing electrode material components having wider particle size distributions, on the other hand, it follows that clearances constituted of particles having a larger average particle diameter are distributed in various magnitudes, while it is difficult to produce finer particles having particle size distributions for properly filling up the clearances of such various magnitudes. Even if it is possible to obtain electrode material components having such complicated particle size distributions, such an inconvenience takes place that a specific mixing operation is necessary for storing all particles in clearances corresponding to the respective particle diameters or a long time is required for the mixing. In view of improvement in the filling property, all carbon electrode components are preferably close to a spherical shape (sphericity of at least 0.5).

A method for producing the carbon electrode material powder is now described. The following method for producing a carbon electrode material powder according to the present invention is suitably employed as a method for producing the aforementioned carbon electrode material powder according to the present invention. According to the inventive method, the average particle diameter of the obtained carbon electrode material powder can be controlled by adjusting the concentration of a protective colloidal agent. According to the inventive method, further, a carbon electrode material having a minute average particle diameter, a narrow particle size distribution and a high single particle ratio can be obtained without performing mechanical crushing on a phenol resin serving as an intermediate material and the carbon electrode material.

The method for producing a carbon electrode material powder according to the present invention includes the following steps (a) to (d):

(a) A phenol resin powder forming step of forming a phenol resin powder by reacting an aldehyde and a phenolic compound in an aqueous medium in the presence of an acidic catalyst having a molar concentration of at least 2.0 mol/L in a reaction liquid and a protective colloidal agent, (b) a non-thermofusibilizing step of forming a non-thermofusible phenol resin powder by heating the reaction liquid containing the phenol resin powder, (c) a separating step of separating the non-thermofusible phenol resin powder from the reaction liquid, and (d) a firing step of firing the non-thermofusible phenol resin powder.

While the respective steps are now described in detail, the steps (a) to (c) are similar to those of the aforementioned method for producing a non-thermofusible phenol resin powder, and hence the same are described with partial omission.

A strong acidic catalyst such as hydrochloric acid, phosphoric acid or sulfuric acid is preferably employed as the acidic catalyst in the phenol resin powder forming step, and hydrochloric acid is more preferable. This is because the hydrochloric acid is an acid in the form of gas and can be easily removed by a drying operation and hence oxidation reaction by a residual acid component less exerts bad influence on surface chemical characteristics and strength of the phenol resin powder.

The loading of the protective colloidal agent in the phenol resin powder forming step is preferably set to at least about 0.04 weight % of the loading of the phenolic compound in solid weight. If the loading of the protective colloidal agent is less than 0.04 weight %, it is insufficient for setting the average particle diameter of the carbon electrode material powder to not more than 10 μm, and particle size control with another parameter such as the loading of the phenolic compound or a rate of stirring, for example, is required. The upper limit of the loading of the protective colloidal agent, not particularly restricted, is preferably not more than 3 weight % of the loading of the phenolic compound. If the loading is larger than 3 weight %, the separation rate tends to lower in the separating step or the like described later due to viscosity increase of the reaction liquid, although a carbon electrode material powder having an average particle diameter of not more than 10 μm can be obtained.

After the separating step, a step of washing the separated phenol resin powder may be provided. As a specific method for the washing, (i) a method of adding a washing solution to a phenol resin cake separated by the aforementioned separating step (pouring the washing solution on the separated phenol resin cake on a filter and removing the washing solution by gas purge or suction, for example), or (ii) a method of dispersing the separated phenol resin cake in the washing solution and thereafter performing the separating operation again can be listed, for example. As the washing solution, water can be suitably employed. The acidic component can be removed from the phenol resin cake by washing the same with water.

As a part of the washing operation, or in place of the aforementioned washing operation with water, neutralization reaction may be performed by bringing the phenol resin cake into contact with an aqueous solution exhibiting basicity. The neutralization reaction is so performed that the acidic catalyst component etc. adhering to the surface of the phenol resin powder can be effectively removed. As the aqueous solution exhibiting basicity employed for the neutralization reaction, an organic or inorganic weak basic solution is preferably employed. When employing a strong basic rich solution, there is a possibility that the phenol resin particles are discolored or dissolved. As the weak basic solution, an ammonia solution can be suitably employed, for example. When employing the ammonia solution, formed salt is water-soluble, and hence this salt can be removed by water washing. Further, a minute quantity of residual salt can also be sublimated/removed by heating.

In the non-thermofusible phenol resin powder obtained in the aforementioned manner, the coefficient of variation of the particle size distribution is typically not more than 0.65, and the single particle ratio is at least 0.7. The average particle diameter can also be set to a desired value in the range of not more than 20 μm, for example, by adjusting the loading of the protective colloidal agent. The average particle diameter of the particles is reduced to some extent (typically by about 30 percent) by the subsequent firing step and/or an activating step, and hence the average particle diameter of the non-thermofusible phenol resin powder must be controlled in consideration of this point. The characteristics (the average diameter, the particle size distribution, the single particle ratio etc.) of the carbon electrode material powder depend on the characteristics of the non-thermofusible phenol resin powder which is the intermediate material. According to the inventive method, the characteristics of the non-thermofusible phenol resin powder can be controlled to proper ranges, whereby a carbon electrode material powder having characteristics desirable as an electrode material for an electric double layer capacitor, a lithium ion battery and a lithium ion capacitor can be suitably obtained. According to the aforementioned method, further, a non-thermofusible phenol resin powder having an extremely small free phenol content (not more than 500 ppm) can be produced. The carbon electrode material powder obtained with such a non-thermofusible phenol resin powder has a sharp pore size distribution.

The firing step is now described. The firing (carbonization) of the non-thermofusible phenol resin powder is performed under a non-oxidizing atmosphere of inert gas such as nitrogen, argon or helium in a temperature range of 500 to 2500° C., preferably 500 to 1200° C., more preferably 550 to 1000° C. When performing an activation treatment after the firing step, the firing temperature is preferably set to not more than about 900° C., so that activation can be efficiently progressed. As an apparatus for performing the firing, a well-known apparatus such as an electric furnace or an external heating gas furnace can be employed, for example.

The activation treatment is performed continuously to the firing step, if necessary. The temperature for the activation treatment is 500 to 1100° C., preferably 800 to 1000° C., more preferably 850 to 950° C. If the temperature for the activation treatment is higher than 1100° C., reduction of the residual carbon ratio or the like may result from oxidation of the surface of the carbon electrode material or oxidation of the carbon skeleton. If the temperature is lower than 500° C., on the other hand, pore formation by the activation treatment does not sufficiently progress.

Oxygen, carbon dioxide, steam or mixed gas of at least two types of these, or atmosphere gas of nitrogen, argon or helium or combustion gas of methane, propane or butane containing such gas can be employed for the activation treatment. The activation treatment is preferably so performed that the weight reduction ratio of the carbon material resulting from the activation is 5 to 90%. In a case of forming relatively large pores referred to as mesopores, the activation treatment may be performed by properly adding a metal such as nickel, cobalt or iron or a metallic compound. Further, chemical activation of adding a chemical such as potassium hydroxide or zinc chloride may be performed.

When performing the firing and/or the activation treatment by employing the non-thermofusible phenol resin powder obtained through the aforementioned steps (a) to (c) as such, the phenol resin particles may fly in a firing furnace or the like and these may be discharged along with exhaust gas, to cause reduction of the yield or reduction of operability. In this case, the primary particles may be granulated into particles having proper strength and magnitude, in advance of the firing step. In the granulation, coal tar, pitch, creosote oil, liquefied phenol resin, liquefied melamine resin, polyvinyl alcohol, starch, crystalline cellulose powder or methyl cellulose can be employed as a binder. These may be singly employed, or at least two types may be combined and employed.

The granulation can be performed by homogeneously mixing the non-thermofusible phenol resin powder and the binder with each other in a mixer such as a kneader and thereafter molding the mixture into a granular substance with a wet extrusion granulator, a vertical granulator, a semidry disc pelleter or a granulating machine. The molding, generally performed at room temperature, may be executed under heating if the quantity of a pitch component or the like is large. The granulated substance, not particularly restricted in shape and magnitude, can be worked into a columnar shape of about 0.5 to 5 mm in diameter and 1 to 10 mm in length or a spherical shape of about 0.1 to 10 mm in diameter, for example. In order to improve the workability in the mixing and the molding, a surface active agent such as ethylene glycol, polyoxyethylene alkyl ether, polyoxyethylene fatty ester or polycarboxylate ammonium salt, a hardening agent such as liquefied thermosetting resin, a paste such as polyvinyl alcohol or a plasticizer for extrusion granulation may be added, for example. The strength of the granulated substance is at a level capable of holding the shape to some extent during the firing and/or the activation treatment and pulverizable after termination of these treatments. The pulverizing can be performed with a crusher or a pulverizer such as a ball mill, a vibration mill, a rotor mill, a hammer mill or a jet mill, for example.

<Molecular Sieve Carbon>

According to the present invention, a molecular sieve carbon suitably employed for a nitrogen generator, particularly a pressure swing adsorption (hereinafter abbreviated as PSA) nitrogen generator is provided.

In recent years, pressure swing adsorption (PSA) has been developed and put into practice as the technique of separating nitrogen and oxygen contained in air from each other. The PSA is a method for separating a specific component from source gas by filling up at least one adsorption tower with an adsorbent such as a molecular sieve carbon and periodically repeating selective adsorption under pressurization and reproduction of the adsorbent such as the molecular sieve carbon under decompression or under ordinary pressure. The gas separating ability of the molecular sieve carbon is considered as resulting from the difference between adsorption rates of respective adsorbed substances in a specific combination of an adsorbed substance having a molecular diameter close to the pore diameter of the molecular sieve carbon and an adsorbed substance having a molecular diameter smaller than the same.

While a PSA nitrogen generator for air separation employing a molecular sieve carbon as an adsorbent is of an ordinary temperature separation system, advantageous in cost as compared with a cryogenic separation system nitrogen generator depending on the loading of nitrogen or used purity thereof and widely industrially employed, improvement in performance of the PSA nitrogen generator, particularly the molecular sieve carbon is required in order to render the same usable for a larger number of uses and in order to obtain nitrogen at a lower cost, and various molecular sieve carbons have been proposed in recent years.

However, although there is prior art mentioning a constant range of the diameters of carbon primary particles constituting a pellet-type molecular sieve carbon, the average particle diameter of the carbon primary particle diameters and the width of the particle size distribution thereof have not been heretofore taken into consideration.

This is because the density of an aggregate of carbon primary particles having a wide particle size distribution generally tends to be high depending on the particle size distribution and such a property has been considered as advantageously acting on the performance of the molecular sieve carbon. Further, the situation that it has been difficult to industrially produce a resin material for a molecular sieve carbon having a particle size range controlled in units of several μm, particularly a spherical resin raw material and the situation that it has been difficult to work the spherical resin raw material having the particle size range controlled in units of several μm into a pellet-type molecular sieve carbon of about 0.5 to 5 mm in particle diameter preferable as an adsorbent can also be listed as the reasons therefor. In addition, the situation that the particle diameters cannot be controlled in units of several μm in a case of reducing the particle diameters by crushing a raw material having large particle diameters and the situation that a raw material in units of several μm cannot be classified into a narrow particle size distribution even if classification or the like is employed for controlling the particle size distribution and hence it has been difficult to industrially narrow the particle size distribution of the raw material having the particle diameters in units of several μm can also be listed as the reasons.

According to the present invention, a molecular sieve carbon employing carbon particles exhibiting minute particle diameters and having a narrow particle size range as primary particles and enabling remarkable improvement in efficiency as compared with a conventional molecular sieve carbon is provided.

In other words, the molecular sieve carbon according to the present invention is a molecular sieve carbon having such a structure that a large number of carbon primary particles three-dimensionally irregularly overlap and coalesce with each other, in which the average particle diameter of the carbon primary particles is not more than 10 μm, while the coefficient of variation of the particle size distribution of the carbon primary particles expressed in the following formula [3] is not more than 0.65 and a particle bulk density is 0.7 to 1.2 g/cc.

$$\text{coefficient of variation of particle size distribution of carbon primary particles}=(\text{standard deviation of carbon primary particle diameters})/(\text{average particle diameter of carbon primary particles}) \quad [3]$$

Preferably in the molecular sieve carbon according to the present invention, the adsorption after 60 seconds from measurement initiation per unit weight of the molecular sieve carbon in single component adsorption performed with oxygen gas at 25° C. under a pressure of 0.3 MPa is 24 to 28 mg/g, and the adsorption after 10 seconds from measurement initiation per unit weight of the molecular sieve carbon in single component adsorption performed with nitrogen gas at 25° C. under a pressure of 0.3 MPa is 0.5 to 5 mg/g. The carbon primary particles are preferably spherical.

Such a molecular sieve carbon according to the present invention is so used as an adsorbent for a PSA nitrogen generator separating nitrogen from mixed gas, such as air, for example, of oxygen and nitrogen that improvement in the nitrogen yield per unit weight of the molecular sieve carbon can be attained due to improvement in the nitrogen recovery resulting from improvement in nitrogen gas purity.

The molecular sieve carbon according to the present invention is now described in detail. The molecular sieve carbon according to the present invention is a pellet-type carbonized article, generally obtained by molding raw material powder with a binder component or the like and thereafter carbonizing/firing the same, having such an internal structure that a large number of carbon primary particles three-dimensionally irregularly overlap and coalesce with each other. This pellet, not particularly restricted in shape, can be worked into a rod shape such as a columnar shape or a granular shape such as a spherical shape, for example. The diameter and the length (height) thereof are preferably set to about 0.5 to 3 mm respectively in the case of a columnar-shaped pellet, while the diameter thereof is preferably set to about 0.5 to 3 mm in the case of a granular pellet. The carbon primary particles denote fine carbon particles forming the pellet-type molecular sieve carbon obtained by carbonizing phenol resin powder or the like which is the raw material powder.

The molecular sieve carbon according to the present invention can be used as an adsorbent for a PSA nitrogen generator separating nitrogen from mixed gas, such as air, of oxygen and nitrogen, and can also be used for separation of various gas mixtures such as separation of perfluorocarbon, separation of methane and carbon dioxide and purification of hydrogen.

The average particle diameter of the carbon primary particles is not more than 10 μm, and the coefficient of variation of the particle size distribution of the carbon primary particles expressed in the above formula [3] is not more than 0.65. The coefficient of variation of the particle size distribution of the carbon primary particles is preferably not more than 0.6.

The average particle diameter of the carbon primary particles is so set to not more than 10 μm that a molecular sieve carbon having a higher adsorption and a higher adsorption rate of oxygen while having high separative power for oxygen/nitrogen can be produced. This is conceivably because the yield of pyrolysis gas per primary particle is so reduced in a pore forming step such as carbonization that the number of fine pores formed on the surfaces of the carbon primary particles increases and the diffusion rate of the adsorption gas in the carbon primary particles quickens due to the small particle diameters. Therefore, when the molecular sieve carbon is employed as the adsorbent for the PSA nitrogen generator, for example, the nitrogen recovery and the quantity of the product nitrogen gas per unit weight of the molecular sieve carbon can be improved. The lower limit of the average particle diameter, not particularly restricted, is preferably at least 0.5 μm, in consideration of productivity in industrial production and safety. The shape of the carbon primary particles, not particularly restricted so far as the same is granular, is preferably spherical, in order to form more homogeneous pores when the raw material is heated at 500 to 1100° C. In the present invention, "spherical" may not necessarily be truly spherical, but the sectional shape may be elliptical, for example. However, it is advantageous that the shape of the raw material is close to a true spherical shape for formation of homogeneous pores and for production stability of molding in industrial production, and homogeneity in external diffusion of the pyrolysis gas in pore formation in the step of carbonization or the like further increases, and hence the shape of the carbon primary particles is also preferably closer to the true spherical shape.

In the present invention, the "average particle diameter of the carbon primary particles" denotes, in a case of randomly selecting visual fields as to a molecular sieve carbon surface and a rupture phase respectively in observation through a scanning electron microscope (hereinafter abbreviated as SEM) photograph and arbitrarily selecting 100 carbon primary particles confirmable as spherical as to each visual field, the average of the particle diameters of these 200 carbon primary particles measured from the SEM photograph. Further, the "standard deviation of carbon primary particle diameters" denotes the standard deviation as to the particle diameters of the aforementioned 200 carbon primary particles confirmable as spherical.

The molecular sieve carbon according to the present invention, constituted of the carbon primary particles having such a narrow particle size distribution that the coefficient of variation of the particle size distribution expressed in the above formula [3] is not more than 0.65, is superior in separative power for mixed gas of oxygen and nitrogen as compared with a conventional molecular sieve carbon. This is because the particle size distribution of the carbon primary particles is so narrowed to reduce the particle diameter difference between the respective carbon primary particles that the yield of pyrolysis gas or the like is rendered constant in the pore forming step at the time of carbonizing the raw material or the like. Therefore, the pores formed in the carbon primary particles are conceivably homogenized between the respective carbon primary particles. It can also be considered as one factor that the depths of the pores included in the carbon primary particles are homogenized between the respective carbon primary particles and hence the diffusion rate of the adsorption gas is rendered substantially constant between the respective carbon primary particles.

In the molecular sieve carbon according to the present invention, the particle bulk density is 0.7 to 1.2 g/cc, preferably 0.8 to 1.15 g/cc. The particle bulk density is calculated from the volume and the weight of the pellet-type molecular sieve carbon. The carbon content in the molecular sieve carbon is preferably at least 80 weight %, more preferably at least 85 weight %.

The molecular sieve carbon according to the present invention has a function of selectively adsorbing oxygen from source gas mainly composed of oxygen and nitrogen. As to the absorption characteristic thereof, the adsorption after 60 seconds from measurement initiation per unit weight of the molecular sieve carbon in single component adsorption performed with oxygen gas at 25° C. under a pressure of 0.3 MPa (gauge pressure) is preferably 24 to 28 mg/g. In other words, the molecular sieve carbon according to the present invention exhibits a high oxygen adsorption (adsorption rate) in one preferred mode thereof. Further, the adsorption after 10 seconds from measurement initiation per unit weight of the molecular sieve carbon in single component adsorption performed with nitrogen gas at 25° C. under a pressure of 0.3 MPa (gauge pressure) is preferably 0.5 to 5 mg/g, more preferably 1.5 to 5 mg/g. In other words, the molecular sieve carbon according to the present invention exhibits a low nitrogen adsorption rate in one preferred mode thereof. While the separation accuracy of oxygen/nitrogen separation tends to lower if the nitrogen adsorption in an initial stage (for several seconds, for example) is large, such reduction of the separation accuracy can be suppressed by reducing the adsorption after 10 seconds from the measurement initiation. Further preferably, the aforementioned oxygen adsorption after 60 seconds is 24 to 28 mg/g, and the aforementioned nitrogen adsorption after 10 seconds is 0.5 to 5 mg/g in the molecular sieve carbon according to the present invention.

The molecular sieve carbon according to the present invention can be obtained by molding raw material powder with a binder component or the like and thereafter carbonizing/firing the same. While the raw material powder is not restricted so far as the average particle diameter and the coefficient of variation of the particle size distribution of the carbon primary particles constituting the molecular sieve carbon can satisfy the aforementioned ranges, the aforementioned non-thermofusible phenol resin powder in which the particle diameters and the coefficient of variation of the particle size distribution are controlled is preferably employed.

When employing a non-thermofusible phenol resin powder as the raw material powder, the boiling methanol solubility thereof is preferably less than 30%, more preferably less than 20%, further preferably less than 10%. While the boiling methanol solubility may be at least 30%, the phenol resin powder may no longer exhibit "non-thermofusibility" in this case.

It is also preferable to employ a thermofusible phenol resin powder as the raw material powder. In this case, the boiling methanol solubility thereof is preferably less than 50%. The "boiling methanol solubility" can be one index for learning the degree of thermofusibility of the phenol resin powder. In other words, the thermofusibility tends to be reduced as the "boiling methanol solubility" is reduced. While the phenol resin powder may exhibit thermofusibility due to heating or pressurization in use and the particles may be deformed or welded when the boiling methanol solubility exceeds 30%, the phenol resin powder exhibits remarkable thermofusibility and there is a possibility that pores are not sufficiently formed therein due to deformation or welding of the particles in the carbonization or formed pores are blocked when the boiling methanol solubility exceeds 50%. The "boiling methanol solubility" mentioned here denotes the boiling methanol solubility expressed in the above formula [2].

The definition of the "non-thermofusibility" is as described above. The "thermofusibility" means that the phenol resin powder is fused when about 5 g of a phenol resin powder sample is inserted between two stainless plates of 0.2 mm in thickness and pressed with a total load of 50 kg for two minutes with a pressing machine previously heated to 100° C., and is more specifically defined as such a property that the phenol resin powder forms a flat plate by fusion and/or welding under the aforementioned high-temperature pressurization condition. A phenol resin powder exhibiting the "thermofusibility" defined as such exhibits a thermosetting property at a temperature higher than 100° C., such as a temperature of at least about 120° C., for example. The "thermosetting property" means that the phenol resin powder gelates in a gel time test of 180° C.

The average particle diameter of the particles (also referred to as primary particles as a term with respect to secondary aggregates) constituting the non-thermofusible or thermofusible phenol resin powder is preferably not more than 12 μm. Carbon primary particles having an average particle diameter of not more than 10 μm can be formed by employing a phenol resin powder having an average particle diameter of not more than 12 μm as the raw material powder. The definition of the "average particle diameter" of the non-thermofusible and thermofusible phenol resin powders is identical to the definition of the "average particle diameter" of the aforementioned non-thermofusible phenol resin powder.

Preferably, the non-thermofusible or thermofusible phenol resin powder employed in the present invention has a narrow particle size distribution, and more specifically, the coefficient of variation of the particle size distribution of the particles (primary particles) constituting the phenol resin powder defined in the above formula [1] is not more than 0.65. The coefficient of variation of the particle size distribution is more preferably not more than 0.6.

The coefficient of variation of the particle size distribution expressed in the above formula [1] is so set to not more than 0.65 that the coefficient of variation of the particle size distribution of the carbon primary particles can be set to not more than 0.65, whereby a molecular sieve carbon excellent in separative power for mixed gas can be obtained as a result. While the coefficient of variation as to the carbon primary particles and the coefficient of variation as to the phenol resin powder are different in measurement condition from each other, it has been confirmed that, when employing such a phenol resin powder that the coefficient of variation of the above formula [1] is not more than 0.65, carbon primary particles constituting the obtained molecular sieve carbon satisfy the coefficient of variation of not more than 0.65 of the above formula [3].

The single particle ratio of the non-thermofusible or thermofusible phenol resin powder is preferably at least 0.7, more preferably at least 0.8. If the single particle ratio is less than 0.7, gas generation by pyrolysis in the carbonization treatment is rendered heterogeneous while the shapes and the distribution of the pores formed by the pyrolysis are also rendered heterogeneous, and the separative power for the mixed gas tends to lower as a result. The definitions of the "single particles" and the "single particle ratio" are as described above.

The particle shape of the non-thermofusible or thermofusible phenol resin powder is preferably as close to a spherical shape as possible. More specifically, the sphericity is preferably at least 0.5, more preferably at least 0.7, particularly preferably at least 0.9. As the particle shape is closer to a spherical shape, i.e., as the sphericity is closer to 1.0, improvement in the density of a pellet-type molecular sieve carbon obtained by molding a homogeneous mixture with a binder component or the like and carbonizing the same can be attained. Further, the shapes and the distribution of the pores formed by generation of pyrolysis gas in the carbonization treatment can be rendered more homogeneous, whereby the separative power for the mixed gas can be further improved. The definition of the "sphericity" is as described above.

Further, the free phenol content in the non-thermofusible or thermofusible phenol resin powder is preferably not more than 1000 ppm. This free phenol content is more preferably not more than 500 ppm, further preferably not more than 400 ppm. Safety in handling of the phenol resin powder can be improved by setting the content of the free phenol which is a harmful component to not more than 1000 ppm. The definition of the "free phenol content" is as described above.

A method for producing a phenol resin powder preferably employed as the raw material for the aforementioned molecular sieve carbon according to the present invention is now described. A non-thermofusible phenol resin powder can be suitably produced by the aforementioned method according to the present invention. At this time, the loading of the protective colloidal agent is preferably at least about 0.05 weight % of the loading of the aforementioned phenolic compound in solid weight. If the loading of the protective colloidal agent is less than about 0.05 weight %, it is insufficient for setting the average particle diameter of the phenol resin powder to not more than 12 μm, and particle size control with another parameter such as the loading of the phenolic compound or a rate of stirring, for example, is required. The upper limit of the loading of the protective colloidal agent, not particularly restricted, is preferably not more than 3 weight % of the loading of the phenolic compound. If the upper limit is larger than 3 weight %, the separation rate tends to lower in a separating step described later or the like due to viscosity increase of the reaction liquid.

A thermofusible phenol resin powder can be obtained by omitting the non-thermofusibilizing step in the aforementioned method for producing a non-thermofusible phenol resin powder according to the present invention. A separating-washing step is similar to that for the non-thermofusible phenol resin powder.

While the washed non-thermofusible or thermofusible phenol resin powder may be used as the raw material for the molecular sieve carbon in the hydrous state without being dried, the same is preferably dried.

A method for producing a molecular sieve carbon according to the present invention is now described. The method according to the present invention is preferably applied for producing the aforementioned molecular sieve carbon according to the present invention. The method for producing a molecular sieve carbon according to the present invention includes the following steps:

(i) A step of obtaining a molded substance by molding a homogeneous mixture containing such a phenol resin powder that the average particle diameter is not more than 12 μm and the coefficient of variation of the particle size distribution is not more than 0.65 and a binder component, and (ii) a step of obtaining a carbonized molded substance by heating the molded substance under a non-oxidizing atmosphere at a temperature in the range of 500 to 1100° C.

(i) Molding Step

In this step, a pellet-type molded substance is obtained by homogeneously mixing such a phenol resin powder that the average particle diameter is not more than 12 μm and the coefficient of variation of the particle size distribution is not more than 0.65, a binder component and another component, if necessary, with each other and thereafter molding the mixture. The phenol resin powder is as described above, and more preferably further has a single particle ratio of at least 0.7, sphericity of at least 0.5 and a free phenol content of not more than 1000 ppm.

As the binder component, polyvinyl alcohol, a water-soluble or water-swelling cellulose derivative and coal tars can be listed. Specific examples of the water-soluble or water-swelling cellulose derivative are methyl cellulose, carboxymethyl cellulose and hydroxypropyl methyl cellulose. As the coal tars, coal tar, coal tar pitch, creosote oil and a mixture of at least two types of these can be listed. Thermosetting resin such as phenol resin or melamine resin may be added as another binder component.

The content of the binder component is preferably about 1 to 50 parts by weight, more preferably 1 to 30 parts by weight with respect to 100 parts by weight of the phenol resin powder.

Starch, a derivative thereof or a denatured substance thereof, for example, can be used as well as the binder component. The component such as starch suitably acts as a pore forming material, and is pyrolyzed to participate in formation of pores in the carbonization under the non-oxidizing atmosphere. Specific examples of starch etc. are starch such as potato starch or cornstarch; a starch derivative such as esterified starch, etherified starch or crosslinked starch; and denatured starch such as enzyme-denatured dextrine, for example. The content of the starch, the derivative thereof or the denatured substance thereof is preferably about 1 to 50 parts by weight, more preferably 1 to 30 parts by weight with respect to 100 parts by weight of the phenol resin powder.

In a range not damaging the characteristics of the molecular sieve carbon, a small quantity of a surface active agent such as ethylene glycol, polyoxyethylene alkyl ether, polyoxyethylene fatty ester or polycarboxylate ammonium salt; a hardening agent such as liquefied thermosetting resin; a crosslinking agent such as polyvinyl alcohol; a plasticizer for extrusion granulation; coconut shell powder; coal powder; or another synthetic resin, for example, can be added in order to improve the workability.

A ribbon mixer, a V type mixer, a cone mixer or a kneader, for example, can be employed for the preparation of the homogeneous mixture. Further, a granulation method such as extrusion granulation, rolling granulation or compression granulation can be employed as a method for molding the homogeneous mixture into the pellet. The pellet-type molded substance, not particularly restricted in shape, can be worked into a rod shape such as a columnar shape or a granular shape such as a spherical shape, for example. The diameter and the length (height) thereof are preferably set to about 0.5 to 3 mm respectively in the case of a columnar-shaped pellet, while the diameter thereof is preferably set to about 0.5 to 3 mm in the case of a granular pellet.

(ii) Carbonization Step

In this step, the carbonized molded substance is obtained by heating the aforementioned pellet-type molded substance under the non-oxidizing atmosphere at the temperature in the range of 500 to 1100° C. The temperature in the carbonization is preferably 650 to 850° C. There is such a tendency that only a carbonized substance not having a sufficient adsorption capacity and poor in selective adsorptivity is obtained if the carbonization temperature is less than 500° C., while there is such a tendency that pores of the obtained carbonized substance are contracted and a sufficient adsorption capacity is hard to obtain if the carbonization temperature is higher than 1100° C. The heating time can be set to 1 to 24 hours, for example, and is preferably 1 to 12 hours. Nitrogen or argon can be listed as the gas employed for the non-oxidizing atmosphere.

While a still standing, fluidized or pivoted heating furnace can be employed as the heating furnace for the carbonization treatment, a pivoted rotary kiln is preferably employed.

After the aforementioned carbonization treatment, a heat treatment may be performed again at a temperature of not more than 500° C. or at a temperature of not more than 1100° C., in order to adjust the characteristics of the molecular sieve carbon. Alternatively, the characteristics of the molecular sieve carbon may be adjusted by pulverizing the pellet-type molded substance obtained by the aforementioned carbonization treatment, mixing the same with the binder component or the like again, granulating the same and thereafter performing a heat treatment again.

The molecular sieve carbon according to the present invention can be suitably employed as an adsorbent for a nitrogen generator. As the nitrogen generator, a nitrogen generator separating nitrogen gas by a PSA system of supplying source gas mainly composed of oxygen and nitrogen, for example, to an adsorption tower filled with the molecular sieve carbon according to the present invention and repeating a high-pressure adsorption step and a low-pressure reproduction step in the adsorption tower can be preferably listed. The molecular sieve carbon according to the present invention is so employed that improvement of the quantity of the product nitrogen gas per unit weight of the molecular sieve carbon can be attained due to improvement of the nitrogen recovery resulting from improvement of the nitrogen gas purity, as compared with a conventional nitrogen generator. The nitrogen generator according to the present invention is now described with reference to a PSA nitrogen generator.

Figure 14:
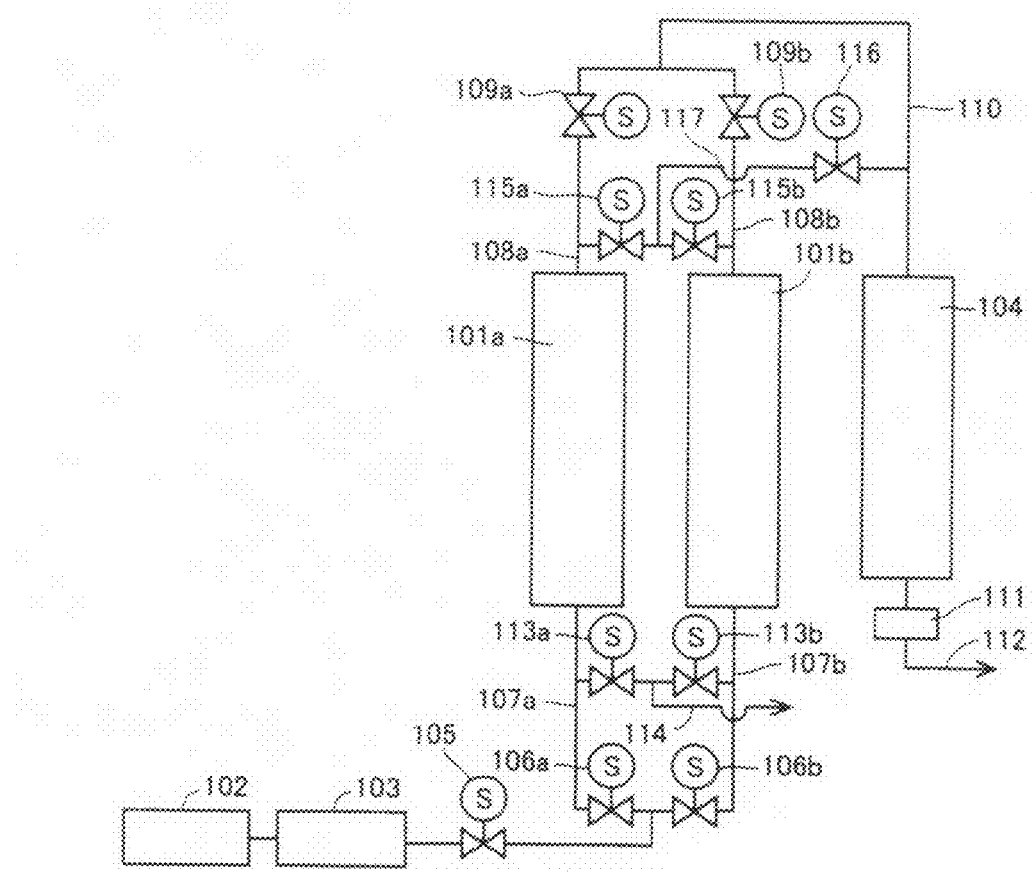
FIG. 14 is a schematic model diagram showing a preferred example of a PSA nitrogen generator according to the present invention.

FIG. 14 is a schematic model diagram showing a preferred example of the PSA nitrogen generator according to the present invention. The PSA nitrogen generator shown in FIG. 14 is constituted of two adsorption towers 101a and 101b filled with the molecular sieve carbon according to the present invention; a source gas supply portion constituted of a compressor 102 and an air dryer 103; a product tank 104 storing separated nitrogen gas; pipes for coupling these components with each other; electromagnetic valves for controlling the flow of the gas and a control system thereof, a flow controller and an analyzer for the gas concentration.

A driving method for the PSA nitrogen generator shown in FIG. 14 is described. The following driving method is merely an example, and does not restrict the present invention at all. First, in the high-pressure adsorption step of adsorption tower 101a, the source gas compressed by compressor 102 is dried by air dryer 103, and thereafter supplied to adsorption tower 101a through electromagnetic valves 105 and 106a and a pipe 107a. The source gas, mainly composed of oxygen and nitrogen (air, for example), is pressurized by compressor 102 preferably to about 3 to 10 kgf/cm² G.

Oxygen is selectively adsorbed by the molecular sieve carbon in adsorption tower 101a, and the concentrated nitrogen gas is temporarily stored in product tank 104 through a pipe 108a, an electromagnetic valve 109a and a pipe 110, and thereafter extracted as a product through a pressure regulator 111 and a pipe 112. After a lapse of a prescribed adsorption time, electromagnetic valves 106a and 109a are closed.

In the low-pressure reproduction step of adsorption tower 101a, an electromagnetic valve 113a is opened for discharging the source gas filling up adsorption tower 101a in a pressurized state into the atmosphere through a pipe 114, and the internal pressure of adsorption tower 101a is rapidly reduced to a level around the atmospheric pressure, for reproducing the molecular sieve carbon. Further, electromagnetic valves 115a and 116 are opened for circulating the nitrogen gas in product tank 104 in a counter-flow direction (opposite to the nitrogen gas extraction direction) toward the adsorption tower through a pipe 117, thereby performing reproduction of adsorption tower 101a. Electromagnetic valves 113a, 115a and 116 are closed when this reproduction step terminates, a pressure equalization step is carried out if necessary, and the high-pressure adsorption step is thereafter carried out again. As described above, the adsorption step and the reproduction step are so repetitively carried out that reproduction of the molecular sieve carbon in the adsorption tower is smoothly performed and high-purity nitrogen gas can be extracted. While the above driving method has been described with reference to the case of using one adsorption tower, the cycle of the adsorption step—the reproduction step is alternately performed by employing two adsorption towers when using the two adsorption towers.

In the aforementioned driving method, the pressure equalization step and a reflux step may be incorporated to drive the nitrogen generator in a cycle of the adsorption step—the pressure equalization step—the reproduction step—the pressure equalization step—the reflux step—the adsorption step, for example. The pressure equalization step is a step of coupling an adsorption tower terminating the high-pressure adsorption step and an adsorption tower terminating the low-pressure reproduction step with each other and performing pressure equalization of the internal pressures of the adsorption towers in a case of using at least two adsorption towers. In the case of a nitrogen generator utilizing two adsorption towers, for example, a case of coupling only upper portions of the two adsorption towers with each other, a case of coupling only lower portions with each other and a case of coupling both of the upper portions and the lower portions with each other are referred to as upper pressure equalization, lower pressure equalization and upper/lower pressure equalization respectively.

The reflux step is a step of simplifying extraction of nitrogen gas of a high concentration in the adsorption step by returning a part of the nitrogen gas into the adsorption tower from the product tank and keeping the nitrogen gas in the adsorption tower without discharging the same out of the system.

While the present invention is now described in more detail with reference to Examples, the present invention is not restricted to these.

[Preparation of Non-Thermofusible Phenol Resin Powder]

EXAMPLE 1

A homogeneous solution was obtained by preparing 2000 g of a mixed solution having a formaldehyde concentration of 10 weight % and a hydrochloric acid concentration of 16 weight % by employing hydrochloric acid of 35 weight % and a formaldehyde aqueous solution of 36 weight %, thereafter adding 8 g of an aqueous solution of 2 weight % of carboxymethyl cellulose sodium salt to the mixed solution and stirring the same. Then, the temperature of the homogeneous solution was adjusted to 20° C., and 70 g of phenol of 95 weight % of 30° C. was thereafter added while stirring the same. The concentration of the phenolic compound with respect to the total weight of the reaction liquid is 3.2 weight %, the feed molar ratio of the phenol with respect to the formaldehyde is 0.11, and the molar concentration of the hydrochloric acid in the reaction liquid is 4.7 mol/L. The reaction liquid was clouded in about 120 seconds from the addition of the phenol. When the reaction was continued also after the clouding while reducing the rate of stirring, the reaction liquid was colored pale pink after about 30 minutes from the addition of the phenol. At this time, the temperature of the reaction liquid had reached 30° C. After the coloring of the reaction liquid, the reaction liquid was heated to 80° C. by external heating, and maintained at this temperature for 30 minutes. Then, this reaction liquid was filtrated, and the obtained cake was washed with 500 g of water, thereafter suspended in 500 g of an ammonia solution of 0.5 weight %, and subjected to neutralization reaction at 40° C. for one hour. 80 g of a pale yellow phenol resin powder 1A was obtained by suction filtration of this suspension with an aspirator after the neutralization reaction, washing the same with 500 g of water and drying the same with a dryer of 50° C. for 10 hours.

EXAMPLE 2

Figure 2:
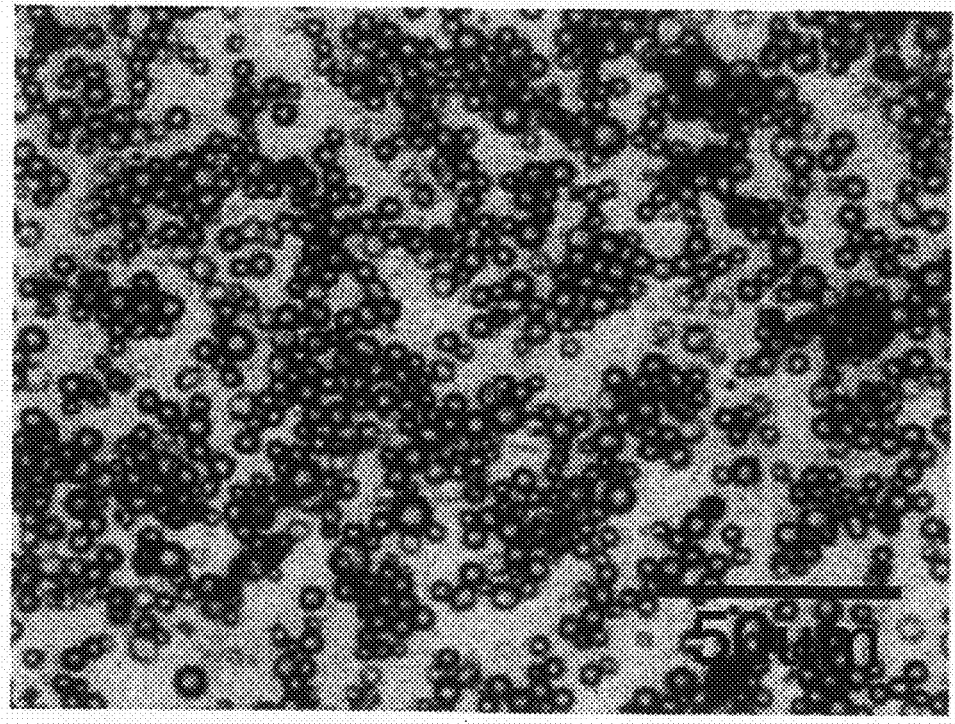
FIG. 2 is an optical micrograph of a non-thermofusible phenol resin powder obtained in Example 2.

A phenol resin powder 2A was obtained by performing reaction similarly to Example 1, except that the formaldehyde concentration was set to 18 weight % and the hydrochloric acid concentration was set to 18 weight % in the mixed liquid. The concentration of the phenolic compound with respect to the total weight of the reaction liquid is 3.2 weight %, the feed molar ratio of the phenol with respect to the formaldehyde is 0.06, and the molar concentration of the hydrochloric acid in the reaction liquid is 5.3 mol/L. The reaction liquid was clouded after about 150 seconds from addition of the phenol, and there was no problem in operation such as adhesion of the resin to a vessel wall or the like either. FIG. 2 shows an optical micrograph of the phenol resin powder obtained in this Example.

EXAMPLE 3

Figure 3:
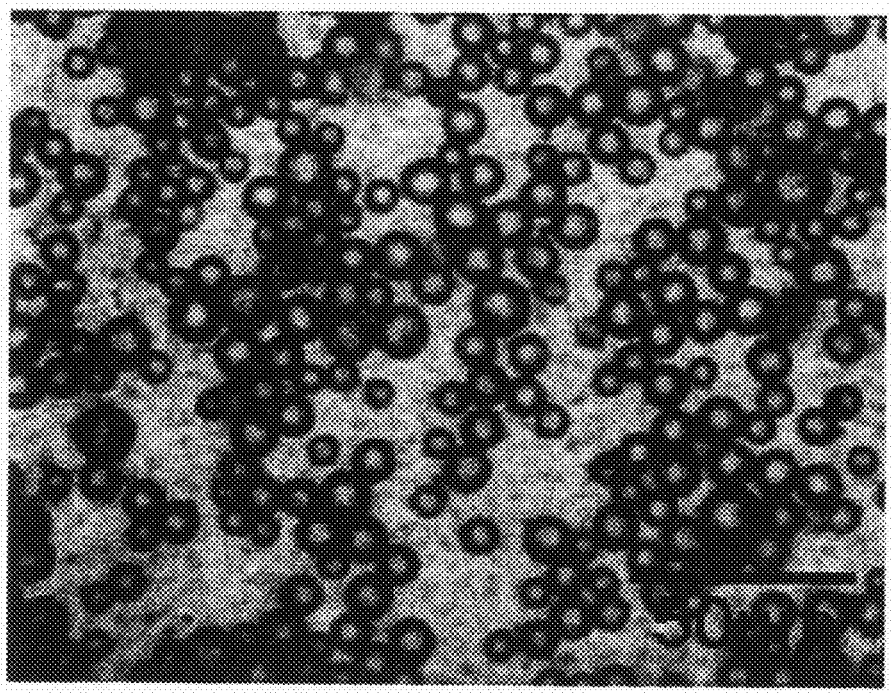
FIG. 3 is an optical micrograph of a non-thermofusible phenol resin powder obtained in Example 3.

A phenol resin powder 3A was obtained by performing reaction similarly to Example 1, except that the formaldehyde concentration was set to 7 weight % and the hydrochloric acid concentration was set to 20 weight % in the mixed liquid. The concentration of the phenolic compound with respect to the total weight of the reaction liquid is 3.2 weight %, the feed molar ratio of the phenol with respect to the formaldehyde is 0.15, and the molar concentration of the hydrochloric acid in the reaction liquid is 5.9 mol/L. The reaction liquid was clouded after about 30 seconds from addition of the phenol, and there was no problem in operation such as adhesion of the resin to a vessel wall or the like either. FIG. 3 shows an optical micrograph of the phenol resin powder obtained in this Example.

EXAMPLE 4

62 g of a phenol resin powder 4A was obtained by performing reaction similarly to Example 1, except that 52 g of the phenol of 95 weight % was added. The concentration of the phenolic compound with respect to the total weight of the reaction liquid is 2.4 weight %, the feed molar ratio of the phenol with respect to the formaldehyde is 0.08, and the molar concentration of the hydrochloric acid in the reaction liquid is 6.0 mol/L.

EXAMPLE 5

115 g of a phenol resin powder 5A was obtained by performing reaction similarly to Example 1, except that 105 g of the phenol of 95 weight % was added. The concentration of the phenolic compound with respect to the total weight of the reaction liquid is 4.7 weight %, the feed molar ratio of the phenol with respect to the formaldehyde is 0.16, and the molar concentration of the hydrochloric acid in the reaction liquid is 5.8 mol/L.

EXAMPLE 6

A homogeneous solution was obtained by preparing 1156 g of a mixed solution by mixing 556 g of a formaldehyde aqueous solution of 36 weight %, 70 g of phenol of 95 weight % and 530 g of water with each other, thereafter adding 8 g of an aqueous solution of 2 weight % of carboxymethyl cellulose sodium salt to the mixed solution and stirring the same. Then, the temperature of the homogeneous solution was adjusted to 20° C., and 914 g of hydrochloric acid of 35 weight % of 30° C. was thereafter added while stirring the same. The concentration of the phenolic compound with respect to the total weight of the reaction liquid is 3.2 weight %, the feed molar ratio of the phenol with respect to the formaldehyde is 0.11, and the molar concentration of the hydrochloric acid in the reaction liquid is 4.7 mol/L, identically to Example 1. The reaction liquid was clouded in about 20 seconds from the addition of the hydrochloric acid. When the reaction was continued also after the clouding, the reaction liquid was colored pink after about 30 minutes from the addition of the hydrochloric acid. Thereafter 78 g of a phenol resin powder 6A was obtained by performing heating, separation, washing and drying similarly to Example 1.

EXAMPLE 7

240 g of a phenol resin powder 7A was obtained by performing reaction similarly to Example 6, except that 204 g of the phenol of 95 weight % was employed. The concentration of the phenolic compound with respect to the total weight of the reaction liquid is 8.8 weight %, the feed molar ratio of the phenol with respect to the formaldehyde is 0.31, and the molar concentration of the hydrochloric acid in the reaction liquid is 4.4 mol/L.

EXAMPLE 8

200 g of a phenol resin powder 8A was obtained by performing reaction similarly to Example 6, except that 278 g of a formaldehyde aqueous solution of 36 weight %, 204 g of phenol of 95 weight % and 803 g of water were employed for preparing the mixed liquid. The concentration of the phenolic compound with respect to the total weight of the reaction liquid is 8.8 weight %, the feed molar ratio of the phenol with respect to the formaldehyde is 0.62, and the molar concentration of the hydrochloric acid in the reaction liquid is 4.4 mol/L.

EXAMPLE 9

Reaction was performed similarly to Example 1, except that a paraformaldehyde aqueous solution of the same weight concentration was employed in place of employing the formaldehyde aqueous solution of 36 weight %. The course of the reaction was substantially identical to that in Example 1, and 77 g of a phenol resin powder 9A was obtained.

EXAMPLE 10

A phenol resin powder 10A was obtained by performing reaction similarly to Example 1, except that the hydrochloric acid concentration in the mixed solution was set to 8 weight % and the reaction liquid was heated to 50° C. by external heating after addition of phenol of 95 weight % and heated to 80° C. after coloring of the reaction liquid. The concentration of the phenolic compound with respect to the total weight of the reaction liquid is 3.2 weight %, the feed molar ratio of the phenol with respect to the formaldehyde is 0.11, and the molar concentration of the hydrochloric acid in the reaction liquid is 2.3 mol/L.

COMPARATIVE EXAMPLE 1

Figure 4:
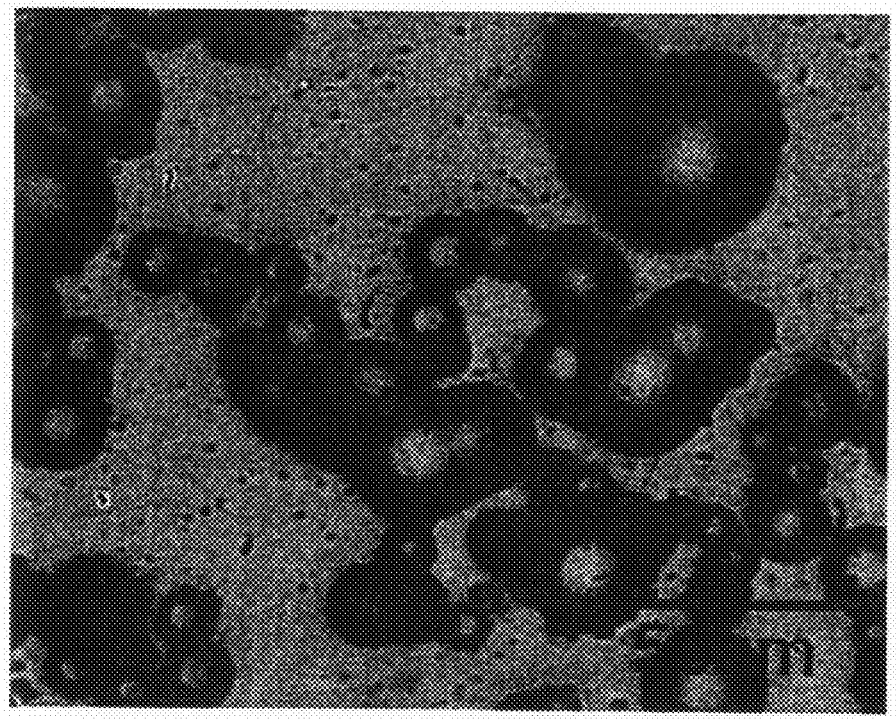
FIG. 4 is an optical micrograph of a phenol resin powder obtained in Comparative Example 1.

80 g of a phenol resin powder 1C was obtained by performing reaction similarly to Example 1, except that 8 g of water was employed in place of 8 g of the aqueous solution of 2 weight % of carboxymethyl cellulose sodium salt. The course of the reaction was similar to that in Example 1, except that the reaction liquid was clouded after about 95 seconds after addition of the phenol. FIG. 4 shows an optical micrograph of the phenol resin powder obtained in this comparative example. As shown in FIG. 4, it is understood that primary particles relatively frequently aggregate in the phenol resin powder 1C. The single particle ratio of the phenol resin powder 1C is 0.60.

COMPARATIVE EXAMPLE 2

Reaction was performed similarly to Example 1, except that the hydrochloric acid concentration in 2000 g of the mixed solution was set to 5 weight %. No clouding of the reaction liquid was observed, and no phenol resin powder was obtained. The molar concentration of the hydrochloric acid in the reaction liquid is 1.5 mol/L.

COMPARATIVE EXAMPLE 3

Reaction was performed similarly to Example 6, except that 140 g of a formaldehyde aqueous solution of 36 weight %, 204 g of phenol of 95 weight % and 940 g of water were employed for preparing the mixed liquid. The concentration of the phenolic compound with respect to the total weight of the reaction liquid is 8.8 weight %, the feed molar ratio of the phenol with respect to the formaldehyde is 1.23, and the molar concentration of the hydrochloric acid in the reaction liquid is 4.5 mol/L. When initiating heating of the reaction liquid, resin adhered to the wall of a reaction vessel. About 50 g of a phenol resin powder 3C was obtained by filtrating powder which was in a suspended state upon completion of the heating and performing washing, neutralization and drying. When particles were observed with a microscope, a large number of indeterminate particles were present, and the sphericity and the single particle ratio were impossible to obtain.

Various characteristics shown in Table 1 were measured as to the phenol resin powders 1A to 10A, 1C and 3 C. Table 1 shows the results of the measurement along with reaction conditions.

TABLE 1

| | Reaction Condition | | | | | | | | | | |
|---|---|---|---|---|---|---|---|---|---|---|---|
| | Phenol Concentration (weight %) | P/A *2 (molar ratio) | Hydrochloric Acid Concentration *3 (mol/L) | Phenol Resin Powder | Non-Thermo-fusibility (yes/no) | Boiling Methanol Solubility (weight %) | Average Particle Diameter (μm) | Single Particle Ratio | Coefficient of Variation | Sphericity | Free Phenol Content (ppm) |
| Example 1 | 3.2 | 0.11 | 4.7 | 1A | yes | 5 | 5 | 1.00 | 0.49 | 0.99 | 90 |
| Example 2 | 3.2 | 0.06 | 5.3 | 2A | yes | 4 | 3 | 0.99 | 0.38 | 0.99 | 90 |
| Example 3 | 3.2 | 0.15 | 5.9 | 3A | yes | 6 | 7 | 0.80 | 0.55 | 0.90 | 290 |
| Example 4 | 2.4 | 0.08 | 4.8 | 4A | yes | 3 | 3 | 1.00 | 0.39 | 0.99 | 30 |
| Example 5 | 4.7 | 0.16 | 4.6 | 5A | yes | 7 | 7 | 0.80 | 0.48 | 0.78 | 200 |
| Example 6 | 3.2 | 0.11 | 4.7 | 6A | yes | 5 | 2 | 0.99 | 0.42 | 0.99 | 20 |
| Example 7 | 8.8 | 0.31 | 4.4 | 7A | yes | 6 | 2 | 0.99 | 0.56 | 0.99 | 180 |
| Example 8 | 8.8 | 0.62 | 4.4 | 8A | yes | 8 | 5 | 0.80 | 0.48 | 0.99 | 220 |
| Example 9 | 3.2 | 0.11 | 4.7 | 9A | yes | 5 | 5 | 0.99 | 0.57 | 0.99 | 100 |
| Example 10 | 3.2 | 0.11 | 2.3 | 10A | yes | 12 | 12 | 0.70 | 0.59 | 0.88 | 230 |
| Comparative Example 1 | 3.2 | 0.11 | 4.7 | 1C | yes | 5 | 17 | 0.60 | 0.67 | 0.80 | 200 |
| Comparative Example 2 | 3.2 | 0.11 | 1.5 | — | — | — | — | — | — | — | — |
| Comparative Example 3 | 8.8 | 1.23 | 4.5 | 3C | no | 40 | 30 | — | 0.87 | — | 1100 |

*1: concentration (weight %) of phenolic compound with respect to total weight of reaction liquid.
*2: feed molar ratio of phenolic compound with respect to aldehyde.
*3: molar concentration of hydrochloric acid in reaction liquid.

EXAMPLE 11

Figure 5:
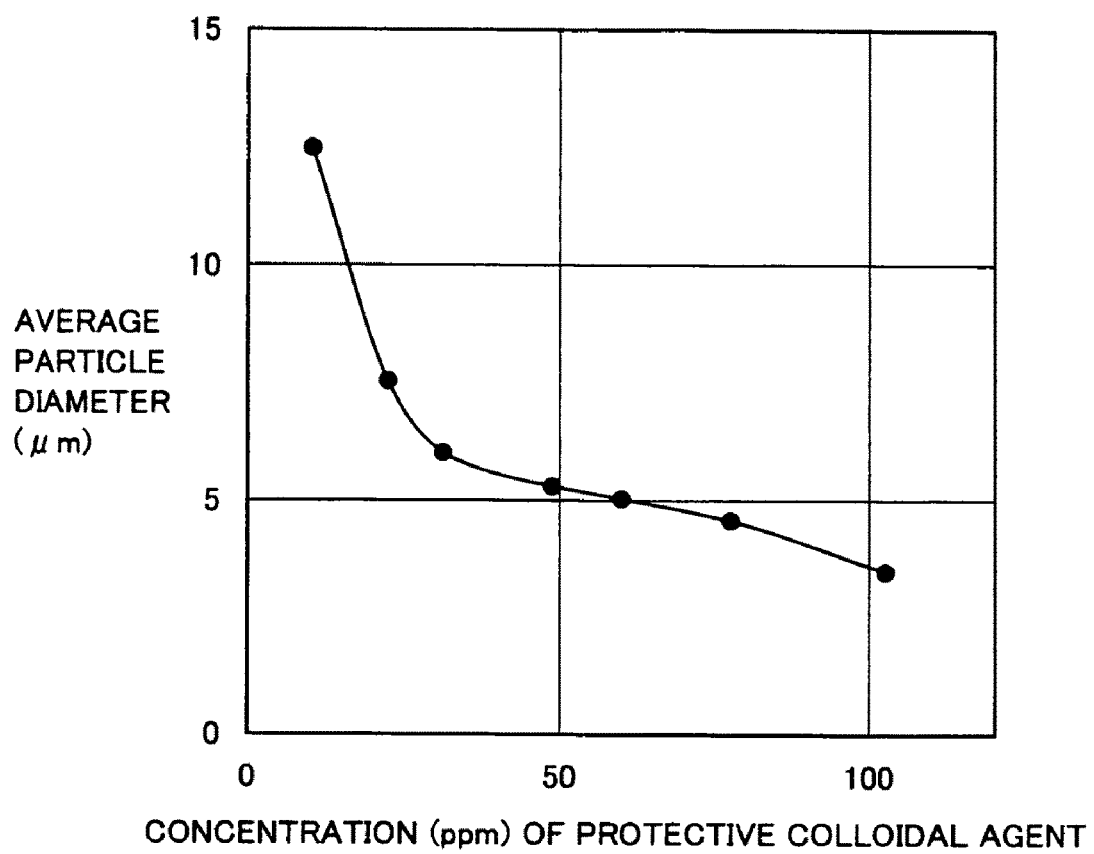
FIG. 5 is a graph showing the relation between the concentration of a protective colloidal agent (weight (ppm) of the protective colloidal agent with respect to the total weight of a reaction liquid) and the average particle diameter of a phenol resin powder.

After obtaining phenol resin powders by performing reaction similarly to Example 1 except that the quantity of carboxymethyl cellulose sodium salt which is a protective colloidal agent with respect to phenol was changed in various ways, the average particle diameter of each phenol resin powder was measured. FIG. 5 is a graph showing the relation between the concentration of the protective colloidal agent (weight (ppm) of the protective colloidal agent with respect to the total weight of the reaction liquid) and the average particle diameter of the phenol resin powder. The measurement range of 13 to about 103 ppm of the protective colloidal agent concentration corresponds to the range of 0.04 to 0.32 weight % in terms of the ratio (weight %) of the loading of the protective colloidal agent/the loading of the phenol. As shown in FIG. 5, it has been recognized that the average particle diameter of the obtained phenol resin powder can be controlled by adjusting the loading of the protective colloidal agent. In other words, it has been recognized that the average particle diameter can be reduced by increasing the loading of the protective colloidal agent.

EXAMPLE 12

A homogeneous solution was obtained by preparing 10 kg of a mixed solution having a formaldehyde concentration of 8 weight % and a hydrochloric acid concentration of 17 weight % by employing hydrochloric acid of 35 weight % and a formaldehyde aqueous solution of 36 weight %, thereafter adding 20 g of an aqueous solution of 2 weight % of carboxymethyl cellulose sodium salt to the mixed solution and stirring the same. Then, the temperature of the homogeneous solution was adjusted to 20° C., and 400 g of phenol of 95 weight % of 40° C. was thereafter added while stirring the solution. The concentration of the phenolic compound with respect to the total weight of the reaction liquid is 3.65 weight %, the feed molar ratio of the phenol with respect to the formaldehyde is 0.15, and the molar concentration of the hydrochloric acid in the reaction liquid is 5.0 mol/L. The reaction liquid was clouded in about 70 seconds from the addition of the phenol. When the reaction was continued also after the clouding while reducing the rate of stirring, the reaction liquid was colored pale pink after about 30 minutes from the addition of the phenol. At this time, the temperature of the reaction liquid had reached 30° C. After the coloring of the reaction liquid, the reaction liquid was heated to 80° C. by external heating, and maintained at this temperature for 30 minutes. Then, about 700 g of a wet phenol resin powder 12A-a was obtained by filtrating this reaction liquid and washing the obtained phenol resin powder cake with 1 kg of water. When a part thereof was dried with a dryer of 50° C. for 10 hours and thereafter subjected to fluorescent X-ray measurement, the chlorine content in the phenol resin powder was about 6500 ppm. The average particle diameter of the phenol resin powder 12A-a was 3.5 μm.

Then, 500 g of the aforementioned wet phenol resin powder 12A-a was dispersed in 5 L of ion-exchanged water, heated to 95° C. while stirring the same, and maintained at this temperature for 24 hours. Then, this dispersion liquid was filtrated, and the phenol resin powder on the filter paper was washed with 500 g of ion-exchanged water, to obtain a phenol resin powder 12A-b (corresponding to a dry weight of 320 g). When a part of the obtained phenol resin powder was dried at 105° C. for 10 hours and subjected to fluorescent X-ray measurement, the chlorine content was 1100 ppm.

Then, the wet phenol resin powder 12A-b (corresponding to a dry weight of 300 g) was dispersed in 900 g of ethylene glycol, heated to 180° C. while stirring the same, and maintained at this temperature for three hours. Then, the dispersion liquid was filtrated after the same was cooled to ordinary temperature, and the phenol resin powder on the filter paper was washed with 500 g of ion-exchanged water. The obtained phenol resin powder was dried in a stream of nitrogen at 180° C. for five hours, to obtain 280 g of a phenol resin powder 12A-c. The chlorine content in the phenol resin powder 12A-c was 70 ppm.

EXAMPLE 13

280 g of a phenol resin powder 13A was obtained similarly to Example 12, except that washing with ethylene glycol was performed twice in total (under the same conditions as Example 12 in both times). The chlorine content in the phenol resin powder 13A was 10 ppm. No drying step was provided between the first washing and the second washing.

EXAMPLE 14

A homogeneous solution was obtained by preparing 10 kg of a mixed solution having a formaldehyde concentration of 8 weight % and a hydrochloric acid concentration of 18 weight % by employing hydrochloric acid of 35 weight % and a formaldehyde aqueous solution of 36 weight %, thereafter adding 30 g of an aqueous solution of 2 weight % of carboxymethyl cellulose sodium salt to the mixed solution and stirring the same. Then, the temperature of this homogeneous solution was adjusted to 20° C., and 400 g of phenol of 95 weight % of 40° C. was thereafter added while stirring the same. The concentration of the phenolic compound with respect to the total weight of the reaction liquid is 3.64 weight %, the feed molar ratio of the phenol with respect to the formaldehyde is 0.15, and the molar concentration of the hydrochloric acid in the reaction liquid is 5.3 mol/L. The reaction liquid was clouded in about 60 seconds from the addition of the phenol. When the reaction was continued also after the clouding while reducing the rate of stirring, the reaction liquid was colored pale pink after about 30 minutes from the addition of the phenol. At this time, the temperature of the reaction liquid had reached 30° C. After the coloring of the reaction liquid, the reaction liquid was heated to 80° C. by external heating, and maintained at this temperature for 30 minutes. Then, about 700 g of a wet phenol resin powder 14A-a was obtained by filtrating this reaction liquid and washing the obtained phenol resin powder cake with 1 kg of water. When a part thereof was dried with a dryer of 50° C. for 10 hours and thereafter subjected to fluorescent X-ray measurement, the chlorine content in the phenol resin powder was about 6500 ppm. The average particle diameter of the phenol resin powder 14A-a was 5.8 μm.

Then, 500 g of the aforementioned wet phenol resin powder 14A-a was dispersed in 5 L of ion-exchanged water, heated to 95° C. while stirring the same, and maintained at this temperature for 24 hours. Then, this dispersion liquid was filtrated, and the phenol resin powder on the filter paper was washed with 500 g of ion-exchanged water, to obtain a phenol resin powder 14A-b (corresponding to a dry weight of 320 g). When a part of the obtained phenol resin powder was dried at 105° C. for 10 hours and subjected to fluorescent X-ray measurement, the chlorine content was 1700 ppm.

Then, the wet phenol resin powder 14A-b (corresponding to a dry weight of 300 g) was dispersed in 900 g of ethylene glycol, heated to 180° C. while stirring the same, and maintained at this temperature for three hours. Then, the dispersion liquid was filtrated after the same was cooled to ordinary temperature, and the phenol resin powder on the filter paper was washed with 500 g of ion-exchanged water. The obtained phenol resin powder was dried in a stream of nitrogen at 180° C. for five hours, to obtain 280 g of a phenol resin powder 14A-c. The chlorine content in the phenol resin powder 14A-c was 90 ppm.

EXAMPLE 15

280 g of a phenol resin powder 15A was obtained similarly to Example 14, except that washing with ethylene glycol was performed twice in total (under the same conditions as Example 14 in both times). The chlorine content in the phenol resin powder 15A was 30 ppm. No drying step was provided between the first washing and the second washing.

EXAMPLE 16

500 g of the phenol resin powder 12A-a obtained in Example 12 was dispersed in 1.5 L (1350 g) of an ammonia solution of 25 weight %, heated to 37° C. while stirring the same, and maintained at this temperature for 24 hours. Then, this dispersion liquid was filtrated, and the phenol resin powder on the filter paper was washed with 500 g of ion-exchanged water. The obtained phenol resin powder was dried at 105° C. for 10 hours, to obtain 320 g of a phenol resin powder 16A. The chlorine content in the phenol resin powder 16A was 300 ppm.

EXAMPLE 17

320 g of a phenol resin powder 17A was obtained similarly to Example 16, except that washing with the ammonia solution of 25 weight % was performed twice in total (under the same conditions as Example 16 in both times). The chlorine content in the phenol resin powder 17A was 50 ppm. No drying step was provided between the first washing and the second washing.

EXAMPLE 18

The wet phenol resin powder 12A-b (corresponding to a dry weight of 300 g) obtained in Example 12 was dispersed in 900 g of an ammonia solution of 25 weight %, and stirred at 80° C. for two hours with an autoclave. Then, this dispersion liquid was filtrated, and the phenol resin powder on the filter paper was washed with 500 g of ion-exchanged water. The obtained phenol resin powder was dried at 105° C. for 10 hours, to obtain 280 g of a phenol resin powder 18A. The chlorine content in the phenol resin powder 18A was not more than the limit of detection (10 ppm).

EXAMPLE 19

The wet phenol resin powder 12A-a (corresponding to a dry weight of 300 g) obtained in Example 12 was dispersed in 900 g of ethylene glycol, heated to 180° C. while stirring the same, and maintained at this temperature for three hours. Then, the dispersion liquid was filtrated after the same was cooled to ordinary temperature, and the phenol resin powder on the filter paper was washed with 500 g of ion-exchanged water. The obtained phenol resin powder was dried in a stream of nitrogen at 180° C. for five hours, to obtain 280 g of a phenol resin powder 19A. The chlorine content in the phenol resin powder 19A was 300 ppm.

EXAMPLE 20

280 g of a phenol resin powder 20A was obtained similarly to Example 19, except that washing with ethylene glycol was performed twice in total (under the same conditions as Example 19 in both times). The chlorine content in the phenol resin powder 20A was 60 ppm. No drying step was provided between the first washing and the second washing.

COMPARATIVE EXAMPLE 4

100 parts by weight of phenol, 39 parts by weight of paraformaldehyde of 92 weight %, 9 parts by weight of hexamethylenetetramine and 1 part by weight of gum arabic were dissolved in 100 parts by weight of water. 7 parts by weight of Bellpearl R800 (by Air Water Inc.) was added as nuclear substance, and the mixture was heated to 85° C. in 60 minutes while gently stirring the same, and further reacted for 60 minutes while maintaining the temperature of 85° C. The obtained reaction liquid was cooled and solid-liquid separated, to obtain a spherical resol resin having an average particle diameter of about 500 p.m. 100 parts by weight of this spherical resol resin was dispersed in a solution containing 1000 parts by weight of hydrochloric acid of 17 weight % and formaldehyde of 9 weight %, heated to 80° C. and maintained for one hour. The reaction liquid was solid-liquid separated by filtration, washed with water, and thereafter dried at 85° C. for five hours. The obtained resin substantially exhibited non-thermofusibility while maintaining the spherical mode and the particle size. The sphericity was 1.0, the single particle ratio was 1.0, the average particle diameter was about 500 μm, the boiling methanol solubility was 6%, and the chlorine content was 4500 ppm. The average particle diameter was directly read from the particle size distribution of an optical microscope image.

These non-thermofusible phenol resin particles having the average particle diameter of about 500 μm were subjected to a washing treatment twice with ethylene glycol according to the method described in Example 13, to obtain a phenol resin powder 4C. The chlorine content in the phenol resin powder 4C was 1200 ppm. No drying step was provided between the first washing and the second washing.

REFERENCE EXAMPLE 1

500 g of the phenol resin powder 14A-b (chlorine ion content 1700 ppm) obtained in the aforementioned Example 14 was dispersed in 5 L of ion-exchanged water, heated to 95° C. while stirring the same, and maintained at this temperature for 24 hours. Then, this dispersion liquid was filtrated, and the phenol resin powder on the filter paper was washed with 500 g of ion-exchanged water. The obtained phenol resin powder was dried at 105° C. for 10 hours, to obtain a phenol resin powder 1S. The chlorine content in the phenol resin powder 1S was 700 ppm.

REFERENCE EXAMPLE 2

A phenol resin powder 2S was obtained by performing an operation similar to that in Reference Example 1 as to the phenol resin powder 1S. The chlorine content in the phenol resin powder 2S was 600 ppm.

REFERENCE EXAMPLE 3

A phenol resin powder 3S was obtained by performing an operation similar to that in Reference Example 1 as to the phenol resin powder 2S. The chlorine content in the phenol resin powder 3S was 550 ppm.

Various characteristics shown in Table 2 were measured as to the phenol resin powders 12A to 20A, 4C and 1S to 3S. Table 2 shows the results of the measurement along with reaction conditions. Table 2 also shows results as to the phenol resin powders 1C and 3C.

TABLE 2

| | Reaction Condition | | | Phenol Resin Powder | Non-Thermo-fusibility (yes/no) | Boiling Methanol Solubility (weight %) |
|---|---|---|---|---|---|---|
| | Phenol Concentration *1 (weight %) | P/A *2 (molar ratio) | Hydrochloric Acid Concentration *3 (mol/L) | | | |
| Example 12 | 3.65 | 0.15 | 5.0 | 12A-a | yes | 5 |
| | | | | 12A-b | yes | 4 |
| | | | | 12A-c | yes | 0 |
| Example 13 | 3.65 | 0.15 | 5.0 | 13A | yes | 0 |
| Example 14 | 3.64 | 0.15 | 5.3 | 14A-a | yes | 5 |
| | | | | 14A-b | yes | 5 |
| | | | | 14A-c | yes | 0 |
| Example 15 | 3.64 | 0.15 | 5.3 | 15A | yes | 0 |
| Example 16 | 3.65 | 0.15 | 5.0 | 16A | yes | 4 |
| Example 17 | 3.65 | 0.15 | 5.0 | 17A | yes | 4 |
| Example 18 | 3.65 | 0.15 | 5.0 | 18A | yes | 4 |
| Example 19 | 3.65 | 0.15 | 5.0 | 19A | yes | 0 |
| Example 20 | 3.65 | 0.15 | 5.0 | 20A | yes | 0 |
| Comparative Example 1 | 3.2 | 0.11 | 4.7 | 1C | yes | 5 |
| Comparative Example 3 | 8.8 | 1.23 | 4.5 | 3C | no | 40 |
| Comparative Example 4 | — | — | — | 4C | yes | 6 |
| Reference Example 1 | 3.65 | 0.15 | 5.0 | 1S | yes | 4 |
| Reference Example 2 | 3.65 | 0.15 | 5.0 | 2S | yes | 3 |
| Reference Example 3 | 3.65 | 0.15 | 5.0 | 3S | yes | 3 |

| | Average Particle Diameter (μm) | Single Particle Ratio | Coefficient of Variation | Sphericity | Free Phenol Content (ppm) | Hydrochloric Acid Content (ppm) |
|---|---|---|---|---|---|---|
| Example 12 | 3.5 | 1.0 | 0.45 | 0.98 | 160 | about 6500 |
| | 3.5 | 1.0 | 0.45 | 0.98 | 90 | 1100 |
| | 3.5 | 1.0 | 0.45 | 0.98 | ND | 70 |
| Example 13 | 3.5 | 1.0 | 0.45 | 0.98 | ND | 10 |
| Example 14 | 5.8 | 0.9 | 0.55 | 0.95 | 280 | about 6500 |
| | 5.8 | 0.9 | 0.55 | 0.95 | 180 | 1700 |
| | 5.8 | 0.9 | 0.55 | 0.95 | ND | 90 |
| Example 15 | 5.8 | 0.9 | 0.55 | 0.95 | ND | 30 |
| Example 16 | 3.5 | 1.0 | 0.45 | 0.98 | 30 | 300 |
| Example 17 | 3.5 | 1.0 | 0.45 | 0.98 | ND | 50 |
| Example 18 | 3.5 | 1.0 | 0.45 | 0.98 | ND | ND |
| Example 19 | 3.5 | 1.0 | 0.45 | 0.98 | ND | 300 |
| Example 20 | 3.5 | 1.0 | 0.45 | 0.98 | ND | 60 |
| Comparative Example 1 | 17 | 0.6 | 0.67 | 0.80 | 200 | about 7200 |
| Comparative Example 3 | 30 | — | 0.87 | — | 1100 | about 6800 |
| Comparative Example 4 | 500 | 1.0 | | 1.0 | | 1200 |
| Reference Example 1 | 5.8 | 0.9 | 0.55 | 0.95 | 250 | 700 |
| Reference Example 2 | 5.8 | 0.9 | 0.55 | 0.95 | 200 | 600 |
| Reference Example 3 | 5.8 | 0.9 | 0.55 | 0.95 | 200 | 550 |

*1: concentration (weight %) of phenolic compound with respect to total weight of reaction liquid.
*2: feed molar ratio of phenolic compound with respect to aldehyde.
*3: molar concentration of hydrochloric acid in reaction liquid.

From each of the aforementioned Examples 12 to 20, it was possible to efficiently obtain a phenol resin powder having a chlorine content of not more than 100 ppm by washing with ethylene glycol and/or washing with an ammonia solution. The alcohol such as ethylene glycol has a chemical property easily diffused in the phenol resin particles and improves the diffusion rate of chlorine ions in the phenol resin, and hence it was conceivably possible to efficiently perform the washing. The washing is conceivably preferably performed in a high-temperature region where the motility of the phenol resin molecules increases. This also applies to the case of employing the ammonia solution, such that the ammonia solution diffuses into the phenol resin particles thereby improving the diffusion rate of chlorine ions in the phenol resin and hence it was conceivably possible to efficiently perform the washing.

Observing each of Reference Examples 1 to 3, on the other hand, chlorine ions are removed from the surfaces of the phenol resin particles in the first washing (phenol resin powder 14A-b: chlorine content 1700 ppm) and the second washing (phenol resin powder 1S: chlorine content is 700 ppm) with hot water and hence reduction of the chlorine content is observed, while chlorine ions confined in the phenol resin are still present in a large quantity and spreading diffusion of these internally present chlorine ions to the surfaces of the particles is rate-determined, whereby the washing effect remarkably lowers in third washing and fourth washing with hot water as a result. When employing hot water, the chlorine content is not reduced below 500 ppm even if washing is performed four times, and this operation is extremely inefficient. As shown in Comparative Example 4, further, it has been recognized that the chlorine content is not sufficiently reduced in a phenol resin having a relatively large average particle diameter, even by washing with alcohol.

Figure 6:
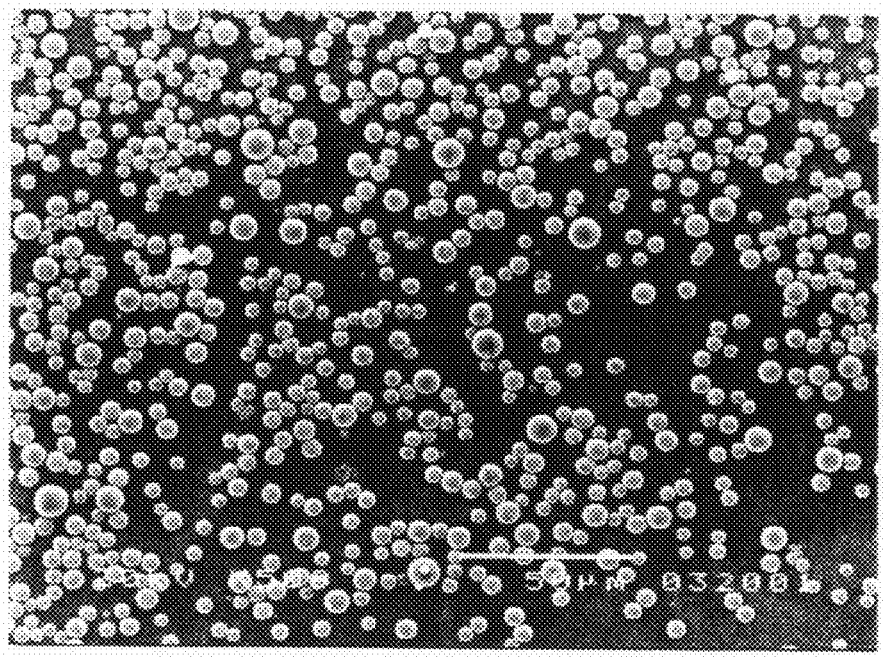
FIG. 6 is a scanning electron micrograph (SEM photograph) (500 magnifications) of a phenol resin powder 12A-c obtained in Example 12.
Figure 7:
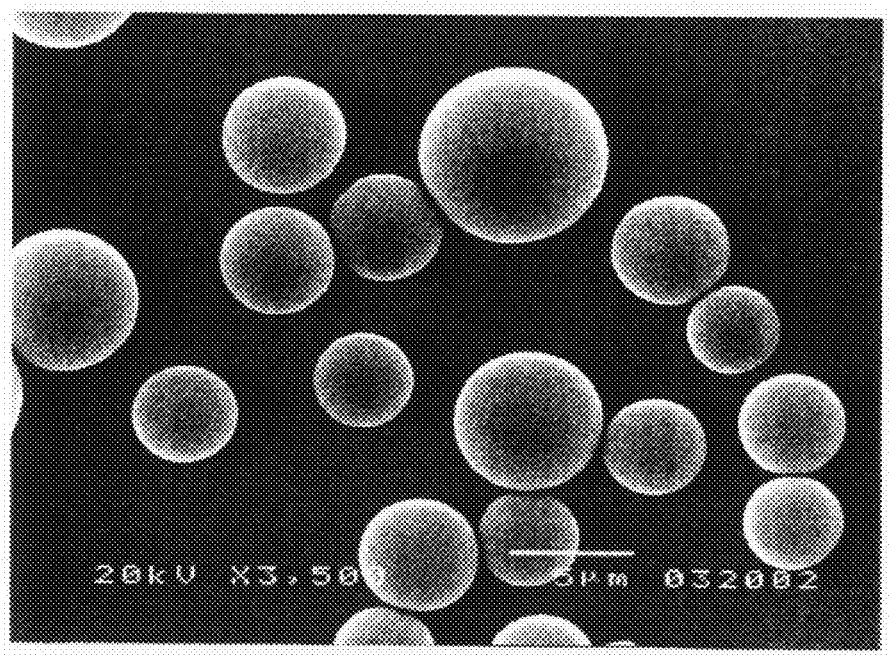
FIG. 7 is a further enlarged SEM photograph (3500 magnifications) of the phenol resin powder 12A-c.

FIG. 6 is a scanning electron micrograph (SEM photograph, 500 magnifications) of the phenol resin powder 12A-c obtained in Example 12. FIG. 7 is a further enlarged SEM photograph (3500 magnifications) of the phenol resin powder 12A-c. As understood from FIGS. 6 and 7 and Table 2, the average particle diameter, the single particle ratio, the sphericity and the surface states of the phenol resin particles were hardly changed even by ethylene glycol washing and/or ammonia solution washing, and it has been confirmed that the washing with ethylene glycol or the ammonia solution exerts no bad influence on the phenol resin particles.

[Preparation of Thermosetting Resin Composition]

EXAMPLE 21

Powder which is a thermosetting resin composition was obtained by kneading 6 parts by weight of the phenol resin powder 13A obtained in the aforementioned Example 13 and 4 parts by weight of epoxy resin ("Epotohto YD-128" by Tohto Kasei Co., Ltd.) on a heated roll while heating the same to 70° C., thereafter kneading the mixture while further adding 0.2 parts by weight of 2-ethyl-4-methyl imidazole as a hardening agent, removing the kneaded substance from the heated roll and pulverizing the same after cooling. This thermosetting resin composition exhibited excellent liquidity in melting state, while a gel time at 150° C. was 33 seconds and a gel time at 200° C. was 18 seconds.

Then, this thermosetting resin composition was set in a mold heated to 180° C. and maintained with a pressure of 20 kgf/cm² for three minutes to obtain a hardened substance. The obtained hardened substance had specific gravity of 1.24, and was lightweight.

EXAMPLE 22

Powder which is a thermosetting resin composition was obtained by kneading 6 parts by weight of the phenol resin powder 13A obtained in the aforementioned Example 13 and 4 parts by weight of epoxy resin ("Epotohto YD-8125" by Tohto Kasei Co., Ltd.) on a heated roll while heating the same to 70° C., thereafter kneading the mixture while further adding 0.2 parts by weight of 2-ethyl-4-methyl imidazole as a hardening agent, removing the kneaded substance from the heated roll and pulverizing the same after cooling. This thermosetting resin composition exhibited excellent liquidity in melting state, while a gel time at 150° C. was 25 seconds and a gel time at 200° C. was 14 seconds.

Then, this thermosetting resin composition was set in a mold heated to 180° C. and maintained with a pressure of 20 kgf/cm² for three minutes to obtain a hardened substance. The obtained hardened substance had specific gravity of 1.24, and was lightweight. Further, the obtained hardened substance had a chlorine content of 70 ppm, and was excellently usable as a sealing material for a semiconductor or an adhesive for a semiconductor.

EXAMPLE 23

A semi-liquefied thermosetting resin composition was obtained by kneading 15 parts by weight of the phenol resin powder 13A obtained in the aforementioned Example 13, 60 parts by weight of epoxy resin ("Epotohto YD-8125" by Tohto Kasei Co., Ltd.), 6 parts by weight of phenol novolac resin (TD-2093 by Dainippon Ink and Chemicals, Inc.) and 4 parts by weight of dicyandiamide as hardening agents.

EXAMPLE 24

A thermosetting composition I was obtained by kneading 60 parts by weight of the phenol resin powder 15A obtained in the aforementioned Example 15, 40 parts by weight of epoxy resin ("Epotohto YD-8125" by Tohto Kasei Co., Ltd.) and 2 parts by weight of 2-ethyl-4-methyl imidazole as a hardening agent. On the other hand, a thermosetting resin composition II was obtained by kneading 106 parts by weight of fused silica (FB-301 by Denki Kagaku Kogyo K.K.) in place of the phenol resin powder 15A and 2 parts by weight of 2-ethyl-4-methyl imidazole as a hardening agent. The volume ratio of the phenol resin powder 15A in the thermosetting resin composition I and the volume ratio of the fused silica in the thermosetting resin composition II are identical to each other. Then, the thermosetting resin composition I and the thermosetting resin composition II were heated/hardened under a temperature condition of 150° C. respectively, to obtain hardened substances (referred to as hardened substances Ia and IIa respectively). As to the hardened substances Ia and IIa, torques of the hardened substances at 150° C. were measured with a curast meter VPS by Orientec Co., Ltd. Consequently, the torque of the hardened substance Ia at 150° C. was 1.34 times that of the hardened substance IIa. From this, it has been confirmed that the hardened substance of the thermosetting resin composition employing the non-thermofusible phenol resin powder according to the present invention was improved in toughness in heating.

[Preparation of Carbon Electrode Material Powder]

REFERENCE EXAMPLE 4

First, 804 g of the phenol resin powder 1A was obtained by the method described in Example 1. Then, 680 g of this phenol resin powder was divided into four parts, i.e., a phenol resin powder 1A-a (200 g), a phenol resin powder 1A-b (200 g), a phenol resin powder 1A-c (200 g) and a phenol resin powder 1A-d (80 g) and subjected to firing/activation treatments respectively according to the following conditions respectively, to obtain carbon electrode materials 1 to 4 respectively.

(1) Carbon electrode material 1 (yield 94 g): The phenol resin powder 1A-a was introduced into a crucible, which in turn was introduced into an electric furnace. After the electric furnace was sufficiently substituted with nitrogen gas, the phenol resin powder 1A-a was heated from room temperature at a rate of 100° C./hour while continuously feeding nitrogen, and heat-treated for three hours when the temperature reached 600° C. Thereafter the phenol resin powder 1A-a was heated at the rate of 100° C./hour again, and activated in a stream of nitrogen saturated with steam at 850° C. for five hours. The weight reduction ratio indicating the degree of activation was 33%.

(2) Carbon electrode material 2 (yield 60 g): The phenol resin powder 1A-b was fired and activated similarly to the phenol resin powder 1A-a, except that the temperature in the activation treatment was set to 900° C. The weight reduction ratio was 56%.

(3) Carbon electrode material 3 (yield 35 g): The phenol resin powder 1A-c was fired and activated similarly to the phenol resin powder 1A-a, except that the temperature in the activation treatment was set to 950° C. The weight reduction ratio was 75%.

(4) Carbon electrode material 4 (yield 44 g): The phenol resin powder 1A-d was introduced into a crucible, which in turn was introduced into an electric furnace. After the electric furnace was sufficiently substituted with nitrogen gas, the phenol resin powder 1A-d was heated from room temperature at a rate of 100° C./hour while continuously feeding nitrogen, and heat-treated for three hours when the temperature reached 950° C.

REFERENCE EXAMPLE 5

200 g of the phenol resin powder 2A obtained by the method described in Example 2 was fired and activated under conditions similar to those for the phenol resin powder 1A-a of Reference Example 4, to obtain 90 g of a carbon electrode material 5 having a weight reduction ratio of 36% in the activation treatment.

REFERENCE EXAMPLE 6

200 g of the phenol resin powder 3A obtained by the method described in Example 3 was fired and activated under conditions similar to those for the phenol resin powder 1A-a of Reference Example 4, to obtain 91 g of a carbon electrode material 6 having a weight reduction ratio of 35% in the activation treatment.

REFERENCE EXAMPLE 7

200 g of the phenol resin powder 4A obtained by the method described in Example 4 was fired and activated under conditions similar to those for the phenol resin powder 1A-a of Reference Example 4, to obtain 91 g of a carbon electrode material 7 having a weight reduction ratio of 35% in the activation treatment.

REFERENCE EXAMPLE 8

200 g of the phenol resin powder 5A obtained by the method described in Example 5 was fired and activated under conditions similar to those for the phenol resin powder 1A-a of Reference Example 4, to obtain 92 g of a carbon electrode material 8 having a weight reduction ratio of 34% in the activation treatment.

REFERENCE EXAMPLE 9

Figure 9:
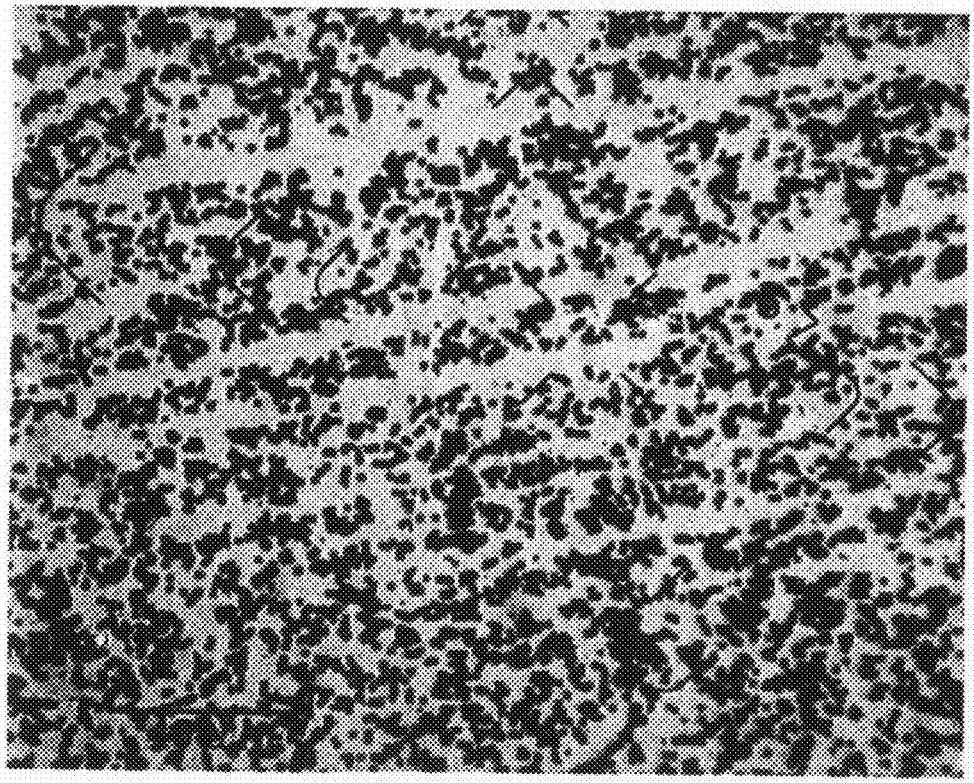
FIG. 9 is an optical micrograph of a carbon electrode material powder obtained in Reference Example 9.

200 g of the phenol resin powder 6A obtained by the method described in Example 6 was fired and activated under conditions similar to those for the phenol resin powder 1A-a of Reference Example 4, to obtain 90 g of a carbon electrode material 9 having a weight reduction ratio of 36% in the activation treatment. FIG. 9 shows an optical micrograph of the carbon electrode material powder according to this reference example.

REFERENCE EXAMPLE 10

200 g of the phenol resin powder 7A obtained by the method described in Example 7 was fired and activated under conditions similar to those for the phenol resin powder 1A-a of Reference Example 4, to obtain 92 g of a carbon electrode material 10 having a weight reduction ratio of 34% in the activation treatment.

REFERENCE EXAMPLE 11

Figure 10:
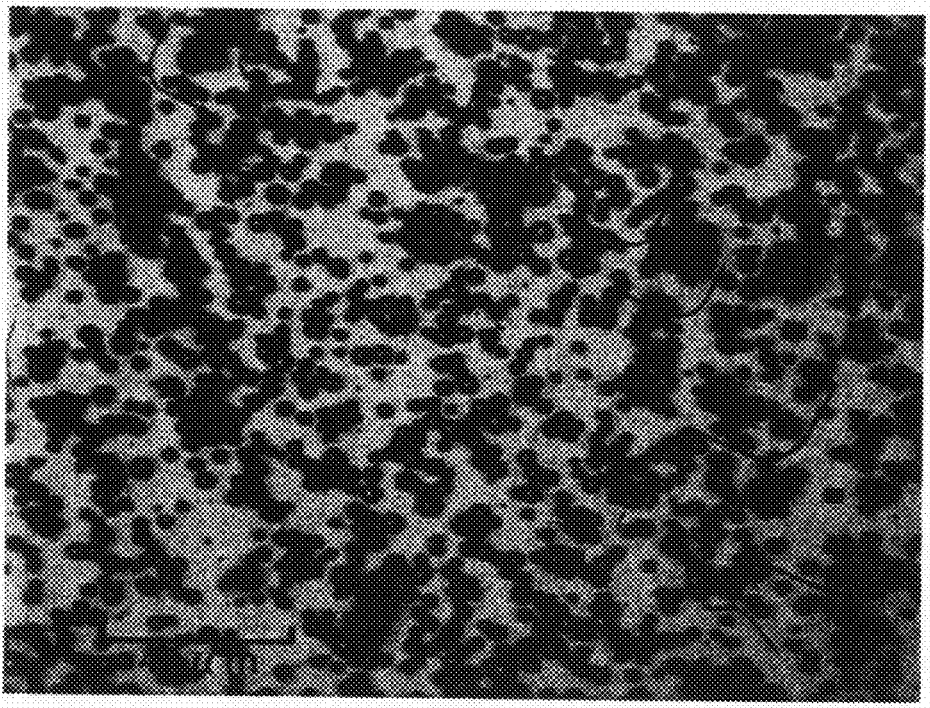
FIG. 10 is an optical micrograph of a carbon electrode material powder obtained in Reference Example 11.

200 g of the phenol resin powder 8A obtained by the method described in Example 8 was fired and activated under conditions similar to those for the phenol resin powder 1A-a of Reference Example 4, to obtain 95 g of a carbon electrode material 11 having a weight reduction ratio of 32% in the activation treatment. FIG. 10 shows an optical micrograph of the carbon electrode material powder according to this reference example.

REFERENCE EXAMPLE 12

200 g of the phenol resin powder 9A obtained by the method described in Example 9 was fired and activated under conditions similar to those for the phenol resin powder 1A-a of Reference Example 4, to obtain 90 g of a carbon electrode material 12 having a weight reduction ratio of 36% in the activation treatment.

REFERENCE EXAMPLE 13

200 g of the phenol resin powder 10A obtained by the method described in Example 10 was fired and activated under conditions similar to those for the phenol resin powder 1A-a of Reference Example 4, to obtain 91 g of a carbon electrode material 13 having a weight reduction ratio of 35% in the activation treatment.

REFERENCE COMPARATIVE EXAMPLE 1

Figure 11:
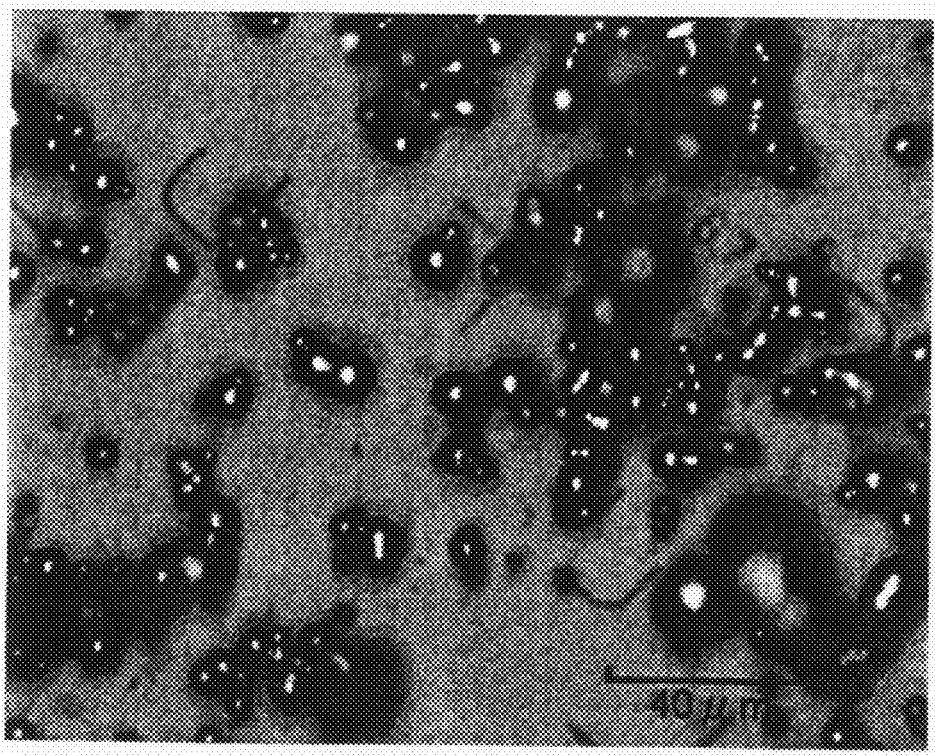
FIG. 11 is an optical micrograph of a carbon electrode material powder obtained in Reference Comparative Example 1.

70 g of the phenol resin powder 1C obtained by the method described in Comparative Example 1 was fired and activated under conditions similar to those for the phenol resin powder 1A-a of Reference Example 4, to obtain 35 g of a carbon electrode material 14 having a weight reduction ratio of 30% in the activation treatment. FIG. 11 shows an optical micrograph of the carbon electrode material powder obtained in this reference comparative example.

REFERENCE COMPARATIVE EXAMPLE 2

200 g of the phenol resin powder 3C obtained by the method described in Comparative Example 3 was fired and activated under conditions similar to those for the phenol resin powder 1A-a of Reference Example 4, to obtain 88 g of a carbon electrode material 15 having a weight reduction ratio of 30% in the activation treatment.

REFERENCE COMPARATIVE EXAMPLE 3

Dried coconut shells were introduced into a crucible, which in turn was introduced into an electric furnace. After the electric furnace was sufficiently substituted with nitrogen gas, the coconut shells were heated from room temperature at a rate of 100° C./hour while continuously feeding nitrogen, and heat-treated and fired for three hours when the temperature reached 600° C. Thereafter the coconut shells were continuously heated at the rate of 100° C./hour, and activated in a stream of nitrogen saturated with steam at 850° C. for five hours. The resultant was pulverized with a dynamic mill

[MYD] (by Mitsui Mining Co., Ltd.) until the average particle diameter reached 9 μm, to obtain a carbon electrode material 16.

REFERENCE COMPARATIVE EXAMPLE 4

70 g of the phenol resin powder 1C obtained by the method described in Comparative Example 1 was fired under conditions similar to those for the phenol resin powder 1A-d of Reference Example 4, to obtain 36 g of a carbon electrode material 17.

Various characteristics shown in Table 3 were measured as to the aforementioned carbon electrode materials 1 to 17. Table 3 shows the results of the measurement. In the carbon electrode material 15 of Reference Comparative Example 2 in Table 3, the single particle ratio and the sphericity are shown by "-", to indicate that a large number of indeterminate particles were present and these values were impossible to measure.

[Application of Carbon Electrode Material Powder to Electric Double Layer Capacitor, Lithium Ion Battery and Lithium Ion Capacitor]

REFERENCE EXAMPLE 15

Figure 13:
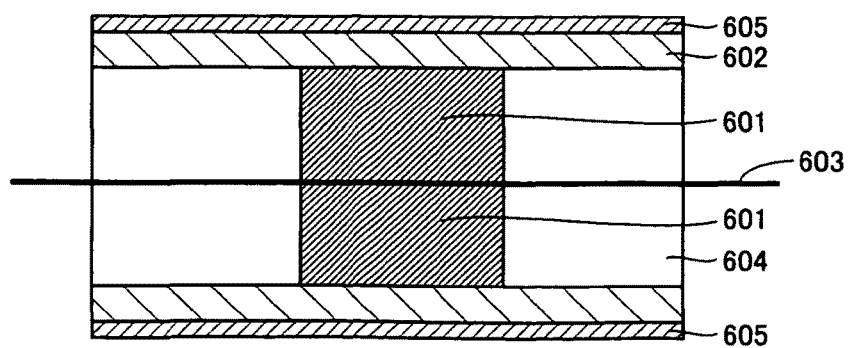
FIG. 13 is a schematic sectional view showing an electric double layer capacitor produced by way of trial in Reference Example 15.

A simplified electric double layer capacitor having a structure shown in FIG. 13 was prepared according to the following procedure. FIG. 13 is a schematic sectional view showing the electric double layer capacitor prepared by way of trial. First, a discoidal platinum plate of 1 mm in thickness and 18 mm in outer diameter was employed as a collector 602, a discoidal silicon rubber member of 0.5 mm in thickness, 3 mm in inner diameter and 18 mm in outer diameter as a spacer 604 was press-bonded to this collector 602, and a separately prepared slurried carbon electrode material 601 was filled in a hole of 0.5 mm in depth and 3 mm in inner diameter formed by collector 602 and spacer 604, to form a polarizing electrode. Two such polarizing electrodes were prepared. Then, a

TABLE 3

| | | Activation or Firing Temperature *1 (° C.) | Average Particle Diameter (μm) | Single Particle Ratio | Coefficient of Variation | Sphericity | Specific Surface Area (m²/g) |
|---|---|---|---|---|---|---|---|
| Reference Example 4 | Carbon Electrode Material 1 | 850 | 4 | 1.00 | 0.49 | 0.99 | 1105 |
| | Carbon Electrode Material 2 | 900 | 3 | 1.00 | 0.47 | 0.98 | 1523 |
| | Carbon Electrode Material 3 | 950 | 3 | 1.00 | 0.45 | 0.99 | 2078 |
| | Carbon Electrode Material 4 | 950 | 3 | 1.00 | 0.48 | 0.99 | 28 |
| Reference Example 5 | Carbon Electrode Material 5 | 850 | 2 | 0.99 | 0.37 | 0.99 | 1112 |
| Reference Example 6 | Carbon Electrode Material 6 | 850 | 6 | 0.80 | 0.56 | 0.92 | 1105 |
| Reference Example 7 | Carbon Electrode Material 7 | 850 | 2 | 1.00 | 0.36 | 0.99 | 1125 |
| Reference Example 8 | Carbon Electrode Material 8 | 850 | 6 | 0.80 | 0.47 | 0.75 | 1122 |
| Reference Example 9 | Carbon Electrode Material 9 | 850 | 1 | 0.99 | 0.42 | 0.99 | 1065 |
| Reference Example 10 | Carbon Electrode Material 10 | 850 | 1 | 0.99 | 0.55 | 0.99 | 1096 |
| Reference Example 11 | Carbon Electrode Material 11 | 850 | 4 | 0.80 | 0.49 | 0.99 | 1099 |
| Reference Example 12 | Carbon Electrode Material 12 | 850 | 4 | 0.99 | 0.58 | 0.99 | 1087 |
| Reference Example 13 | Carbon Electrode Material 13 | 850 | 9 | 0.70 | 0.58 | 0.85 | 1109 |
| Reference Comparative Example 1 | Carbon Electrode Material 14 | 850 | 15 | 0.30 | 0.66 | 0.40 | 1111 |
| Reference Comparative Example 2 | Carbon Electrode Material 15 | 850 | 26 | — | 0.86 | — | 1100 |
| Reference Comparative Example 3 | Carbon Electrode Material 16 | 850 | 9 | 0.99 | 0.76 | 0.45 | 1123 |
| Reference Comparative Example 4 | Carbon Electrode Material 17 | 950 | 15 | 0.30 | 0.66 | 0.41 | 30 |

*1: firing temperature as to carbon electrode materials 14 and 17, temperature in activation treatment as to others.

REFERENCE EXAMPLE 14

Figure 12:
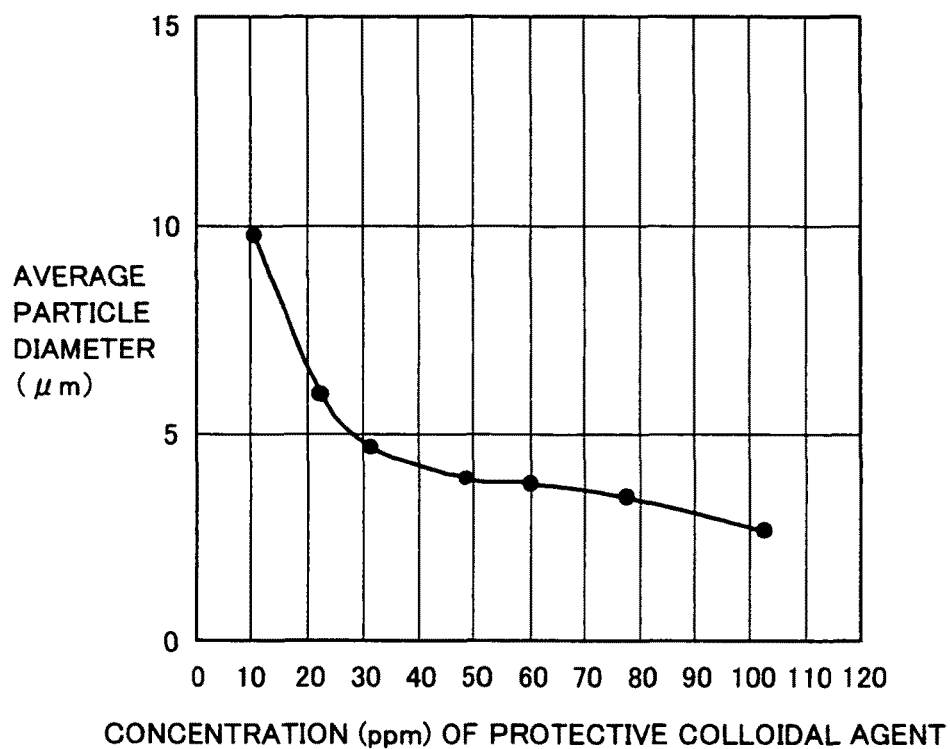
FIG. 12 is a graph showing the relation between the concentration of a protective colloidal agent (weight (ppm) of the protective colloidal agent with respect to the total weight of a reaction liquid) and the average particle diameter of a carbon electrode material powder.

After preparing and firing a phenol resin powder similarly to Reference Example 4 except that the quantity of carboxymethyl cellulose sodium salt which is a protective colloidal agent with respect to phenol was changed in various ways, an activation treatment was performed at 850° C. for five hours to obtain a carbon electrode material powder, and the average particle diameter of the carbon electrode material powder was measured. FIG. 12 is a graph showing the relation between the concentration of the protective colloidal agent (weight (ppm) of the protective colloidal agent with respect to the total weight of the reaction liquid) and the average particle diameter of the carbon electrode material powder. The measurement range of 13 to about 103 ppm of the protective colloidal agent concentration corresponds to the range of 0.04 to 0.32 weight % in terms of the ratio (weight %) of the loading of the protective colloidal agent/the loading of the phenol. As shown in FIG. 12, it has been recognized that the average particle diameter of the obtained carbon electrode material powder can be controlled by adjusting the loading of the protective colloidal agent. In other words, it has been recognized that the average particle diameter can be reduced by increasing the loading of the protective colloidal agent.

discoidal polypropylene separator 603 of 25 μm in thickness and 18 mm in outer diameter was held between the two polarizing electrodes, to oppose these two polarizing electrodes to each other. Then, stainless terminal plates 605 for terminal extraction were press-bonded to collectors 602 from both sides. The electric double layer capacitor was prepared by applying a load of 10 kg from above stainless terminal plates 605 for fixation.

The aforementioned slurried carbon electrode material 601 was prepared as follows: After adding the carbon electrode material powder (carbon electrode material 13, average particle diameter 9 μm) of Reference Example 13 and the carbon electrode material powder (carbon electrode material 9, average particle diameter 1 μm) of Reference Example 9 into a vessel in weight ratios shown in Table 4, a sulfuric acid solution of 30 weight % which is an electrolyte was added by a constant quantity, and degassing was performed. Then, the sulfuric acid solution of 30 weight % was gradually added to this mixed liquid while stirring the same and the addition was stopped when the mixture in the vessel changed from a clayey state to a slurry state, to obtain the slurried carbon electrode material. Seven types of slurried carbon electrode materials (slurries 1 to 7) in total shown in Table 4 were prepared by this procedure. The quantity (g) of the electrolyte used per gram of each carbon electrode material is referred to as "electrolyte/electrode material ratio", and shown in Table 4.

Then, the capacitance (F/g) per unit weight of the carbon electrode material was measured as to each of the seven types of electric double layer capacitors having different types of slurried carbon electrode materials 601. After applying a voltage of 0.9 V between both electrodes of the electric double layer capacitor and performing constant-voltage charging for six hours, the electric double layer capacitor was constant-current-discharged at 100 μA for obtaining the capacitance (F) of the electric double layer capacitor from the time required for reducing the voltage from 0.54 V to 0.45 V, to calculate the capacitance (F/g) per unit weight of the carbon electrode material from this value and the weights of the pair of (two) polarizing electrodes. Table 4 shows the results.

Further, the coefficient of capacitance per unit volume was obtained from the capacitance (F/g) per unit weight of the carbon electrode material, the weight of the employed carbon electrode material and the weight of the added electrolyte according to the following formula. Table 4 shows the results.

coefficient of capacitance per unit volume=(capacitance (F/g) per unit weight of carbon electrode material)×(weight of carbon electrode material)/(weight of carbon electrode material+weight of electrolyte)

TABLE 4

|  | Slurry | | | | | | |
| --- | --- | --- | --- | --- | --- | --- | --- |
|  | 1 | 2 | 3 | 4 | 5 | 6 | 7 |
| Mixing Ratio *1 | 30/70 | 25/75 | 20/80 | 15/85 | 10/90 | 5/95 | 0/100 |
| Electrolyte/Electrode Material Ratio *2 | 1.36 | 1.34 | 1.30 | 1.27 | 1.31 | 1.34 | 1.37 |
| Capacitance (F/g) *3 | 59 | 59 | 59 | 59 | 59 | 59 | 59 |
| Coefficient or Capacitance per Unit Weight of Carbon Electrode Material | 25.0 | 25.2 | 25.7 | 26.0 | 25.5 | 25.2 | 24.9 |

*1: carbon electrode material 9/carbon electrode material 13 (weight ratio).
*2: quantity of electrolyte used per gram of carbon electrode material (quantity of electrolyte required for slurrying carbon electrode material of 1 g).
*3: capacitance per unit weight of carbon electrode material.

It is understood that the slurry can be prepared with a smaller quantity of the electrolyte by mixing and using the carbon electrode materials 9 and 13 according to the present invention prepared by strictly controlling the average particle diameters, the particle size distributions and the single particle ratios as compared with a singly using case, whereby a larger quantity of the carbon electrode material can be filled in the electric double layer capacitor and hence the coefficient of capacitance per unit volume can be further increased. It has been recognized that the coefficient of capacitance per unit volume is most increased in the case (slurry 4) of mixing the carbon electrode materials 9 and 13 at 15:85 (weight ratio).

When the "electrolyte/electrode material ratio" of the carbon electrode material powder (carbon electrode material 16, average particle diameter 9 μm) of Reference Comparative Example 3 was measured, a high value of 1.49 was exhibited as compared with the value of 1.37 (refer to slurry 7 in Table 4) of the carbon electrode material powder (carbon electrode material 13, average particle diameter 9 μm) of Reference Example 13. This is presumably because the carbon electrode material powder of Reference Comparative Example 3 has a wide particle size distribution and low sphericity and hence clearances in the carbon electrode material in the slurry so enlarge that a larger quantity of the electrolyte is required for the slurrying.

REFERENCE EXAMPLE 16

The carbon electrode material powder (carbon electrode material 1, average particle diameter 4 μm) of Reference Example 4 and the carbon electrode material powder (carbon electrode material 14, average particle diameter 15 μm) of Reference Comparative Example 1 were employed for preparing electric double layer capacitors as to the respective ones by a procedure similar to that of Reference Example 15, and the capacitances were measured. At this time, the quantities of discharge currents were changed from 0.1 mA up to 1.0 mA, for measuring the capacitances at the respective discharge currents. Table 5 shows the results.

TABLE 5

|  |  | Discharge Current (mA) | | | |
| --- | --- | --- | --- | --- | --- |
|  |  | 0.1 | 0.5 | 0.8 | 1.0 |
| Capacitance (F/g) *1 | Carbon Electrode Material 1 | 61 | 60 | 59 | 58 |
|  | Carbon Electrode Material 14 | 59 | 46 | 38 | 32 |

*1: capacitance per unit weight of carbon electrode material.

It is understood that reduction of the capacitance is small in the electric double layer capacitor employing the carbon electrode material powder of Reference Example 4 while the capacitance remarkably lowered with the increase of the discharge current in the electric double layer capacitor employing the carbon electrode material powder of Reference Comparative Example 1. This is conceivably because the average particle diameter of the electrode material is small as compared with the carbon electrode material 14 in the case of the carbon electrode material 1 and hence 1) the contact ratio on the interface between the carbon electrode material and the electrolyte so increases that adsorption/desorption of electrolytic ions with respect to the carbon electrode material by charging/discharging smoothly progresses, and 2) the diffusion length of the ions in the carbon electrode material so shortens that adsorption/desorption of the electrolytic ions with respect to the carbon electrode material by charging/discharging smoothly progresses. In other words, desorption of the electrolytic ions quickly responds even if the discharge current is increased when the average particle diameter of the carbon electrode material is small, while desorption of the electrolytic ions cannot quickly respond but the capacitance lowers following increase of the discharge current when the average particle diameter is large.

REFERENCE EXAMPLE 17

Evaluation of the carbon electrode material powder according to the present invention as a negative electrode material for a lithium ion battery or a lithium ion capacitor was performed in the following manner: A slurry was obtained by sufficiently mixing 100 parts by weight of the carbon electrode material powder (carbon electrode material 4, average particle diameter 3 of Reference Example 4 and a solution prepared by dissolving 10 parts by weight of polyvinylidene fluoride powder in 80 parts by weight of N-methylpyrrolidone with each other, and this slurry was applied to a copper foil (20 μm in thickness), dried and pressed to obtain a negative electrode. This negative electrode was cut into 1.5 cm by 2.0 cm in size, to form a negative electrode for evaluation. A cell for evaluation was assembled by employing the negative electrode for evaluation, a metal lithium member of 1.5 cm by 2.0 cm in size and 200 μm in thickness as a counter electrode and a polyethylene nonwoven fabric of 50 μm in thickness as a separator. Metal lithium was employed as a reference electrode. A solution prepared by dissolving $LiPF_6$ in propylene carbonate in a concentration of 1 mol/L was employed as an electrolyte. For the purpose of comparison, a similar cell for evaluation was prepared by employing the carbon electrode material powder (carbon electrode material 17, average particle diameter 15 μm) of Reference Comparative Example 4.

A charging/discharging test was conducted as to each of the aforementioned cells for evaluation. In an initial charging/discharging operation, both of the charging and the discharging were performed at 0.2 mA/cm$^2$ under potential regulation. The potential range was set to 0 V to 2 V on the basis of lithium. Then, second to seventh charging/discharging operations were performed at 0.2 mA/cm$^2$ in the potential range of 0 V to 0.5 V, and eighth to fifteenth charging/discharging operations were further performed at 1.0 mA/cm$^2$ in the potential range of 0 V to 0.5 V.

The ratios (capacitance retention ratios, %) between the discharge capacitances in the seventh operation evaluated at the current density of 0.2 mA/cm$^2$ and the discharge capacitances in the fifteenth operation evaluated at 1.0 mA/cm$^2$ were 92% as to the carbon electrode material 4 of Reference Example 4 and 69% as to the carbon electrode material 17 of Reference Comparative Example 4. It has been recognized from these results that reduction of the discharge capacitance can be suppressed by employing the carbon electrode material powder according to the present invention, even if the current density is increased.

[Preparation of Molecular Sieve Carbon]

REFERENCE EXAMPLE 18

A homogeneous solution was obtained by preparing 2000 g of a mixed solution having a formaldehyde concentration of 10 weight % and a hydrochloric acid concentration of 18 weight % by employing hydrochloric acid of 35 weight % and a formaldehyde aqueous solution of 36 weight %, thereafter adding 8 g of an aqueous solution of 2 weight % of carboxymethyl cellulose sodium salt to the mixed solution and stirring the same. Then, the temperature of the homogeneous solution was adjusted to 20° C., and 70 g of phenol of 95 weight % of 30° C. was thereafter added while stirring the same. The concentration of the phenolic compound with respect to the total weight of the reaction liquid is 3.2 weight %, the feed molar ratio of the phenol with respect to the formaldehyde is 0.11, and the molar concentration of the hydrochloric acid in the reaction liquid is 5.0 mol/L. The reaction liquid was clouded in about 120 seconds from the addition of the phenol. When the reaction was continued also after the clouding while reducing the rate of stirring, the reaction liquid was colored pale pink after about 30 minutes from the addition of the phenol. At this time, the temperature of the reaction liquid had reached 30° C. After the coloring of the reaction liquid, the reaction liquid was heated to 80° C. by external heating, and maintained at this temperature for 30 minutes. Then, this reaction liquid was filtrated, and the obtained cake was washed with 500 g of water, thereafter suspended in 500 g of an ammonia solution of 0.5 weight % and subjected to neutralization reaction at 40° C. for one hour. 80 g of a pale yellow phenol resin powder 21A was obtained by suction filtration of this suspension with an aspirator after the neutralization reaction, washing the same with 500 g of water and drying the same with a dryer of 50° C. for 10 hours.

Then, 100 parts by weight of the phenol resin powder 21A, 23 parts by weight of coal tar, 5 parts by weight (in terms of solid content) of a melamine resin aqueous solution having a solid concentration of 80 weight %, 20 parts by weight of a polyvinyl alcohol aqueous solution (prepared by dissolving polyvinyl alcohol having a degree of polymerization of 1700 and a degree of saponification of 99% to provide an aqueous solution of 20 weight % with warm water), 24 parts by weight of cornstarch, 9.3 parts by weight of a surface active agent (Pellex NB-L by Kao Corporation) and 4 parts by weight of water were measured.

Figure 15:
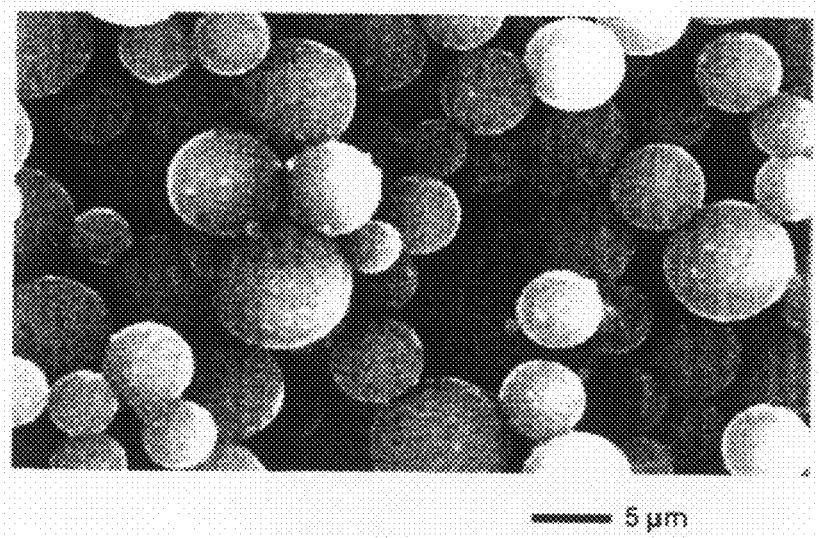
FIG. 15 is an SEM photograph of the surface of a molecular sieve carbon obtained in Reference Example 18.

Among the above, those other than the phenol resin powder 21A were mixed for 10 minutes, and thereafter further mixed for 20 minutes with addition of the phenol resin powder 21A. This mixed composition was extruded with a biaxial extrusion granulator (Pelletta Double EXDF-100 by Fuji Paudal Co., Ltd.), to obtain a columnar pellet of 1.3 mm in diameter by 1 to 3 mm in length (height). A molecular sieve carbon MSC-1 was obtained by heat-treating the obtained pellet in a stream of nitrogen at 350° C. for four hours, supplying the same to a rotary kiln of 100 mmφ by 1000 mm in usable dimension at 100 g/h, performing a carbonization treatment in a stream of nitrogen of 2 L/min. at a residence time of six hours and a treating temperature of 750° C. and thereafter cooling the same in the stream of nitrogen. FIG. 15 is an SEM photograph of the surface of the molecular sieve carbon MSC-1 obtained in this example.

REFERENCE EXAMPLE 19

A molecular sieve carbon MSC-2 was obtained similarly to Reference Example 18, except that the phenol resin powder 10A obtained in the aforementioned Example 10 was employed.

REFERENCE EXAMPLE 20

After mixing 100 parts by weight of the phenol resin powder 6A obtained in the aforementioned Example 6, 10 parts by weight of coal tar, 4 parts by weight (in terms of solid content) of a melamine resin solution having a solid concentration of 80 weight % and 40 parts by weight of water, the obtained mixed composition was extruded and granulated into a columnar shape with a biaxial extrusion granulator (Fine Ryuzer EXR-60 by Fuji Paudal Co., Ltd.). Then, a columnar pellet of 1 mm in diameter by 2 to 3 mm in length was obtained from the columnar granule by using a marmelizer (QJ-230 by Fuji Paudal Co., Ltd.). A molecular sieve carbon MSC-3 was obtained by heat-treating the obtained pellet in a stream of nitrogen at 350° C. for four hours, thereafter introducing the same into a rotary kiln of 100 mmφ by 1000 mm in usable dimension, heating the same up to 780° C. in the stream of nitrogen, maintaining the same at this temperature for three hours and thereafter cooling the same in the stream of nitrogen.

REFERENCE EXAMPLE 21

A homogeneous solution was obtained by preparing 1156 g of a mixed solution by mixing 556 g of a formaldehyde aqueous solution of 36 weight %, 70 g of phenol of 95 weight % and 530 g of water with each other, thereafter adding 8 g of an aqueous solution of 2 weight % of carboxymethyl cellulose sodium salt to the mixed solution and stirring the same. Then, the temperature of the homogeneous solution was adjusted to 20° C., and 914 g of hydrochloric acid of 35 weight % of 30° C. was thereafter added while stirring the same. The concentration of the phenolic compound with respect to the total weight of the reaction liquid is 3.2 weight %, the feed molar ratio of the phenol with respect to the formaldehyde is 0.11, and the molar concentration of the hydrochloric acid in the reaction liquid is 4.7 mol/L. The reaction liquid was clouded in about 20 seconds from the addition of the hydrochloric acid. When the reaction was continued also after the clouding, the reaction liquid was colored pink after about 30 minutes from the addition of the hydrochloric acid. At this time, the temperature of the reaction liquid had reached 30° C. Then, this reaction liquid was filtrated, and the obtained cake was washed with 500 g of water, thereafter suspended in 500 g of an ammonia solution of 0.5 weight % and subjected to neutralization reaction at 40° C. for one hour. 75 g of a pale yellow phenol resin powder 5C was obtained by suction filtration of this suspension with an aspirator after the neutralization reaction, washing the same with 500 g of water and drying the same with a dryer of 50° C. for 10 hours.

Then, a molecular sieve carbon MSC-4 was obtained similarly to Reference Example 20, except that the phenol resin powder 5C was employed.

REFERENCE COMPARATIVE EXAMPLE 5

100 parts by weight of the phenol resin powder 1C obtained in the aforementioned Comparative Example 1, 8 parts by weight (in terms of solid content) of a melamine resin aqueous solution having a solid concentration of 80 weight %, 20 parts by weight of a polyvinyl alcohol aqueous solution (prepared by dissolving polyvinyl alcohol having a degree of polymerization of 1700 and a degree of saponification of 99% to provide an aqueous solution of 20 weight % with warm water), 2 parts by weight of potato starch and 0.7 parts by weight of a surface active agent (Pellex NB-L by Kao Corporation) were measured.

Among the above, those other than the phenol resin powder 1C were mixed for five minutes, and thereafter further mixed for 10 minutes with addition of the phenol resin powder 1C. This mixed composition was extruded with a biaxial extrusion granulator (Pelletta Double EXDF-100 by Fuji Paudal Co., Ltd.), to obtain a columnar pellet of 1.3 mm in diameter by 1 to 3 mm in length (height). A molecular sieve carbon MSC-5 was obtained by treating the obtained pellet by a method similar to that in Reference Example 18.

REFERENCE COMPARATIVE EXAMPLE 6

A homogeneous solution was obtained by preparing 2000 g of a mixed solution having a formaldehyde concentration of 10 weight % and a hydrochloric acid concentration of 16 weight % by employing hydrochloric acid of 35 weight % and a formaldehyde aqueous solution of 36 weight %, thereafter adding 8 g of an aqueous solution of 2 weight % of carboxymethyl cellulose sodium salt to the mixed solution and stirring the same. Then, the temperature of the homogeneous solution was adjusted to 20° C., and 70 g of phenol of 95 weight % of 30° C. was thereafter added while stirring the same. The concentration of the phenolic compound with respect to the total weight of the reaction liquid is 3.2 weight %, the feed molar ratio of the phenol with respect to the formaldehyde is 0.11, and the molar concentration of the hydrochloric acid in the reaction liquid is 4.7 mol/L. The reaction liquid was clouded in about 120 seconds from the addition of the phenol. When the reaction was continued also after the clouding while reducing the rate of stirring, the reaction liquid was colored pale pink after about 30 minutes from the addition of the phenol. At this time, the temperature of the reaction liquid had reached 30° C. Then, this reaction liquid was filtrated, and the obtained cake was washed with 500 g of water, thereafter suspended in 500 g of an ammonia solution of 0.5 weight % and subjected to neutralization reaction at 40° C. for one hour. 78 g of a pale yellow phenol resin powder 6C was obtained by suction filtration of this suspension with an aspirator after the neutralization reaction, washing the same with 500 g of water and drying the same with a dryer of 50° C. for 10 hours.

Then, a molecular sieve carbon MSC-6 was obtained similarly to Reference Example 18, except that the phenol resin powder 6C was employed.

The phenol resin powders employed as raw materials have been collected in Table 6.

TABLE 6

| | Reaction Condition | | | | | | | | | |
|---|---|---|---|---|---|---|---|---|---|---|
| Phenol Resin Powder | Phenol Concentration *1 (weight %) | P/A *2 (molar ratio) | Hydrochloric Acid Concentration *3 (mol/L) | Thermofusibility | Boiling Methanol Solubility (weight %) | Average Particle Diameter (μm) | Single Particle Ratio | Coefficient of Variation | Sphericity | Free Phenol Content (ppm) |
| 21A | 3.2 | 0.11 | 5.0 | non-thermofusible | 6 | 6 | 1.00 | 0.49 | 0.99 | 70 |
| 10A | 3.2 | 0.11 | 2.3 | non-thermofusible | 12 | 12 | 0.70 | 0.59 | 0.88 | 230 |
| 6A | 3.2 | 0.11 | 4.7 | non-thermofusible | 5 | 2 | 0.99 | 0.42 | 0.99 | 20 |
| 5C | 3.2 | 0.11 | 4.7 | thermofusible | 47 | 2 | 0.99 | 0.40 | 0.97 | 30 |
| 1C | 3.2 | 0.11 | 4.7 | non-thermofusible | 5 | 17 | 0.60 | 0.67 | 0.80 | 200 |
| 6C | 3.2 | 0.11 | 4.7 | thermofusible | 65 | 5 | 0.99 | 0.48 | 0.96 | 180 |

*1: concentration (weight %) of phenolic compound with respect to total weight of reaction liquid.
*2: feed molar ratio of phenolic compound with respect to aldehyde.
*3: molar concentration of hydrochloric acid in reaction liquid.

Figure 16:
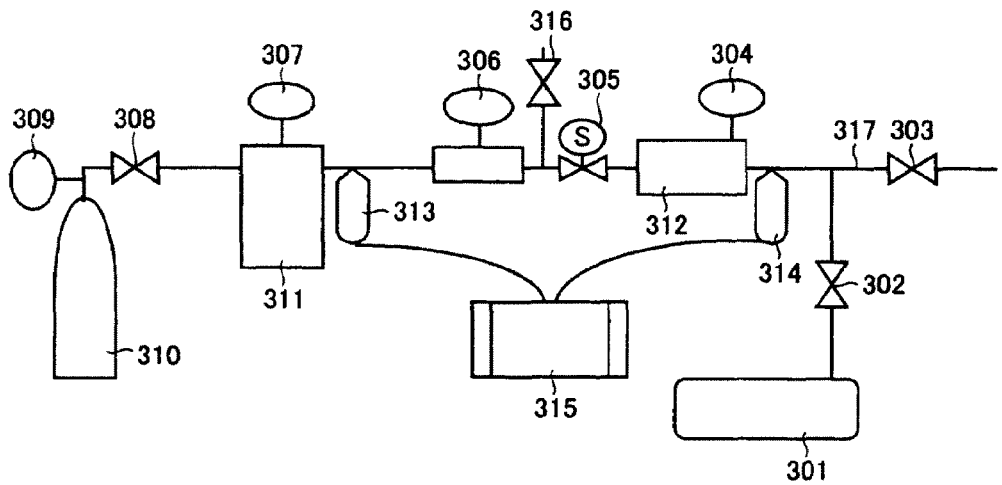
FIG. 16 is a schematic model diagram showing an apparatus for measuring adsorptivity of a molecular sieve carbon.

As to the aforementioned molecular sieve carbons MSC-1 to MSC-6, single component adsorption measurement of oxygen and nitrogen was performed with an adsorption characteristic measuring apparatus shown in FIG. 16 by the following method: Referring to FIG. 16, 30 g of each sample (molecular sieve carbon) was introduced into a sample chamber 312 (250 ml), a valve 303 and an electromagnetic valve 305 were closed, a valve 302 was opened, degassing was performed with a vacuum pump 301 for 30 minutes, and valve 302 was thereafter closed. Then, measurement gas (oxygen gas or nitrogen gas) was fed into a measurement chamber 311 from a gas cylinder 310 in the state closing electromagnetic valve 305, the pressure in the measurement chamber was adjusted to 1.5 MPa (gauge pressure) by controlling a gas regulator 309, and valves 308 and 316 were closed. Further, the adsorption of the measurement gas at each time was obtained by opening electromagnetic valve 305 and measuring an internal pressure change in measurement chamber 311 at a prescribed time. The pressure of a constant pressure valve 306 was adjusted to be 0.3 MPa (gauge pressure) at this time. While the internal pressures of measurement chamber 311 and sample chamber 312 were measured with pressure sensors 313 and 314, measured values equivalent to values displayed on a JISB7507 Bourdon tube pressure gauge of an accuracy grade 1.6 were employed.

The adsorption Q (mg/g) was calculated through the state equation of gas PV=nRT. P represents the measured pressure (internal pressure of measurement chamber), V represents the spatial volume in the measurement system, n represents the number of moles of the measurement gas in the measurement system, R represents the gas constant, and T represents the measurement temperature (25° C.). From the pressure difference between a pressure $P_0$ in the initial state of the measurement chamber and a pressure $P_t$ after the adsorption, the difference $\Delta n$ between a number $n_0$ of moles in the initial stage and a number $n_t$ of moles after the adsorption was calculated through the following formulas:

$n=PV/RT$ $\Delta n=(n_0-n_t)=(P_0-P_t)V/RT$ $\Delta n$ corresponds the total of the number of moles of the adsorbed measurement gas and the number of moles of the gas introduced into the sample chamber, and hence the adsorption Q per gram of the molecular sieve carbon was obtained through the following formula with the number $\Delta n_0$ of moles of the adsorbed measurement gas obtained by subtracting the number of moles of the gas introduced into the sample chamber system from $\Delta n$.

$Q$ (mg/g)=1000×$\Delta n_0$ (mol)×molecular weight (g/mol) of adsorbed molecules (measurement gas)/weight (g) of molecular sieve carbon Table 7 shows oxygen adsorptions $Q_{O.60s}$ after 60 seconds from the measurement initiation and nitrogen adsorptions $Q_{N.10s}$ after 10 seconds from the measurement initiation obtained by the aforementioned measurement method.

TABLE 7

| | Reference Example 18 | Reference Example 19 | Reference Example 20 | Reference Example 21 | Reference Comparative Example 5 | Reference Comparative Example 6 |
|---|---|---|---|---|---|---|
| Molecular Sieve Carbon | MSC-1 | MSC-2 | MSC-3 | MSC-4 | MSC-5 | MSC-6 |
| Oxygen Adsorption $Q_{O·60s}$ (mg/g) | 25.8 | 24.7 | 27.8 | 24.3 | 22.8 | 20.5 |
| Nitrogen Adsorption $Q_{N·0s}$ (mg/g) | 4.4 | 2.0 | 3.3 | 3.0 | 2.7 | 2.0 |

The aforementioned molecular sieve carbons MSC-1 to MSC-6 were filled in adsorption towers 101a and 101b of the PSA nitrogen generator shown in FIG. 14, and nitrogen generability was evaluated. All of the weights of the filled molecular sieve carbons were rendered identical to each other.

First, air compressed with compressor 102 was fed to adsorption towers 101a and 101b, the pressures of the adsorption towers were set to 9.5 kgf/cm² G in gauge pressure, and a PSA operation was executed in four steps of upper/lower pressure equalization—adsorption—upper/lower pressure equalization—reproduction (purge). The steps were switched by controlling the electromagnetic valves with a sequencer. The extraction flow rate (quantity of product nitrogen gas) of product nitrogen was standardized to 2.5 Nl/min. per kilogram of each used molecular sieve carbon, and the oxygen concentration of the obtained product nitrogen was measured with an oxygen densitometer and subjected to evaluation. The adsorption time and the pressure equalization time were optimized. Table 8 shows the oxygen concentration (ppm) in each product nitrogen. Table 8 also shows the average particle diameter, the coefficient of variation of the particle size distribution and the particle bulk density of each molecular sieve carbon. As to the molecular sieve carbon MSC-6, carbon primary particles were welded to each other, and the average particle diameter and the coefficient of variation were impossible to measure.

TABLE 8

| | Reference Example 18 | Reference Example 19 | Reference Example 20 | Reference Example 21 | Reference Comparative Example 5 | Reference Comparative Example 6 |
|---|---|---|---|---|---|---|
| Molecular Sieve Carbon | MSC-1 | MSC-2 | MSC-3 | MSC-4 | MSC-5 | MSC-6 |
| Average Particle Diameter (μm) | 4.2 | 9.8 | 1.4 | 1.4 | 15 | — |
| Coefficient of Variation of Particle Size Distribution | 0.2 | 0.6 | 0.1 | 0.1 | 0.7 | — |
| Particle Bulk Density (g/cc) | 1.1 | 1.0 | 0.92 | 0.82 | 1.0 | 1.1 |
| Oxygen Concentration (ppm) | 25 | 60 | 10 | 55 | 100 | 800 |

Figure 17:
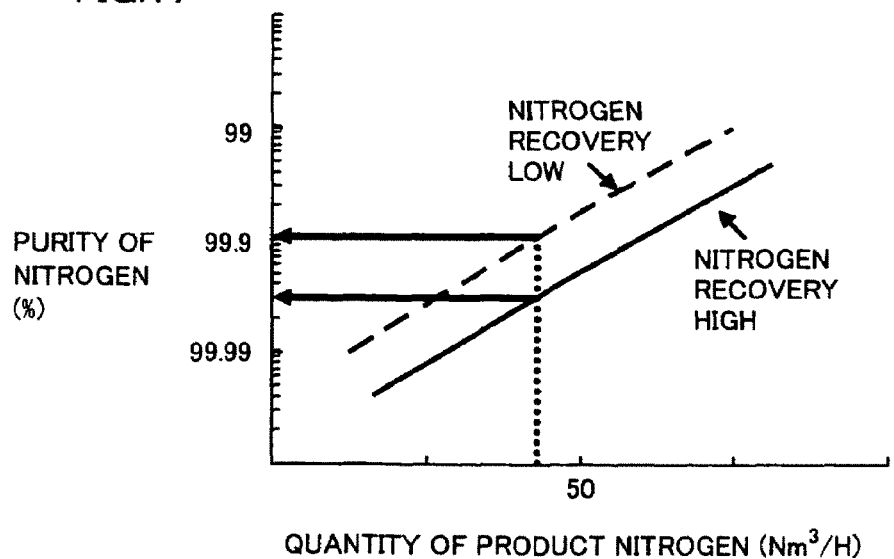
FIG. 17 is a diagram showing the relation between purity of product nitrogen and a flow rate of product nitrogen gas in a PSA nitrogen generator employing molecular sieve carbons having different yields.

It is understood that the oxygen concentration in the product nitrogen can be remarkably reduced by employing the molecular sieve carbons (MSC-1 to MSC-4) according to the present invention. In the PSA nitrogen generator, it is generally known that the purity of nitrogen lowers if the quantity of product nitrogen gas is increased while the purity of nitrogen increases if the quantity of the product nitrogen gas is reduced in a case of employing the same molecular sieve carbon (for example, Reference Document 1: "Pressure Swing Adsorption Technique Compilation" edited by Toshinaga Kawai, Kogyo Gijutsukai, issued on January, 1986). FIG. 17 is a diagram showing the relation between the purity of product nitrogen and the flow rate of product nitrogen gas in a PSA nitrogen generator employing molecular sieve carbons having different nitrogen recovery (i.e., the difference in separative power for oxygen/nitrogen, the nitrogen recovery is expressed as nitrogen recovery=(quantity of product nitrogen gas/quantity of nitrogen gas in supplied source gas) in a nitrogen generator filled with a molecular sieve carbon). Thus, when a molecular sieve carbon exhibiting a high nitrogen recovery is employed, the purity of the product nitrogen can be increased at the same flow rate of the nitrogen gas. In other words, this relation means that, in a case of employing a molecular sieve carbon capable of generating product nitrogen of higher purity at the same quantity of product nitrogen gas, the quantity of the product nitrogen can be further increased under a condition of the same purity of the product nitrogen.

Therefore, the quantity of the product nitrogen gas can be further increased as compared with the prior art by employing the molecular sieve carbon according to the present invention, whereby the quantity of the product nitrogen gas per unit weight of the molecular sieve carbon can be remarkably improved due to improvement of the nitrogen recovery.

Measurement methods and measurement conditions for various characteristics as to the phenol resin powder, the carbon electrode material powder and the molecular sieve carbon are as follows:

(1) Non-Thermofusibility and Thermofusibility: When inserting about 5 g of a phenol resin powder sample between two stainless plates of 0.2 mm in thickness and pressing the same with a pressing machine previously heated to 100° C. with a total load of 50 kg for two minutes, a case where the phenol resin powder did not form a flat plate, the phenol resin particles were not deformed, or the phenol resin particles were not bonded to each other by fusion and/or welding was determined as having "non-thermofusibility". When the phenol resin powder formed a flat plate by fusion and/or welding under this high-temperature pressurization condition, the phenol resin powder was determined as having "thermofusibility".

(2) Boiling Methanol Solubility: About 10 g of a phenol resin powder sample is precisely weighed, heated in about 500 mL of substantially anhydrous methanol under reflux for 30 minutes, thereafter filtrated through a glass filter of No. 3, and the residue on the glass filter is washed with about 100 mL of anhydrous methanol. Then, the washed residue on the glass filter is dried at 40° C. for five hours, and this residue is thereafter precisely weighed. From the weight of the dried residue as obtained and the weight of the phenol resin powder sample, the boiling methanol solubility is calculated on the basis of the following formula:

boiling methanol solubility (weight %)=(difference between weight of phenol resin powder sample and weight of dried residue)/(weight of phenol resin powder sample)×100

(3) Average Particle Diameter: A value of a cumulative frequency of 50% in a frequency distribution measured with a laser diffraction particle size measuring apparatus (Microtrac X100 by Nikkiso Co., Ltd.) while preparing a water dispersion liquid with the carbon electrode material or the phenol resin powder.

(4) Single Particle Ratio: A ratio in a case of dispersing the carbon electrode material or the phenol resin powder in water droplets, making observation with an optical microscope and counting the total number of primary particles and the number of single particles in a randomly selected visual field containing about 300 primary particles, i.e., the number of single particles/the total number of primary particles.

(5) Coefficient of Variation of Particle Size Distribution: Calculated according to the following formula [1] from the frequency distribution measured with the laser diffraction particle size measuring apparatus (Microtrac X100 by Nikkiso Co., Ltd.) while preparing the water dispersion liquid with the carbon electrode material or the phenol resin powder:

$$\text{coefficient of variation of particle size distribution} = (d_{84\%} - d_{16\%})/(2 \times \text{average particle diameter}) \quad [1]$$

In the above formula [1], $d_{84\%}$ and $d_{16\%}$ represent particle sizes exhibiting cumulative frequencies of 84% and 16% in the obtained frequency distribution respectively. The carbon electrode material or the phenol resin powder was determined as having a narrow particle size distribution when the coefficient of variation was not more than 0.65.

(6) Sphericity: In a case of randomly deciding a visual field containing about 300 primary particles in observation with an optical microscope, selecting 10 primary particles having the lowest aspect ratios (i.e., ratios of minor axes/major axes) and measuring aspect ratios in projected profiles thereof as to the respective ones of these 10 primary particles, the average of these 10 aspect ratios.

(7) Free Phenol Content: Defined as a value calculated by the following test: In other words, about 10 g of a phenol resin powder sample is precisely weighed, extracted in 190 mL of methanol under reflux for 30 minutes, and filtrated through a glass filter. The phenolic compound concentration in the filtrate is determined by liquid chromatography, and the weight of the phenolic compound in the filtrate is calculated. The ratio between this weight of the phenolic compound and the weight of the sample, i.e., the weight of the phenolic compound/the weight of the phenol resin powder sample is regarded as the "free phenol content".

(8) Chlorine Content: After a pellet for measurement is prepared by pressurizing a measurement sample (non-thermofusible phenol resin particles) and binder powder for measurement, fluorescent X-ray analysis is performed in an EZ scan mode with a fluorescent X-ray analyzer ZSX100E by Rigaku Corporation. A diffraction strength measured value of a chlorine Kα ray is standardized from an estimated molecular formula ($C_7H_6O_1$) of a phenol resin hardened substance, and regarded as the chlorine content (wt/wt).

(9) Specific Surface Area: Obtained according to the B.E.T. method by nitrogen adsorption by correctly weighing about 0.1 g of the carbon electrode material and thereafter introducing the same into a dedicated cell of a precision full-automatic gas adsorption apparatus BELSORP-mini II (by Bel Japan, Inc.).

(10) Average Particle Diameter of Carbon Primary Particles constituting Molecular Sieve Carbon: In a case of randomly selecting visual fields as to a molecular sieve carbon surface and a rupture phase respectively in observation through a scanning electron micrograph and arbitrarily selecting 100 carbon primary particles confirmable as spherical as to each visual field, the average of the particle diameters of these 200 carbon primary particles measured from the SEM photograph. Further, the "standard deviation of carbon primary particle diameters" denotes the standard deviation as to the particle diameters of the aforementioned 200 carbon primary particles confirmable as spherical.

(11) Coefficient of Variation of Particle Size Distribution of Carbon Primary Particles constituting Molecular Sieve Carbon: Obtained according to the following formula:

coefficient of variation of particle size distribution of carbon primary particles=(standard deviation of carbon primary particle diameters)/(average particle diameter of carbon primary particles)

The embodiment and Examples disclosed this time are to be considered as illustrative in all points and not restrictive. The range of the present invention is shown not by the above description but by the scope of claims for patent, and it is intended that all modifications within the meaning and range equivalent to the scope of claims for patent are included.

The invention claimed:

1. A pellet-type molecular sieve carbon for air separation, having such a structure that a large number of carbon primary particles three-dimensionally irregularly overlap and coalesce with each other, wherein
the average particle diameter of said carbon primary particles is not more than 10 µm, the coefficient of variation of the particle size distribution of said carbon primary particles expressed in the following formula [1] is not more than 0.65 and a particle bulk density is 0.7 to 1.2 g/cc; and
wherein formula [1] is: coefficient of variation of particle size distribution of carbon primary particles =(standard deviation of carbon primary particle diameters)/(average particle diameter of carbon primary particles).

2. The molecular sieve carbon according to claim 1, wherein the adsorption after 60 seconds from measurement initiation per unit weight of the molecular sieve carbon in single component adsorption performed with oxygen gas at 25° C. under a pressure of 0.3 MPa is 24 to 28 mg/g, and the adsorption after 10 seconds from measurement initiation per unit weight of the molecular sieve carbon in single component adsorption performed with nitrogen gas at 25° C. under a pressure of 0.3 MPa is 0.5 to 5 mg/g.

3. The molecular sieve carbon according to claim 1, wherein said carbon primary particles are spherical.

4. A method for producing the molecular sieve carbon according to claim 1, comprising:
(1) A step of obtaining a molded substance by molding a homogeneous mixture containing such a phenol resin powder that the average particle diameter is not more than 12 µm and the coefficient of variation of the particle size distribution expressed in the following formula [2] is not more than 0.65 and a binder component; and
(2) a step of obtaining a carbonized molded substance by heating said molded substance under a non-oxidizing atmosphere at a temperature in the range of 500 to 1100° C.

coefficient of variation of particle size distribution= $(d_{84\%}-d_{16\%})$/(2×average particle diameter of phenol resin powder) [2]

where $d_{84\%}$ and $d_{16\%}$ represent particle sizes exhibiting cumulative frequencies of 84% and 16% in a frequency distribution obtained by laser diffraction scattering respectively.

5. The method for producing a molecular sieve carbon according to claim 4, wherein
said phenol resin powder has a single particle ratio of at least 0.7.

6. The method for producing a molecular sieve carbon according to claim 4, wherein
said phenol resin powder has a sphericity of at least 0.5.

7. The method for producing a molecular sieve carbon according to claim 4, wherein
said phenol resin powder is a non-thermofusible phenol resin powder having the boiling methanol solubility of less than 30% or a thermofusible phenol resin powder having the boiling methanol solubility of less than 50%.

8. The method for producing a molecular sieve carbon according to claim 4, wherein
said phenol resin powder is obtained by the method for producing a phenol resin powder comprising:
(A) a phenol resin powder forming step of forming a phenol resin powder by reacting an aldehyde and a phenolic compound in an aqueous medium in the presence of an acidic catalyst having a molar concentration of at least 2.0 mol/L in a reaction liquid and a protective colloidal agent; and
(B) a separating-washing step of separating said phenol resin powder from the reaction liquid and washing the same.

9. The method for producing a molecular sieve carbon according to claim 8, wherein
said method for producing a phenol resin powder further comprises a heating step of forming a non-thermofusible phenol resin powder by heating the reaction liquid containing said phenol resin powder after said phenol resin powder forming step.

10. The method for producing a molecular sieve carbon according to claim 8, wherein said acidic catalyst is hydrochloric acid, and said aldehyde is formaldehyde, paraformaldehyde or a mixture of these.

11. The method for producing a molecular sieve carbon according to claim 8, wherein the feed molar ratio of said phenolic compound with respect to said aldehyde is not more than 0.9.

12. The method for producing a molecular sieve carbon according to claim 8, wherein said protective colloidal agent is a water-soluble polysaccharide derivative.

13. The method for producing a molecular sieve carbon according to claim 4, wherein said molded substance has a rod shape or a granular shape.

* * * * *

UNITED STATES PATENT AND TRADEMARK OFFICE
Certificate

Patent No. 8,158,095 B2                                                                                                            Patented: April 17, 2012

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Naoto Yoshinaga, Hofu (JP); Satoshi Ibaraki, Osaka (JP); Yoshinobu Kodani, Hofu (JP); and Takaomi Ikeda, Hofu (JP).

Signed and Sealed this Seventeenth Day of December 2013.

*MELVIN C. MAYES*
*Supervisory Patent Examiner*
*Art Unit 1732*
*Technology Center 1700*